US010453139B2

(12) United States Patent
Strongin, II et al.

(10) Patent No.: US 10,453,139 B2

(45) Date of Patent: Oct. 22, 2019

(54) APPARATUS, METHOD AND SYSTEM FOR DESIGNING AND TRADING MACROECONOMIC INVESTMENT VIEWS

(75) Inventors: Steven Harris Strongin, II, New York, NY (US); Lewis Segal, Albany, NY (US); Dominic Wilson, New York, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 853 days.

(21) Appl. No.: 13/079,914

(22) Filed: Apr. 5, 2011

(65) Prior Publication Data

US 2012/0066024 A1 Mar. 15, 2012

Related U.S. Application Data

(63) Continuation of application No. 11/107,005, filed on Apr. 16, 2005, now Pat. No. 7,949,590.

(Continued)

(51) Int. Cl.

*G06Q 40/06* (2012.01)
*G06Q 20/10* (2012.01)

(Continued)

(52) U.S. Cl.

CPC ............. *G06Q 40/06* (2013.01); *G06Q 20/10* (2013.01); *G06Q 30/0202* (2013.01); *G06Q 40/00* (2013.01); *G06Q 40/04* (2013.01)

(58) Field of Classification Search

CPC ...................................................... G06Q 40/06

(Continued)

(56) References Cited

U.S. PATENT DOCUMENTS 6,907,403 B1 * 6/2005 Klein et al. ................. 705/36 R
7,337,135 B1 * 2/2008 Findlay, III ............ G06Q 40/06 705/36 R (Continued)

OTHER PUBLICATIONS

Kwon Chung S, Shin Tai S, Cointegration and causality between macroeconomic variables and stock market returns, 1999, Global Finance Journal 10:1 (1999) 71-81 (Year: 1999).*

(Continued)

*Primary Examiner* — Eric T Wong
*Assistant Examiner* — Kevin Poe

(57) ABSTRACT

The disclosure details the implementation of an apparatus, method, and system for a macroeconomic equity investment design and trade system (the Wavefront system). The disclosure teaches a set of quantitative tools to help investors design trades around macro themes. Part of the approach is a linked set of models called Wavefronts, which describe how economic shocks ripple through the economy into company performance, market value and equity returns in the US market. In one embodiment, the modeling may be viewed as having in three parts. The first converts an economic shock into a comprehensive set of shifts in the economy. The second takes those economic shifts and drives them into company fundamentals. The third values those fundamentals based on what the market normally pays. As a consequence, the Wavefront system maps economic views and risks into predictions of what the market will pay for those changes, and the industries and companies that will over- and under-perform, which allows for and results in the construction of more risk-efficient portfolios. In an alternative embodiment, the Wavefront system may also inverse the progression of the three parts to uncover and move industry specific information to uncover macroeconomic themes.

20 Claims, 33 Drawing Sheets

Related U.S. Application Data

(60) Provisional application No. 60/562,818, filed on Apr. 16, 2004.

(51) Int. Cl.
*G06Q 30/02* (2012.01)
*G06Q 40/00* (2012.01)
*G06Q 40/04* (2012.01)

(58) Field of Classification Search
USPC ............................................ 705/35, 36 R, 37
See application file for complete search history.

(56) References Cited

U.S. PATENT DOCUMENTS

| | | | | |
|---|---|---|---|---|
| 7,379,911 | B2 * | 5/2008 | Lutnick | 705/37 |
| 2002/0046144 | A1 * | 4/2002 | Graff | G06Q 30/06 705/36 R |
| 2002/0059126 | A1 * | 5/2002 | Ricciardi | G06Q 40/06 705/36 R |
| 2002/0161693 | A1 * | 10/2002 | Greenwald | G06Q 40/04 705/37 |
| 2003/0004846 | A1 | 1/2003 | Schneider | |
| 2003/0028468 | A1 * | 2/2003 | Wong | G06Q 40/04 705/37 |
| 2003/0093347 | A1 * | 5/2003 | Gray | 705/35 |
| 2003/0115128 | A1 * | 6/2003 | Lange et al. | 705/37 |
| 2003/0135450 | A1 * | 7/2003 | Aguais et al. | 705/38 |
| 2003/0139827 | A1 * | 7/2003 | Phelps | G06Q 40/02 700/36 |
| 2003/0147309 | A1 * | 8/2003 | Weisberg | G06Q 10/109 368/29 |
| 2003/0195830 | A1 * | 10/2003 | Merkoulovitch et al. | 705/36 |
| 2003/0212618 | A1 * | 11/2003 | Keyes et al. | 705/35 |
| 2004/0143533 | A1 * | 7/2004 | Preist et al. | 705/36 |
| 2005/0033679 | A1 * | 2/2005 | Rachev et al. | 705/36 |
| 2007/0118449 | A1 * | 5/2007 | De La Motte | G06Q 40/00 705/35 |
| 2007/0219895 | A1 * | 9/2007 | Cooper et al. | 705/36 R |
| 2010/0205117 | A1 * | 8/2010 | Van Erlach et al. | 705/36 T |
| 2010/0312687 | A1 * | 12/2010 | Yeung | G06Q 20/12 705/37 |
| 2013/0218732 | A1 * | 8/2013 | Hakim | G06Q 10/063114 705/30 |

OTHER PUBLICATIONS

Gjerde Oystein, Saettem Frode, Casual relations among stock returns and macroeconomic variables in a small, open economy, 1999, Journal of International Financial Markets, Institutions and Money 9 (1999) 61-74 (Year: 1999).*

Muradoglu Gulnur, Taskin Fatma, Bigan Ilke, Causality Between Stock Returns and Macroeconomic Variables in Emerging Markets, 2001, Russian and East European Finance and Trade, vol. 36 No. 6, Nov.-Dec. 2000 pp. 33-53 (Year: 2001).*

International Search Report and Written Opinion corresponding to PCT/US05/12991 dated Jun. 18, 2008.

International preliminary Report on Patentability Corresponding to PCT/US05/12991 dated Mar. 3, 2009.

* cited by examiner

JANUARY 605

| 620<br>DESCRIPTION OF CHANGE IN ECONOMIC ENVIRONMENT | IMPACT ON KEY ECONOMIC VARIABLES 625 | | | | | | | |
|---|---|---|---|---|---|---|---|---|
| | REAL GDP | FED FUNDS | 10 YEA NOTE | OIL PRICE | FOREIGN EXCHANGE (TWI-BRO | REAL CONSUMER EXPENDITI | REAL FIXE INVESTME | FOREIGN GDP |
| 1% INCREASE IN REAL GDP | 1.0% | 1.1% 655 | 0.6% | 0.1% | 2.6% | 0.8% | 2.2% | 0.0% |
| 1% INCREASE IN FED FUNDS 670 | -0.4% | 1.0% | 0.4% | 0.0% 677 | 1.7% | -0.2% | -0.6% | 0.0% |
| 50% INCREASE IN OIL PRICE | -1.4% | -0.8% | -0.4% | 50.0% | 0.7% | -0.9% | -2.5% | -0.7% |
| 1% INCREASE IN REAL PERSONAL CONSUMTION EXPENDITURES | 0.8% | 0.8% | 0.4% | 0.0% | 2.3% | 1.0% | 0.7% | 0.1% |
| 1% INCREASE IN REAL FIXED INVESTMENT | 0.2% | 0.2% | 0.1% | 0.1% | 0.5% | 0.1% | 1.0% | 0.0% |
| 1% INCREASE IN FOREIGN GDP | 0.1% | 0.2% | 0.1% | 0.0% | 0.4% | 0.1% | 0.3% | 1.0% |

JULY 610

| 620<br>DESCRIPTION OF CHANGE IN ECONOMIC ENVIRONMENT | IMPACT ON KEY ECONOMIC VARIABLES 625 | | | | |
|---|---|---|---|---|---|
| | REAL GDP | FED FUNDS | OIL PRICE | 10 YEAR NOTE | FOREIGN EXCHANGE (TWI-BROAD) |
| 1% INCREASE IN REAL GDP 630 | 1.0% | 0.9% 656 | 0.1% 635 | 0.5% | 2.3% |
| 1% INCREASE IN FED FUNDS 675 | -0.4% | 1.0% | 0.0% 677 | 0.4% | 1.6% |
| 50% INCREASE IN OIL PRICE | -1.4% | -0.4% | 50.0% | -0.2% | 1.1% |

DIRECT IMPACT OF CHANGE IN ECONOMIC ENVIRONMENT FROM A 1% INCREASE IN GDP GROWTH 630

CHANGE IN OTHER ECONOMIC VARIABLES HISTORICALLY CONSISTENT WITH THE CHANGE IN THE ECONOMIC ENVIRONMENT 635

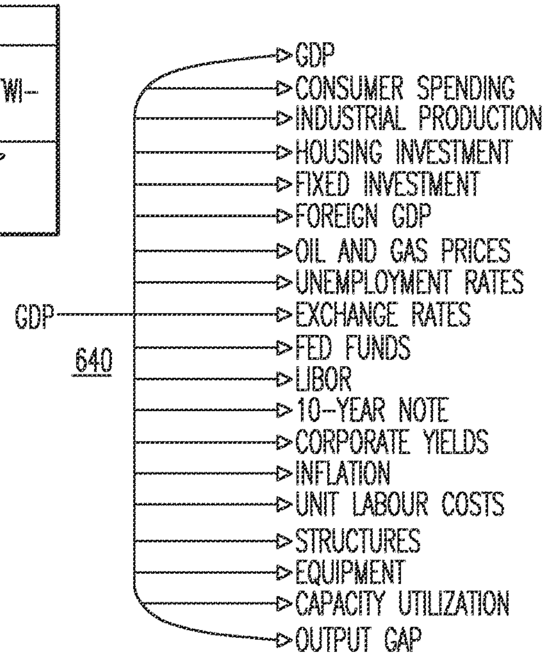

FIG.6

Figure 11
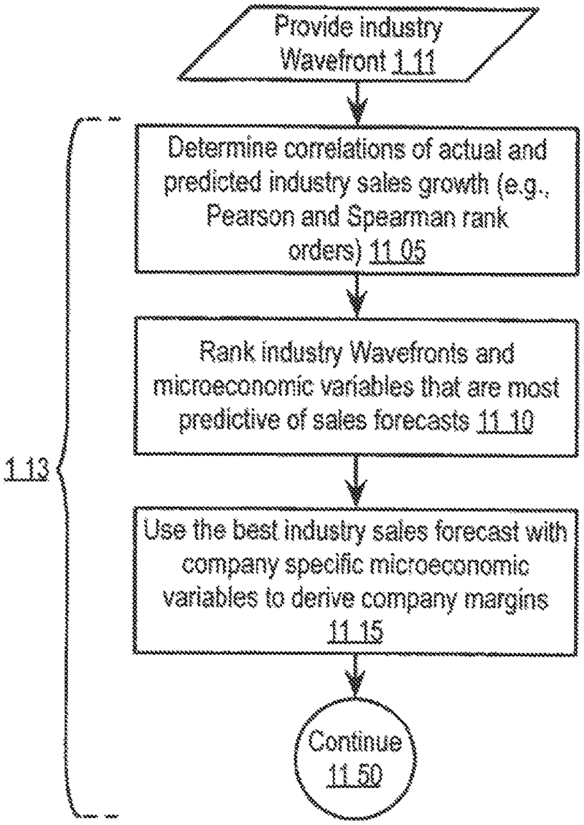
Figure 12
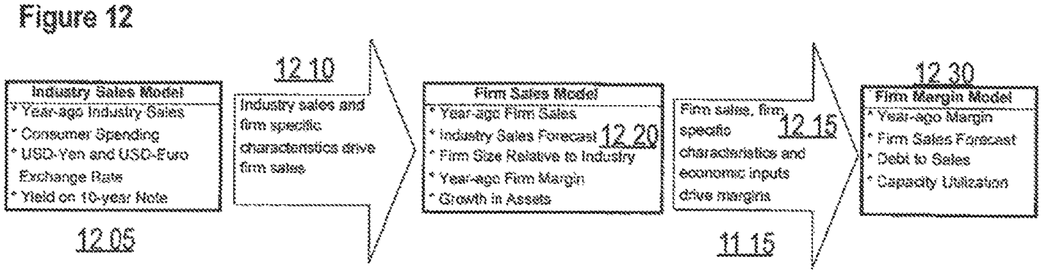
Figure 13
| | Correlation Across Industries | | | | | |
|---|---|---|---|---|---|---|
| | Mean | Minimum | 25th Percentile | Median | 75th Percentile | Maximum |
| Pearson correlation | 0.64 | 0.30 | 0.54 | 0.64 | 0.73 | 0.95 |
| Spearman correlation | 0.59 | 0.32 | 0.50 | 0.59 | 0.68 | 0.88 |

FIG.18

| SECTOR | R-SQUARED OF MBV MODEL |
|---|---|
| ENERGY | 79% |
| MATERIALS | 83% |
| INDUSTRIALS | 86% |
| CONSUMER DISCRETIONARY | 85% |
| CONSUMER STAPLES | 90% |
| HEALTHCARE | 85% |
| FINANCIAL | 85% |
| INFORMATION TECHNOLOGY | 82% |
| TELECOMMUNICATION SERVICES | 83% |
| UTILITIES | 80% |
| ALL FIRMS | 88% |

| | | MARKET CAP ABOVE $250 MILLION 1 MONTH HOLDING PERIOD | | | S&P 500 STOCKS 1 MONTH HOLDING PERIOD | | |
|---|---|---|---|---|---|---|---|
| | VALUATION BASED ON: | ANNUAL RETURN | TRACKING ERROR | SHARPE RATIO | ANNUAL RETURN | TRACKING ERROR | SHARPE RATIO |
| 1905 | 1. HISTORICAL DuPont ROE TERMS, MOMENTUM AND CONSENSUS EARNINGS | 12.5% | 11.5% | 1.1 | 6.8% | 7.7% | 0.9 |
| 1910 | 2. HISTORICAL DuPont ROE TERMS, MOMENTUM AND CONSENSUS EARNINGS (FIRMS WHICH SURVIVE FOR AN ADDITIONAL YEAR) | 13.6% | 10.8% | 1.3 | 6.4% | 7.1% | 0.9 |
| | 3. ONE-YEAR FORWARD DuPont ROE TERMS, WITH HISTORICAL MOMENTUM AND CONSENSUS EARNINGS | 70.6% | 12.6% | 5.6 | 22.1% | 6.7% | 3.3 |

FIG.19

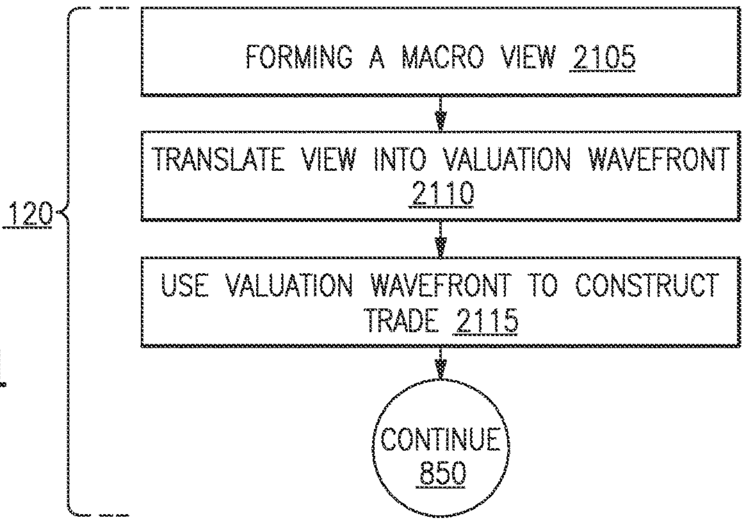

| ECONOMIC SCENARIO | | |
|---|---|---|
| | SOURCES OF SURPRISE[1] | CUMULATIVE IMPACT[2] |
| GDP | | −0.9 |
| CONSUMER | −1.2 | −1.2 |
| INVESTMENT | | −0.9 |
| FED FUNDS | | −1.0 |
| 10 YEAR NOTE | | −0.5 |
| ENERGY | | 0.0 |
| FOREIGN GDP | | −0.1 |

COMBINATION OF ECONOMIC "SURPRISES" THAT WE USE TO GENERATE THE VIEW.

THE TOTAL IMPACT OF THE COMBINATION ON EACH OF THE MAIN ECONOMIC VARIABLES.

FIG.23

| ECONOMIC SCENARIO | | |
|---|---|---|
| | SOURCES OF SURPRISE[1] | CUMULATIVE IMPACT[2] |
| GDP | 2.0 | 0.0 |
| CONSUMER | −2.8 | −1.2 |
| INVESTMENT | | 2.6 |
| FED FUNDS | | 0.0 |
| 10 YEAR NOTE | | 0.0 |
| ENERGY | | 0.0 |
| FOREIGN GDP | | 0.0 |

| SOURCE OF ECONOMIC SURPRISE | 1 DAY (03/15/04 –03/16/04) | 1 WEEK (03/09/04– 03/16/04) | 2 WEEK (03/02/04– 03/16/04) | 1 MONTH (02/13/04– 03/16/04) | 1 MONTH PRIOR (01/14/04– 02/13/04) | 2 MONTHS PRIOR (01/14/04– 12/11/03) | 3 MONTH (12/11/03– 03/16/04) |
|---|---|---|---|---|---|---|---|
| 1% GDP SHOCK | 27% | 3% | –39% | –29% | –36% | 3% | –37% |
| 1% CONSUMER SHOCK | 22% | 6% | –26% | –25% | –41% | 8% | –34% |
| 1% INVESTMENT SHOCK | 25% | 1% | –40% | –24% | –28% | –1% | –32% |
| 1% FOREIGN ACTIVITY SHOCK | 30% | –8% | –35% | –32% | –26% | –8% | –40% |
| 1% FED SHOCK | –15% | –16% | 15% | 15% | 13% | 11% | 25% |
| 1% 10–YEAR NOTE SHOCK | –8% | –20% | –11% | 0% | –1% | 9% | 7% |
| 50% OIL SHOCK | –38% | 5% | 34% | 36% | 27% | 14% | 47% |
| 10% FX SHOCK | –13% | 16% | 43% | 46% | 27% | –22% | 30% |

FIG.25C

| | CORRELATION OF INDUSTRY RETURNS AND WAVEFRONTS | | | | | | | |
|---|---|---|---|---|---|---|---|---|
| 01/27/04–02/05/04 | CONSUMER | REAL GDP | INVESTMENT | FOREIGN GDP | FED | EXCHANGE RATE | OIL | 10 YEAR RATE |
| | –58% | –51% | –39% | –38% | 27% | 16% | 13% | –2% |

A MENU OF MACRO TRADES: SOME IMPLEMENTATIONS ARE FAR BETTER THAN OTHERS

| MACRO THEME | TRADE IMPLEMENTATION | RISK-REWARD RATIO* | TRADE EFFICIENCY INDEX* |
|---|---|---|---|
| STRONGER DOMESTIC ECONOMIC GROWTH 2605 | WAVEFRONT GROWTH BASKET | 1.2 | 1.3 |
| | WAVEFRONT TURBO GROWTH BASKET | 1.0 | 1.2 |
| | LONG MATERIALS & SHORT CONSUMER STAPLES(XLB-XLP) | 0.8 | 1.0 |
| | LONG INDUSTRIALS & SHORT CONSUMER STAPLES(XPI-XLP) | 0.7 | 0.9 |
| | LONG INDUSTRIALS & SHORT SPX(XLI-SPX) | 0.6 | 0.6 |
| | LONG MATERIALS & SHORT SPX(XLB-SPX) | 0.6 | 0.6 |
| | LONG TECHNOLOGY & SHORT SPX(XLK-SPX) | 0.2 | 0.3 |
| | LONG QQQQ & SHORT SPX(QQQQ-SPX) | 0.3 | 0.3 |
| HIGHER RATES 2610 | WAVEFRONT RATES BASKET | 1.1 | 1.8 |
| | LONG SPX & SHORT FINANCIALS(SPX-XLF) | 0.5 | 0.5 |
| | LONG SPX & SHORT REGIONAL BANKS(SPX-RKH) | 0.2 | 0.2 |
| HIGHER OIL PRICES 2615 | WAVEFRONT OIL BASKET | 1.6 | 3.5 |
| | WAVEFRONT OIL BASKET WITH GDP RISK | 1.7 | 2.4 |
| | LONG ENERGY & SHORT SPX(XLE-SPX) | 1.4 | 3.4 |
| STRONGER CONSUMER GROWTH 2620 | WAVEFRONT CONSUMER BASKET | 1.4 | 1.5 |
| | WAVEFRONT HOUSING BASKET | 1.6 | 1.8 |
| | LONG CONSUMER DISCRETIONARY & SHORT MATERIALS(XLY-XLB) | 1.1 | 1.3 |
| | LONG CONSUMER DISCRETIONARY & SHORT INDUSTRIALS(XLY-XLI) | 0.5 | 0.5 |
| | LONG CONSUMER STAPLES & SHORT SPX(XLP-SPX) | 0.4 | 0.4 |
| | LONG CONSUMER DISCRETIONARY & SHORT SPX(XLY-SPX) | 0.5 | 0.5 |
| | LONG RETAIL & SHORT SPX(RTH-SPX) | 0.3 | 0.3 |
| STRONGER NON-US GROWTH | WAVEFRONT FOREIGN GROWTH BASKET | 1.1 | 1.3 |
| 2625 | | 2630 | 2635 |

LEVERAGE TO MACRO SHOCKS VARIES ACROSS AND WITHIN THE SECTOR ETFs

| SECTOR ETFs 2705 | MACROECONOMIC LEVERAGE BY SECTOR | | | INDUSTRIES* WITHIN SECTOR | MACROECONOMIC LEVERAGE WITHIN SECTORS 2710 | | | | | |
|---|---|---|---|---|---|---|---|---|---|---|
| | | | | | GDP (+1%) | | 2-YEAR NOTE (+100BPS) | | OIL PRICE (+25%) | |
| | GDP (+1%) | 2-YEAR NOTE (+100BPS) | OIL PRICE (+25%) | | MINIMUM INDUSTRY LEVERAGE | MAXIMUM INDUSTRY LEVERAGE | MINIMUM INDUSTRY LEVERAGE | MAXIMUM INDUSTRY LEVERAGE | MINIMUM INDUSTRY LEVERAGE | MAXIMUM INDUSTRY LEVERAGE |
| XLB MATERIALS | 6.0% | -1.3% | -6.4% | 7 | 1.1% | 12.8% | -3.4% | 0.4% | -12.6% | -1.8% |
| XLE ENERGY | -1.0% | 1.0% | 17.1% | 4 | -2.0% | 1.4% | 0.1% | 1.4% | 11.1% | 24.9% |
| XLF FINANCIAL | -1.1% | -0.1% | 0.1% | 13 | -6.1% | 0.4% | -6.4% | 2.3% | -1.6% | 2.9% |
| XLI INDUSTRIAL | 4.1% | -0.6% | -3.0% | 10 | -1.2% | 17.3% | -5.4% | 1.1% | -15.5% | 0.2% |
| XLK TECHNOLOGY | 2.7% | -1.0% | -3.6% | 7 | -3.1% | 11.6% | -2.4% | 1.7% | -11.7% | 1.7% |
| XLP CONSUMER STAPLES | -3.3% | 1.7% | 1.6% | 5 | -3.9% | -2.8% | 0.5% | 1.9% | 0.8% | 2.0% |
| XLU UTILITIES | -1.8% | 1.3% | 0.8% | 1 | -1.8% | -1.8% | 1.3% | 1.3% | 0.8% | 0.8% |
| XLV HEALTH CARE 2715 | -2.2% | -0.2% | -0.3% | 4 | -4.0% | 0.2% | -0.3% | 0.0% | -0.4% | 0.0% |
| XLY CONSUMER DISCRETIONARY | -1.1% | 0.2% | -0.2% | 9 | -2.4% | 2.9% | -8.2% | 1.5% | -5.2% | 1.2% |

*INDUSTRIES REFER TO GS INDUSTRY GROUPS WHICH ARE A MODIFIED VERSION OF THE S&P GICS [1](GLOBAL INDUSTRY CLASSIFICATION STANDARD) CODES, PROVIDING BETTER ECONOMIC ALIGNMENT ACROSS STOCKS WITHIN AN INDUSTRY.

[1]GICS IS A SERVICE MARK OF MSCI AND STANDARD AND POOR'S.

FIG.27

ECONOMIC SCENARIO: STRONGER DOMESTIC ECONOMIC GROWTH

| MACROECONOMIC FACTOR | STRONGER GROWTH SOURCE OF SURPRISE[1] | STRONGER GROWTH CUMULATIVE IMPACT[2] |
|---|---|---|
| GDP (+1%) | 0.4 | 0.5% |
| CONSUMER (+1%) | | 0.4% |
| INVESTMENT (+1%) | | 1.0% |
| FED FUNDS (+100 BPS) | −0.4 | −0.1% |
| 10 YEAR NOTE (+100 BPS) | −0.1 | −0.1% |
| OIL PRICE (+50%) | | |
| USD (+10%) | | −0.1% |
| FOREIGN GDP (+1%) | | 0.1% |

GDP GROWTH RISES 0.5%...

...BUT RATES REMAIN UNCHANGED AS THE FED ACCOMODATES HIGHER GROWTH.

[1] UNITS OF ECONOMIC WAVEFRONT USED TO GENERATE THE VIEW.
[2] THE TOTAL IMPACT OF THE COMBINATION ON EACH OF THE MAIN ECONOMIC VARIABLES.

FIG.31

COMPARING GROWTH TRADES
TRADE PERFORMANCE METRICS

| TRADE IMPLEMENTATION 3225 | EXPECTED RETURN (%) | TOTAL VOLATILITY (%)* | INCIDENTAL RISK (%)* | RISK-REWARD RATIO** | TRADE EFFICIENCY INDEX** |
|---|---|---|---|---|---|
| WAVEFRONT GROWTH BASKET 3210 | 5.4 | 16.1 | 14.4 | 1.2 | 1.3 |
| WAVEFRONT TURBO GROWTH BASKET 3215 | 8.2 | 28.5 | 23.1 | 1.0 | 1.2 |
| LONG MATERIALS–SHORT CONSUMER STAPLES(XLB–XLP) 3220 | 4.5 | 20.2 | 16.1 | 0.8 | 1.0 |
| LONG INDUSTRIALS–SHORT CONSUMER STAPLES(XLI–XLP) 3235 | 3.5 | 17.3 | 14.0 | 0.7 | 0.9 |
| LONG INDUSTRIALS–SHORT SPX(XLI–SPX) 3240 | 1.6 | 9.8 | 9.9 | 0.6 | 0.6 |
| LONG MATERIALS–SHORT SPX(XLB–SPX) | 2.6 | 15.5 | 15.3 | 0.6 | 0.6 |
| LONG TECH–SHORT SPX(XLK–SPX) 3230 | 1.4 | 20.1 | 18.3 | 0.2 | 0.3 |
| LONG QQQQ–SHORT SPX(QQQQ–SPX) 3225 | 1.3 | 17.8 | 16.0 | 0.3 | 0.3 |

3245

*VOLITILITY AND INCIDENTAL RISK ARE EXPRESSED IN TERMS OF ANNUALIZED VOLATILITIES OF MONTHLY RETURNS.
**RISK–REWARD RATIO AND THE TRADE EFFICIENCY INDEX ARE EXPRESSED AS EXPECTED RETURN RELATIVE TO NON-ANNUALIZED MONTHLY VOLATILITIES (ANNUALIZED VOLATILITY $\div\sqrt{12}$).

FIG.32

ECONOMIC SCENARIO: STRONGER CONSUMER GROWTH
THERE IS MORE THAN ONE PLAUSIBLE CONSUMER SCENARIO

| MACROECONOMIC FACTOR | 3305 SCENARIO #1: CONSUMER STRENGTHENING WITH NO CHANGE TO ECONOMIC GROWTH | | SCENARIO #2: TYPICAL CONSUNER STRENGTHENING 3310 | |
|---|---|---|---|---|
| | SOURCE OF SURPRISE[1] | CUMULATIVE IMPACT[2] | SOURCE OF SURPRISE[1] | CUMULATIVE IMPACT[2] |
| GDP (+1%) | −0.9 | 0.0% | | 0.4% |
| CONSUMER (+1%) | 1.3 | 0.6% | 0.6 | 0.6% |
| INVESTMENT (+1%) | | −0.8% | | 0.5% |
| FED FUNDS (+100 BPS) | | | | 0.4% |
| 10 YEAR NOTE (+100 BPS) | | | | 0.2% |
| OIL PRICE (+50%) | | | | |
| USD (+10%) | | 0.6% | | 1.2% |
| FOREIGN GDP (+1%) | | | | 0.1% |

[1] UNITS OF ECONOMIC WAVEFRONT USED TO GENERATE THE VIEW.
[2] THE TOTAL IMPACT OF THE COMBINATION ON EACH OF THE MAIN ECONOMIC VARIABLES.

CONSUMER SPENDING RISES 0.6%...

...IN SCENARIO 1, GDP GROWTH IS UNCHANGED (INVESTMENT FALLS)...

...BUT IN SCENARIO 2, GDP GROWTH RISES (INVESTMENT RISES)...

COMPARING CONSUMER TRADES–SCENARIO 1
TRADE PERFORMANCE METRICS

| TRADE IMPLEMENTATION | EXPECTED RETURN (%) | TOTAL VOLATILITY (%)* | INCIDENTAL RISK (%)* | RISK-REWARD RATIO** | TRADE EFFICIENCY INDEX** |
|---|---|---|---|---|---|
| WAVEFRONT CONSUMER BASKET 3410 | 4.2 | 10.3 | 9.7 | 1.4 | 1.5 |
| WAVEFRONT HOUSING BASKET 3415 | 5.7 | 12.3 | 10.7 | 1.6 | 1.8 |
| LONG CONSUMER DISCRETIONARY–SHORT MATERIALS(XLY–XLB) 3420 | 5.7 | 17.6 | 15.3 | 1.1 | 1.3 |
| LONG CONSUMER DISCRETIONARY–SHORT INDUSTRIALS(XLY–XLI) | 2.1 | 14.9 | 13.9 | 0.5 | 0.5 |
| LONG CONSUMER STAPLES–SHORT SPX(XLP–SPX) | 1.5 | 14.1 | 13.5 | 0.4 | 0.4 |
| LONG CONSUMER DISCRETIONARY–SHORT SPX(XLY–SPX) | 1.4 | 11.1 | 10.5 | 0.5 | 0.5 |
| LONG RETAIL–SHORT SPX(RTH–SPX) 3425 | 1.4 | 16.4 | 15.8 | 0.3 | 0.3 |

*VOLITILITY AND INCIDENTAL RISK ARE EXPRESSED IN TERMS OF ANNUALIZED VOLATILITIES OF MONTHLY RETURNS.
**RISK-REWARD RATIO AND THE TRADE EFFICIENCY INDEX ARE EXPRESSED AS EXPECTED RETURN RELATIVE TO NON-ANNUALIZED MONTHLY VOLATILITIES (ANNUALIZED VOLATILITY ÷√12).

FIG.36

COMPARING CONSUMER TRADES–SCENARIO 2
TRADE PERFORMANCE METRICS

| TRADE IMPLEMENTATION | EXPECTED RETURN (%) | TOTAL VOLATILITY (%)* | INCIDENTAL RISK (%)* | RISK-REWARD RATIO** | TRADE EFFICIENCY INDEX** |
|---|---|---|---|---|---|
| WAVEFRONT CONSUMER BASKET 3610 | 1.9 | 10.3 | 9.7 | 0.7 | 0.7 |
| WAVEFRONT HOUSING BASKET 3615 | 2.6 | 12.3 | 10.7 | 0.7 | 0.8 |
| LONG CONSUMER DISCRETIONARY–SHORT MATERIALS(XLY–XLB) | −0.3 | 17.6 | 18.1 | −0.1 | −0.1 |
| LONG CONSUMER DISCRETIONARY–SHORT INDUSTRIALS(XLY–XLI) | −1.2 | 14.9 | 16.8 | −0.3 | −0.2 |
| LONG CONSUMER STAPLES–SHORT SPX(XLP–SPX) | −0.7 | 14.1 | 14.9 | −0.2 | −0.2 |
| LONG CONSUMER DISCRETIONARY–SHORT SPX(XLY–SPX) | 0.2 | 11.1 | 10.8 | 0.1 | 0.1 |
| LONG RETAIL–SHORT SPX(RTH–SPX) | −0.2 | 16.4 | 16.7 | 0.0 | 0.0 |

*VOLITILITY AND INCIDENTAL RISK ARE EXPRESSED IN TERMS OF ANNUALIZED VOLATILITIES OF MONTHLY RETURNS.
**RISK-REWARD RATIO AND THE TRADE EFFICIENCY INDEX ARE EXPRESSED AS EXPECTED RETURN RELATIVE TO NON-ANNUALIZED MONTHLY VOLATILITIES (ANNUALIZED VOLATILITY ÷√12).

ECONOMIC SCENARIO: HIGHER OIL PRICES

| MACROECONOMIC FACTOR | HIGHER OIL PRICES | |
|---|---|---|
| | SOURCE OF SURPRISE[1] | CUMULATIVE IMPACT[2] |
| GDP (+1%) | | −0.4% |
| CONSUMER (+1%) | | −0.2% |
| INVESTMENT (+1%) | | −0.6% |
| FED FUNDS (+100bps) | | −0.1% |
| 10 YEAR NOTE (+100 bps) | | −0.0% |
| OIL PRICE (+50%) | 0.2 | 12.3% |
| USD (+10%) | | 0.3% |
| FOREIGN GDP (+1%) | | −0.2% |

OIL PRICES RISE 12%... 3705

...DAMAGEING GDP GROWTH 3710

[1] UNITS OF ECONOMIC WAVEFRONT USED TO GENERATE THE VIEW.

[2] THE TOTAL IMPACT OF THE COMBINATION ON EACH OF THE MAIN ECONOMIC VARIABLES

FIG.37

ECONOMIC SCENARIO: HIGHER RATES

| MACROECONOMIC FACTOR | HIGHER RATES | |
|---|---|---|
| | SOURCE OF SURPRISE[1] | CUMULATIVE IMPACT[2] |
| GDP (+1%) | 0.3 | 0.0% |
| CONSUMER (+1%) | | 1.0% |
| INVESTMENT (+1%) | | 0.2% |
| FED FUNDS (+100bps) | 0.9 | 1.2% |
| 10 YEAR NOTE (+100 bps) | 0.1 | 0.7% |
| OIL PRICE (+50%) | | |
| USD (+10%) | −0.3 | −0.6% |
| FOREIGN GDP (+1%) | | |

RATES RISE 1.2% ...AS THE FED CAPS

GDP GROWTH,LEAVING IT UNCHANGED

[1] UNITS OF ECONOMIC WAVEFRONT USED TO GENERATE THE VIEW.

[2] THE TOTAL IMPACT OF THE COMBINATION ON EACH OF THE MAIN ECONOMIC VARIABLES

FIG.40

COMPARING OIL TRADES
TRADE PERFORMANCE METRICS

| TRADE IMPLEMENTATION | EXPECTED RETURN (%) | TOTAL VOLATILITY (%)* | INCIDENTAL RISK (%)* | RISK-REWARD RATIO** | TRADE EFFICIENCY INDEX** |
|---|---|---|---|---|---|
| WAVEFRONT OIL BASKET | 10.3 | 22.6 | 10.4 | 1.6 | 3.5 |
| WAVEFRONT OIL BASKET WITH GDP RISK 3810 | 15.2 | 30.6 | 22.4 | 1.7 | 2.4 |
| LONG ENERGY ETF - SHORT SPX (XLE-SPX) 3815 | 8.3 | 20.4 | 8.6 | 1.4 | 3.4 |

*VOLATILITY AND INCIDENTAL RISK ARE EXPRESSED IN TERMS ANNUALIZED VOLATILITIES OF MONTHLY RETURNS.
**RISK-REWARD RATIO AND THE TRADE EFFICIENCY INDEX ARE EXPRESSED AS EXPECTED RETURN RELATIVE TO NON-ANNUALIZED MONTHLY VOLATILITIES (ANNUALIZED VOLATILITY +√12).

FIG.38

COMPARING OIL TRADES
TRADE PERFORMANCE METRICS

| TRADE IMPLEMENTATION | EXPECTED RETURN (%) 3920 | TOTAL VOLATILITY (%)* | INCIDENTAL RISK (%)* 3920 | RISK-REWARD RATIO** 3925 | TRADE EFFICIENCY INDEX** 3930 |
|---|---|---|---|---|---|
| WAVEFRONT OIL BASKET 3910 | 10.3 | 22.6 | 10.4 | 1.6 | 3.5 |
| WAVEFRONT OIL BASKET WITH GDP RISK 3915 | 15.2 | 30.6 | 22.4 | 1.7 | 2.4 |
| LONG ENERGY ETF - SHORT SPX (XLE-SPX) 3940 | 8.3 | 20.4 | 8.6 | 1.4 | 3.4 |

*VOLATILITY AND INCIDENTAL RISK ARE EXPRESSED IN TERMS ANNUALIZED VOLATILITIES OF MONTHLY RETURNS.
**RISK-REWARD RATIO AND THE TRADE EFFICIENCY INDEX ARE EXPRESSED AS EXPECTED RETURN RELATIVE TO NON-ANNUALIZED MONTHLY VOLATILITIES (ANNUALIZED VOLATILITY +√12).

FIG.39

COMPARING INTEREST RATES TRADE
TRADE PERFORMANCE METRICS

| TRADE IMPLEMENTATION | EXPECTED RETURN (%) | TOTAL VOLATILITY (%)* | INCIDENTAL RISK (%)* | RISK-REWARD RATIO** | TRADE EFFICIENCY INDEX** |
|---|---|---|---|---|---|
| WAVEFRONT RATES BASKET 4110 | 4.1 | 12.9 | 8.1 | 1.1 | 1.8 |
| LONG SPX-SHORT FINANCIALS (SPX-XLF) | 1.3 | 9.4 | 9.1 | 0.5 | 0.5 |
| LONG SPX-SHORT REGIONAL BANKS (SPX-RKH) | 0.9 | 13.4 | 13.3 | 0.2 | 0.2 |

*VOLATILITY AND INCIDENTAL RISK ARE EXPRESSED IN TERMS ANNUALIZED VOLATILITIES OF MONTHLY RETURNS.
**RISK-REWARD RATIO AND THE TRADE EFFICIENCY INDEX ARE EXPRESSED AS EXPECTED RETURN RELATIVE TO NON-ANNUALIZED MONTHLY VOLATILITIES (ANNUALIZED VOLATILITY +√12).

FIG.41

ECONOMIC SCENARIO: STRONGER FOREIGN GROWTH

| MACROECONOMIC FACTOR | STRONGER FOREIGN GROWTH: SOURCE OF SURPRISE[1] | STRONGER FOREIGN GROWTH: CUMULATIVE IMPACT[2] |
|---|---|---|
| GDP (+1%) | −0.1 | 0.0% |
| CONSUMER (+1%) | | |
| INVESTMENT (+1%) | | |
| FED FUNDS (+100bps) | | |
| 10 YEAR NOTE (+100 bps) | | |
| OIL PRICE (+50%) | | |
| USD (+10%) | | |
| FOREIGN GDP (+1%) | 0.8 | 0.8% |

FOREIGN GDP GROWTH RISES 0.8%

...WHILE US GDP GROWTH REMAINS UNCHANGED.

[1] UNITS OF ECONOMIC WAVEFRONT USED TO GENERATE THE VIEW.

[2] THE TOTAL IMPACT OF THE COMBINATION ON EACH OF THE MAIN ECONOMIC VARIABLES

FIG.42

COMPARING FOREIGN GROWTH
TRADE PERFORMANCE METRICS

| TRADE IMPLEMENTATION | EXPECTED RETURN (%) | TOTAL VOLATILITY (%)* | INCIDENTAL RISK (%)* | RISK-REWARD RATIO** | TRADE EFFICIENCY INDEX** |
|---|---|---|---|---|---|
| WAVEFRONT FOREIGN GROWTH BASKET | 3.1 | 9.7 | 8.2 | 1.1 | 1.3 |

*VOLATILITY AND INCIDENTAL RISK ARE EXPRESSED IN TERMS ANNUALIZED VOLATILITIES OF MONTHLY RETURNS.

**RISK-REWARD RATIO AND THE TRADE EFFIENCY INDEX ARE EXPRESSED AS EXPECTED RETURN RELATIVE TO NON-ANNUALIZED MONTHLY VOLATILITIES (ANNUALIZED VOLATILITY $+\sqrt{12}$).

FIG.43

APPARATUS, METHOD AND SYSTEM FOR DESIGNING AND TRADING MACROECONOMIC INVESTMENT VIEWS

RELATED APPLICATION

This application is a continuation of and claims priority under 35 U.S.C. § 120 to U.S. patent application Ser. No. 11/107,005 filed Apr. 15, 2005 and entitled "Apparatus, Method and System for Designing and Trading Macroeconomic Investment Views," which claims the benefit of U.S. Provisional Application Ser. No. 60/562,818 filed Apr. 16, 2004, entitled "Apparatus, Method and System for Designing Macroeconomic Equity Investments," and International Application No. PCT/US2005/012991 filed Apr. 15, 2005, entitled "Apparatus, Method and System for Designing and Trading Macroeconomic Investment Views." All of the aforementioned applications are expressly incorporated herein by reference.

FIELD

The present invention is directed generally to an apparatus, method, and system of building portfolios, and more particularly, to an apparatus, method and system to design and trade macroeconomic investment views.

BACKGROUND

Computerized marketplaces of all kinds range from simple classified ad bulletin boards to complex mainframe-based market systems such as NASDAQ, which offers a real-time market-making system for tens of thousands of securities brokers. All modern stock, bond and commodity exchanges are supported by underlying computerized databases and related systems, which enable them to function.

Trading systems for items having substantial value generally are an automated version of a manual trading process. For example, securities trading systems are based on a model wherein a customer contacts a so-called retail broker to place an order. The broker, in turn, submits the order to a dealer who executes the order and returns an order confirmation to the broker. Other known systems automate the open outcry process used in trading pits. Importantly, securities trading is heavily regulated. Many of the terms and conditions prevalent in securities trades are limited by convention and regulation. Automated securities trading systems necessarily reflect these constraints. Such financial systems typically rely on underlying information technology systems, user interface, networks, and/or other core technologies.

SUMMARY

The present invention provides for the implementation of an apparatus, method, and system for macroeconomic equity investment design and trade system (the Wavefront system). The Wavefront system improves upon equity design and trade tools by providing a set of quantitative tools to help investors design trades around macro themes. Part of the approach is a linked set of models called Wavefronts, which describe how economic shocks ripple through the economy into company performance, market value and equity returns in the US market. In one embodiment, the modeling may be viewed as having three parts. The first converts an economic shock into a comprehensive set of shifts in the economy, which affect certain related macroeconomic variables. The second takes those economic shifts and drives them into company fundamentals by using various economic drivers. The third values those fundamentals based on what the market normally pays. As a consequence, the Wavefront system enables mapping of economic views and risks into predictions of what the market will pay for changes in those views and risks; the Wavefront system also enables the identification of industries and companies that will over and under-perform based on its mappings. The Wavefront system allows for and results in the construction of more risk-efficient portfolios. In another embodiment, by reversing the modeling process, the Wavefront system may show how the market has been trading various macro themes and allow for more accurate reads on the market. This provides a sophisticated view of how market focus is shifting, how particular events are being interpreted and whether a particular theme has already played out. Such an embodiment allows the Wavefront system users to gain a better understanding of how the equity markets are likely to process new information.

BRIEF DESCRIPTION OF THE DRAWINGS

The accompanying drawings illustrate various non-limiting, example, inventive aspects in accordance with the present disclosure:

FIG. 6 is of a table diagram illustrating embodiments of the present invention of an pattern of macroeconomic variables affected by an economic event;

FIGS. 11-13 are of a logic-flow diagrams illustrating embodiments of the present invention of fundamental Wavefront development;

FIGS. 14-20 are of an information topology and flow diagrams illustrating embodiments of the present invention of a valuation Wavefront;

FIG. 21 is of an logic-flow diagram illustrating embodiments of the present invention to build a trade;

FIGS. 22-25D are chart diagrams illustrating embodiments of the present invention exemplifying the building of a trade;

FIG. 26 is of a table illustrating embodiments of the present invention summarizing analysis of a menu of macro trades;

FIG. 27 is a chart diagram illustrating embodiments of the present invention exemplifying the reading of the market;

FIG. 31 shows one version of an economic scenario, in which GDP growth rises 0.5% but interest rates remain stable;

FIG. 32 revisits the menu of alternative trade implementations designed to exploit a growth view;

FIG. 33 shows a stronger consumer spending outlook that takes place in an environment where growth is unchanged;

FIG. 34 highlights the risk/reward metrics relative to the pure consumer case;

FIG. 36 shows the expected returns of FIG. 33;

FIG. 37 sets out a macro scenario in which oil prices rise, driving growth lower;

FIG. 38 shows three ways to trade the macro scenario in FIG. 37;

FIG. 39 looks across the risk/reward metrics;

FIG. 40 shows a scenario that represents a "pure" rates scenario;

FIG. 41 compares the various implementations with significant variation across different implementations;

FIG. 42 shows a Wavefront Foreign Growth Basket designed to allow investors to exploit the economic scenario portrayed therein;

FIG. 43 compares foreign growth using trade performance metrics;

The leading number of each reference number within the drawings indicates the first figure in which that reference number is introduced. As such, reference number 101 is first introduced in FIG. 1. Reference number 201 is first introduced in FIG. 2, etc.

DETAILED DESCRIPTION

The Wavefront system improves upon equity design and trade tools. Part of the approach is a linked set of models called Wavefronts, which describe how economic shocks ripple through the economy into company performance, market value and equity returns in the US market. In one embodiment, the modeling may be viewed as having three parts. The first converts an economic shock into a comprehensive set of shifts in the economy. The second takes those economic shifts and drives them into company fundamentals. The third values those fundamentals based on what the market normally pays. As a consequence, the Wavefront system enables mapping of economic views and risks into predictions of what the market will pay for changes in those views and risks; the Wavefront system also enables the identification of industries and companies that will over and under-perform based on its mappings. The Wavefront system allows for and results in the construction of more risk-efficient portfolios.

Wavefronts

Figure 1:
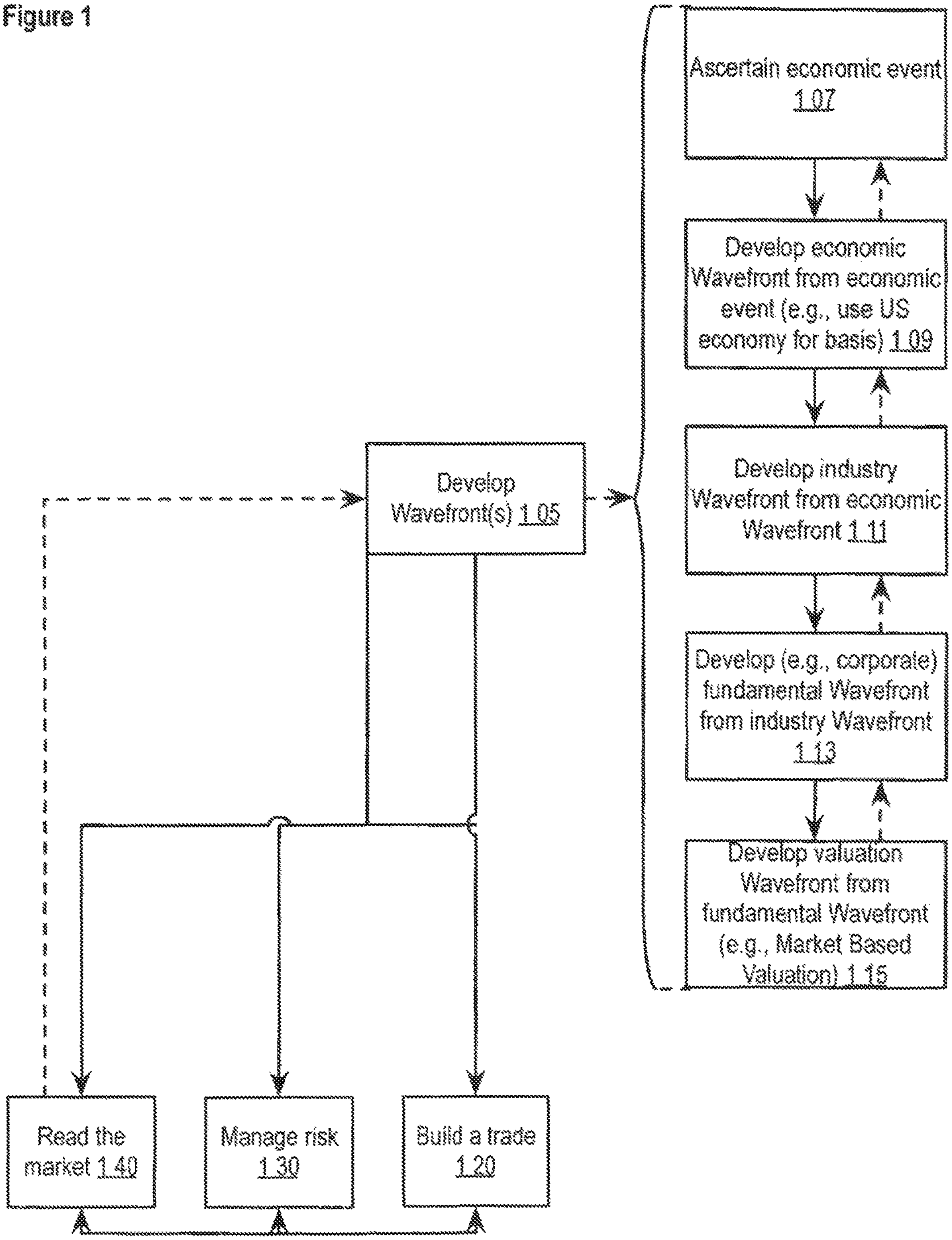
FIG. 1 is of an information and logic flow diagram illustrating embodiments of the present invention of a disclosed Macroeconomic Equity Investment Design and Trade System.

FIG. 1 is of an information and logic flow diagram illustrating embodiments of the present invention of a disclosed Macroeconomic Equity Investment Design and Trade System. This overview of the system shows that the Wavefront system provides four interactive components that build upon themselves and allow for iteration. In general, the Wavefront system comprises the development of a Wavefront model 105, from which a financial trade may be built 120, risk (e.g., of a portfolio) may be better managed 130, and any number of markets may be more accurately read 140. In one embodiment, upon obtaining a better read on the market, such results may be used iteratively to further develop new Wavefronts 105.

In one embodiment, a Wavefront may be described as an economic model mapping the effects of macro-economic events into micro-economic firm valuations. In one embodiment, such a Wavefront model is determined by: (1) ascertaining an economic event 107, (2) developing an economic Wavefront from the economic event 109, (3) developing an industry Wavefront from the economic Wavefront 111, (4) developing a fundamental Wavefront from the industry Wavefront 113, and developing a valuation Wavefront from the fundamental Wavefront 115. Although in many instances, investors will choose to determine company valuations on the basis of some macro-economic event 107-115, the inverse operation may be performed and a Wavefront may be used to map back from corporate valuations to macro-economic events 115-107. In this inverse embodiment, certain fundamental indicators that affect valuation may be used to uncover otherwise unnoticed economic events.

Figure 2:
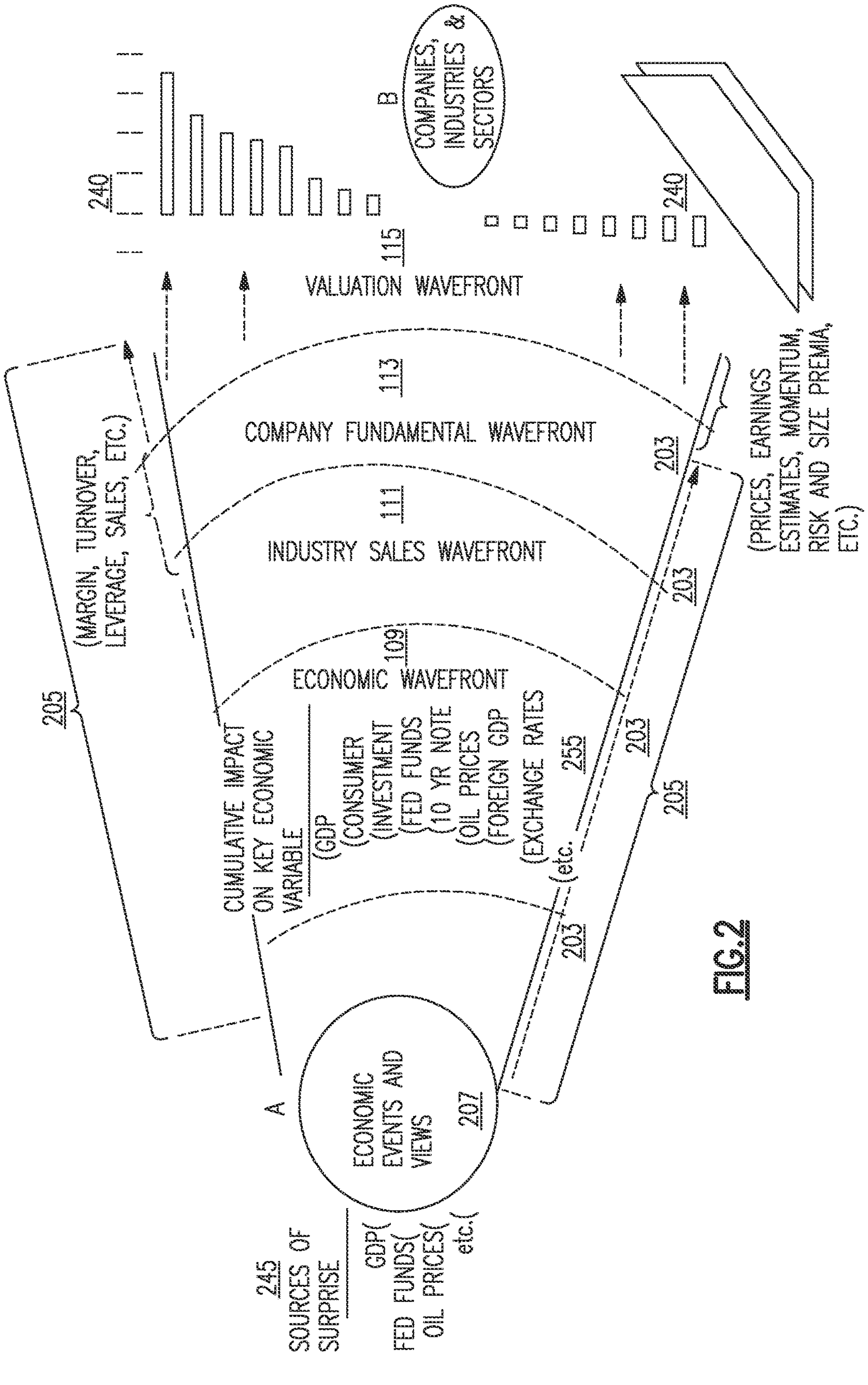
FIG. 2 is of an information topology and flow diagram illustrating embodiments of the present invention of a Wavefront.

FIG. 2 is of an information topology and flow diagram illustrating embodiments of the present invention of a Wavefront model. In this embodiment, the Wavefront system is illustrated in greater detail in a special arrangement where the Wavefront is modeled in segments. In one embodiment, five cascading model segments comprise the Wavefront. The segments include: (1) an economic event 207, (2) an economic Wavefront 109, (3) an industry Wavefront 111, (4) a (company) fundamental Wavefront 113, and (5) a valuation Wavefront 115 (i.e., the entirety of these five segments resulting in the valuation Wavefront, which maybe referred to, simply, in toto as "Wavefront").

For ease of cognition, the Wavefront is likened to a water rippling through a pond. The pond itself represents the economy. An economic event is likened to a rock hitting the water of a pond. Just as a rock disturbs and shocks the water of a pond, so does an economic event create Wavefronts that ripples and spreads through an economy. As such, Wavefronts summarize the (economic ripple) pattern 203 of how a particular economic event 207 spreads 205 across trade and industry segments 109, 111, 113, 115 as an economic Wavefront 109 through to industry 111, out into company fundamentals 113, which affect perceptions of market value 115, and which in turn flow into and affect stock and/or investment returns 240 in various company and industry sectors 250. In short, an economic shock that creates ripples through the entire economy may be described as an Wavefront, and in turn, the Wavefront can describe the effects of its wake as between any economic events 207 (points A 207) and company and industry sectors (points B 250).

Each crest 203 in the Wavefront acts as a cause to affect trade and industry segments 109, 111, 113, 115, 250. As such, the Wavefront and trade and industry segments are inter-linked. For example, a valuation Wavefront 115 might show the pattern 240 of expected returns across industries in response to a 1% upward revision to expectations of GDP growth 245, which acts as the source of the economic event 207.

Figure 3:
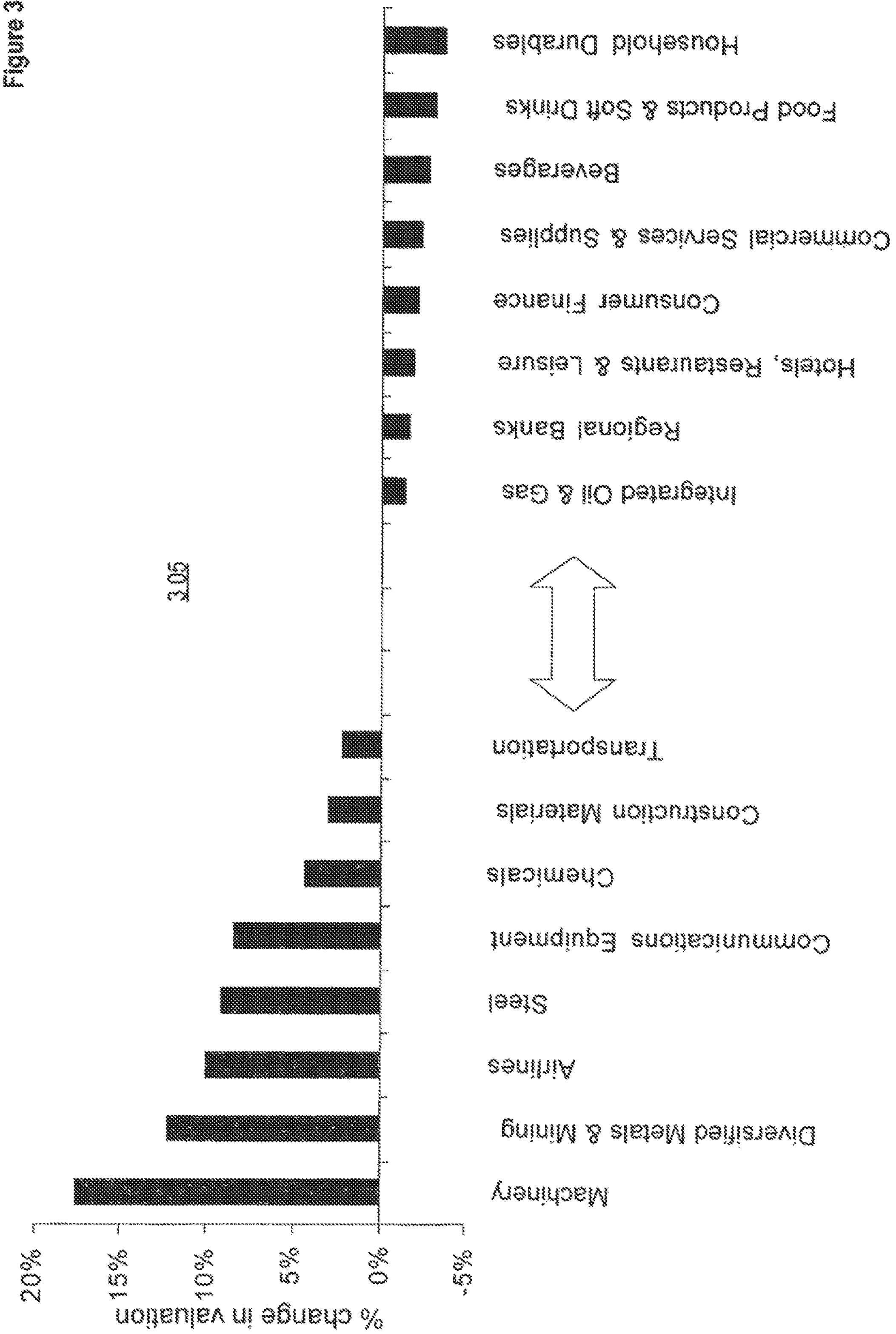
FIG. 3 is of a chart diagram illustrating embodiments of the present invention to show the valuation impact of an economic event.

FIG. 3 is of a chart diagram illustrating embodiments of the present invention to show the valuation impact of an economic event. Continuing the example of FIG. 2 of a 1% upward revision to expectations of GDP 245, FIG. 3 expands the detail and thus illustrate the impact of the surprising economic event 207, 245 on the valuation of various companies, industries, sectors, and/or the like 250, 305. In this example the Wavefront system shows that the economic event caused a valuation Wavefront 115 of FIG. 2 to change the valuation in Machinery, Diversified Metals & Mining, Airlines, Steel, Communications Equipment, Chemical, Construction Materials and Transportation sectors positively. Similarly, the Wavefront system determined that the economic event caused a valuation Wavefront to affect the valuation in Integrated Oil & Gas; Regional Banks; Hotels, Restaurants & Leisure; Beverages; Food Products & Soft Drinks; and Household Durables negatively.

It should be noted that just as different waves with different origins may overlap in a pond, the interaction between different economic shocks and their Wavefront consequences build on each other. As more shocks occur, an equity market's movements become a pattern of Wavefront cross-currents. As will be discussed below in greater detail, the Wavefront system is designed to help analyze and navigate these complicated Wavefront cross-currents. As such, Wavefronts (like ripples in a pond) are scalable and additive. Complicated economic scenarios (for instance combining currency, interest rate, and oil views) can be treated as the weighted sum of the economic Wavefronts stemming from a shock 207 that affects various economic variables 255 such as currency, interest rates, and oil prices. Even structural change within the economy can be treated by combining the appropriate Wavefronts.

Economic Events

As was illustrated in FIG. 2, an economic event may be any one or more of a broad array of macroeconomic variables 245, 255. Examples of macroeconomics variables include: 10 year notes, capacity utilization, consumer, corporate rates, Consumer Price Index (CPI), consumer spending, currencies (e.g., the dollar), employment, exchange rates, federal funds, foreign gross domestic product, Gross Domestic Product (GDP), growth rates (i.e., of any of these variables), industrial production, interest rates, investment, oil prices, productivity, price to cash earnings (PCE), wages, etc. The economic event is where a given one or more of the macroeconomic variables departs from its expected level or value at and/or for a given time. For this reason, an economic event is said to be surprising or a shock relative to what was expected (i.e., an economic shock or economic surprise). In an alternative embodiment, the departure in macroeconomic variables from expected levels is not actual, but theorized by an investor, portfolio manager and/or the like. In yet another embodiment, the departing macroeconomic variable is determined by inversely following a Wavefront as discussed in FIG. 1, working back from corporate and/or industry indicators, e.g., annual earnings reports for a given corporation and/or sector. Regardless of how it is chosen, once a departing economic variable (or set of variables) is selected, the investor is said to have formed a "view" where at some point in time there will be a departure from expected values by some chosen subset of macroeconomic variables. Of course if the investor selects an actual macroeconomic variable that has surprisingly departed from estimates, the point in time of the departure is known. As will be discussed in greater detail below, such departures in a subset of variables will affect other macroeconomic variables.

Linking Macro Events to Equities

Macroeconomic views are fundamental drivers of relative performance within equity markets. Linking macroeconomic views to equity market outcomes is a notoriously difficult task. Economic events are complex. Changes in one part of the economy affect many other parts and affect company performance and valuations through a range of channels. As such, portfolio managers may develop a view that the economy is different from what they believe the market expects. Any of these differing views may encompass, involve, predict, be a source of, result in, and/or otherwise be a surprising economic event 245. Examples of the types of differing views a portfolio manger might development include views where: growth expectations are likely to sour; oil prices are going to fall; the market is overestimating domestic growth but underestimating foreign growth; or some combination of all of these. Such differing views may raise numerous questions that the portfolio manager will need to answer, however, there have been no effective tools to help them assess the effects of these differing views on the market. Portfolio managers may benefit from tools to let them make assessments regarding their various differing views, such as: How should they position a portfolio to exploit this view? What other risks are created by positioning that way? What are the risks to the other trades in the portfolio? And has the market already been trading this theme?

Linking Tool

Figure 4:
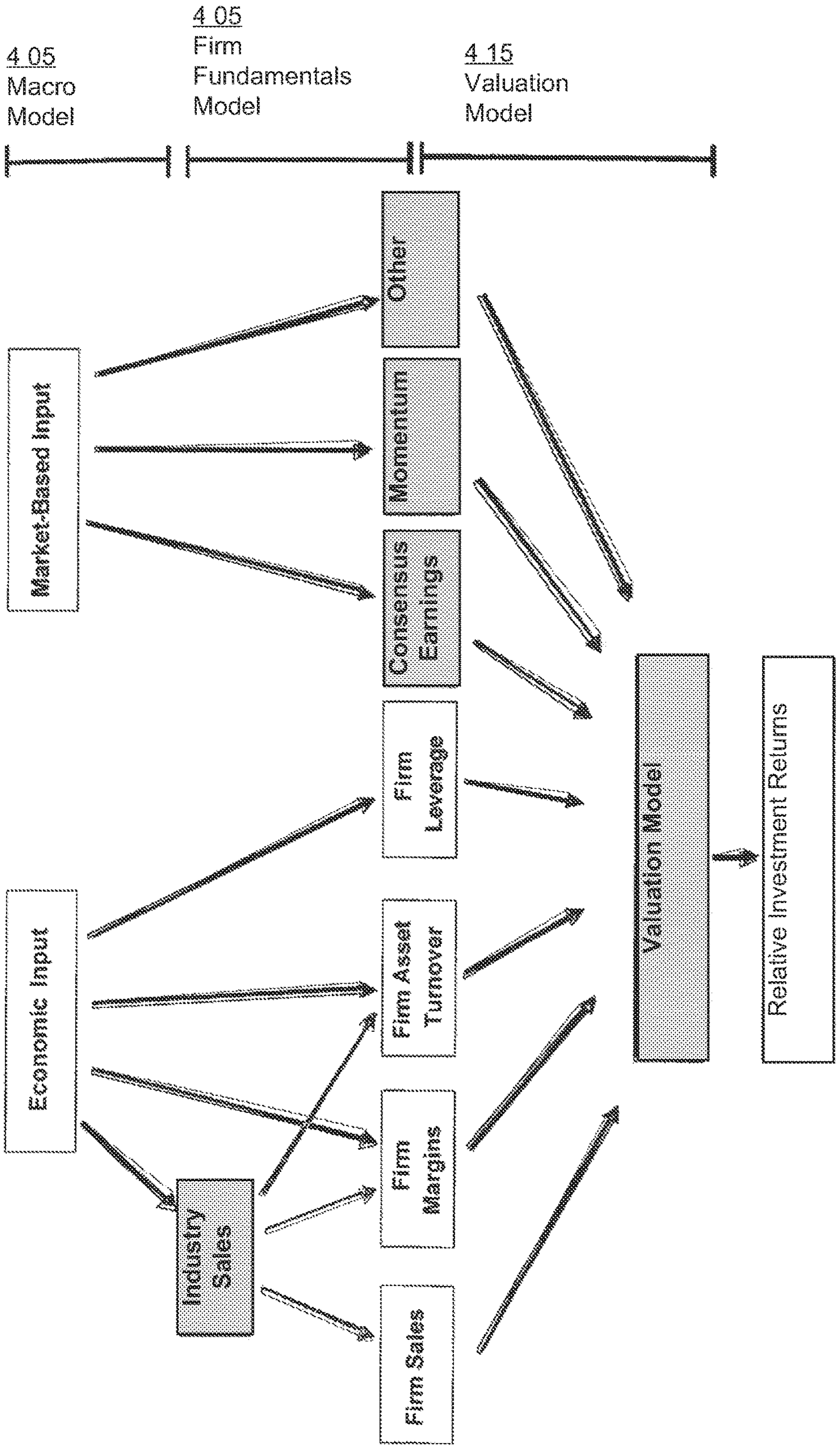
FIG. 4 is of a data-flow diagram illustrating embodiments of the present invention to link developments in an economy to performance and value of sectors, industries, and/or companies.

FIG. 4 is of a data-flow diagram illustrating embodiments of the present invention to link developments in an economy to performance and value of sectors, industries, and/or companies. Although traditionally making connections between economic views and market outcomes has vexed investors, the Wavefront system provides tools allowing investors to make these links. In one embodiment, the link from an economic event and/or view and outcome can be shown using three sets of interlocking models 405, 410, 420 that link developments in the US economy to the performance and value of more than 2,200 currently active companies across 59 industries, based on the experience, which are stored in the Wavefront system database as will be described in greater detail in FIG. 45.

The first—a model of the US macro economy—converts a view on a particular economic shock (an oil price spike, for instance) into a comprehensive set of changes in all the major economic variables that affect company performance 405. This is the move between the economic event 207 into the economic Wavefront 109 of FIG. 2.

The second—a set of industry and company models—takes those changes in the economic outlook and drives them into the fundamentals of industry and company performance, particularly the key elements of Return on Equity (ROE) 410. This is the move between the economic Wavefront 109 into the industry Wavefront 111 and through the fundamentals Wavefront 113 of FIG. 2.

The third—a valuation model—values those shifts in company performance, setting out what the market is likely to pay for the changes to the outlook. This valuation technique is called Market Based Valuation 415. This is the move from the fundamentals Wavefront 113 to the valuation Wavefront 115 of FIG. 2.

As such, the Wavefront acts to unify these interlocking models 207, 109 of FIGS. 2 and 405; 111, 113 of FIGS. 2 and 410; and 115 of Figure and 415. This unification allows the Wavefront system to improve upon traditional systems. Some advantages include: multidimensionality—the Wavefront system can distinguish between economic events that look similar—a rise in bond yields for instance—but have different underlying causes—growth improvement versus Fed tightening; flexibility—the Wavefront system can isolate the impact of different shocks, allowing investors to think about scenarios that have never occurred or to control for factors that they believe will be different; By modeling down to the company level, the Wavefront system can aggregate baskets of companies into many different kinds of indices or groups to analyze the effect on their performance; comprehensive—the Wavefront system allows investors to look not just at the impact of a scenario but at the risks and exposures to that view.

Wavefront Construct

While the above sections of the disclosure provided a general overview of Wavefronts and some of their uses, what follows details the construction of Wavefronts. To that end, it should be noted that Wavefront models allow you to construct baskets having risk specific factors and that Wavefronts provide cross-sectional insight rather than just time-series correlations. Details of the Wavefront segments discussed in FIGS. 1 and 2 follow.

Economic Wavefront

Figure 5:
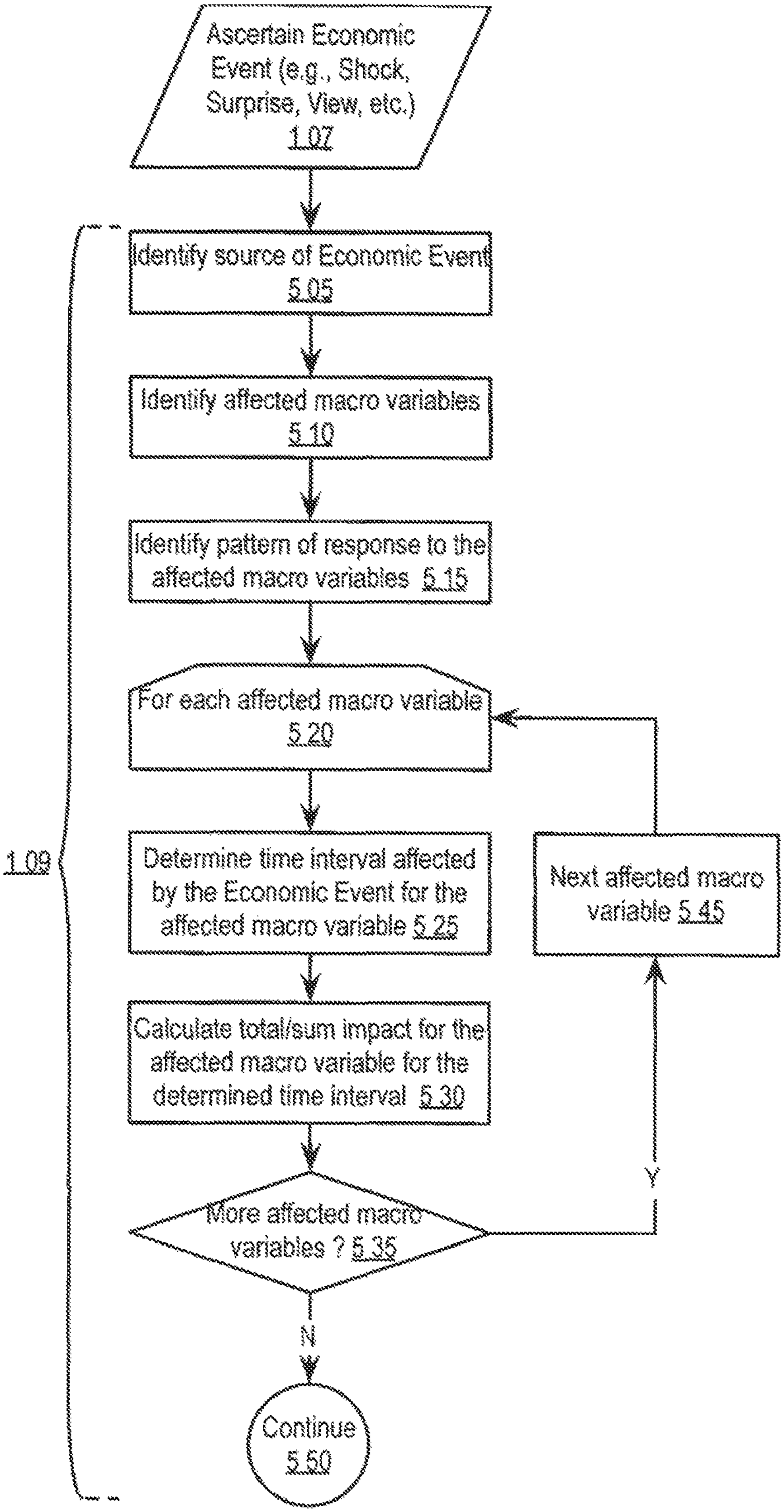
FIG. 5 is of a logic-flow diagram illustrating embodiments of the present invention of economic Wavefront development.

FIG. 5 is of a logic-flow diagram illustrating embodiments of the present invention of economic Wavefront development. As has already been discussed in FIGS. 2 and 3 above, an economic event is ascertained in the development of the Wavefront 107 of FIG. 1. Thereafter, the Wavefront system develops an economic Wavefront 109. In so doing, the Wavefront system identifies the source of the economic Event its database after it is provided 107. The economic event may be provided as an entry in a spreadsheet field, in a database, and/or the like where a computational engine may make use of various mathematical facilities and access, retrieve, and process the Wavefront system related data. In one embodiment, the placement of a value in a designated field entry will determine the type of economic variable that is designated to be the economic shock. For example, any value entered in a spreadsheet with a label of "GDP" will be deemed to be a GDP value. In an alternative embodiment, values may be entered in a tokenized form that includes the variable type and value; for example as an XML tokenized stream that may be parsed by the Wavefront system. In yet another embodiment, specific fields are provided in a database table wherein entry and/or designation of the economic event may be entered. Upon obtaining the economic event entry 107, the Wavefront system may identify it by looking up that type of economic variable in a macroeconomic variable table in the Wavefront system database and also retrieve any associated and/or expected value for that type of economic variable 505. For more details regarding the Wavefront system database and its tables, please see 4519 of FIG. 45. Thereby the Wavefront system can compare the provided macroeconomic event with an expected value (retrieved from its database) for that type of macroeconomic variable and determine a delta as between the two values So continuing the above example where a user enters a GDP value, a delta is determined between a portfolio manager's current view of GDP provided to the Wavefront system and the retrieved and expected value in the Wavefront system database. This delta in conjunction with the type of macroeconomic variable provided to the Wavefront system (i.e., in this case a difference between the portfolio managers view of GDP and an expected value for GDP) may act as a key to search the Wavefront system database for a pattern of responses to this economic view by other macroeconomic variables. In one embodiment, the Wavefront system maintains a table of patterns of affected macroeconomic variables 4519 of FIG. 45.

Momentarily moving to FIG. 6, it is of a table diagram illustrating embodiments of the present invention of a pattern of macroeconomic variables affected by an economic event. These tables list 605, 610 observed correlations as between a delta from expected values 630 of an economic event 620 and the delta's effect on other macroeconomic variables 625. So for example, a 1% increase in real GDP 630 is an economic event that affects a pattern of other economic variables 625 where federal funds increase 0.9%, oil prices increase 0.1%, 10 year notes increase 0.5%, foreign exchange increases 2.3%, etc. 635. This multidimensional correlation of impacts by an economic event onto other macroeconomic variables is generated through recording historical deltas and it results in a pattern of delta values for the macroeconomic variables affected by any given economic event.

Another closer view of the tables 605, 610 highlights several notable aspects regarding the correlations and resulting affecting patterns. First, the database table tracks numerous observed deltas 620. There are numerous levels of granularity that may be tracked regarding these deltas. In one embodiment, statistical analysis determines what delta size results in appreciable effects on impacted macroeconomic variables 625 and is the basis for determining the granularity of the deltas 620 (e.g., if correlation analysis shows that 1% delta variances are the smallest variances that cause appreciable deltas on impacted economic variables 625, then a 1% delta would be a granular increment for the deltas). In another embodiment, a set or fixed increment is used (e.g., 1% intervals of change from −100 (or less) to 0 to 100% or more). Another notable aspect is that the Wavefront system database table tracks the impact on a given delta in multiple contexts—in that way the table is multidimensional. For example, the impacts may vary for a given delta based on the time of year. For example, in January a 1% increase in real GDP may result in a 1.1% increase in federal funds 655 while resulting in only a 0.9% increase in federal funds in July 656. Numerous other factors may increase the number of dimensions (e.g., war/peace time). Similarly, the granularity of time and other dimensions may also be varied. A third notable aspect is that some deltas have no appreciable impact on other economic variables. For example, a positive 1% delta in federal funds in either January 670 or July 675 results in no appreciable affect on oil prices 677. In one embodiment, where there is no appreciable affect by an economic event on a given economic variable, then that economic variable is not part of the affecting pattern. In another embodiment, a 0% impact is part of the pattern and said to be an effect and is used in computations—this can make a difference when weighting the effects of multiple overlapping Wavefronts in various linear algebra and other computations.

In one embodiment, 36 macroeconomic variables make up an affected pattern for any given economic event 640. The pattern 640 shows an excerpt of 19 such variable elements, where each of the elements are equally weighted, however, the weightings may and often do vary. In one embodiment, these correlation tables are generated by tracking variances in economic variables and statistically analyzing each variable for correlations based on its changes over time to the changes in other economic variables. Numerous modes of running averages may be used as a basis for building such a table. In one embodiment, the running averages are computed over a specified interval. For example, statistical correlations with economic events 620 are based on a running average impact on other economic variables 625 over a two to three year period. In such an example, the impact pattern values 635 for a given economic event 620 represents an impact having duration of two to three years. In such a scenario, a 1% increase in GDP 630 would increase oil prices by 0.1% for two to three years.

Moving back to FIG. 5, upon identifying the source of the economic event 505 by looking up the appropriate type of macroeconomic variable in the Wavefront system database, the Wavefront system will then identify a pattern of macroeconomic variables affected by the economic event by looking them up in the Wavefront system database 510 as has already been discussed, above, in FIG. 6. In so doing, the Wavefront system may retrieve a pattern of responses from its database for the affected macroeconomic variables 515 as has already been discussed, above, in FIG. 6.

For each macroeconomic variable affected 520 by the economic event 107, the Wavefront system determines the duration of impact for the affected macroeconomic variable 525. In one embodiment, the Wavefront system determines the duration of impact by querying its database and retrieving associated durations for the macroeconomic variable as already detailed in FIG. 6. In one embodiment, the Wavefront system makes a query selection on the basis of an impact that spans specified interval. For example, an economic impact may be specified as having a delta that will persist for 2 years. Furthering the example, if the Wavefront system database has economic variable values with impact durations of two years, the Wavefront system may query its database to aggregate affects on economic variables over a longer time, and sum the aggregate values to yield a total impact for the necessary and/or specified duration 530. The Wavefront system will check if there are more macroeconomic variables that are affected 535. If there are more impacted macroeconomic variables 535, the Wavefront system will iterate 520 and continue with the next affected economic variable 545 that was identified 510, 515. Once all the impacted macroeconomic variables are exhausted and there are no more impacted variables 535, the Wavefront system established that an economic surprise had an average incremental impact on a broad array of macro variables. In so doing, the Wavefront system finished developing the economic Wavefront 109 because the Wavefront system linked the resulting pattern of responses of other macro variables that typically occur as a result of an economic surprise 550 with the source of that economic surprise 107. In the above embodiments, that link was established utilizing a multi-equation model of the US economy (for example, the Fed. Model), however, other economies may be employed in alternative embodiments.

In using the US economy as a basis, several advantages have materialized. This model allows the Wavefront system to trace the impact of a surprise or shock to one economic variable into a set of changes across the whole economy. The examples in FIG. 6 illustrate how this works. For example, a positive surprise to expectations of real GDP is associated with higher interest rates, a flatter yield curve and a stronger dollar 605. A surprise spike in oil prices is associated with lower GDP, lower interest rates and a steeper yield curve 605. Although only the major variables are shown, in practice most variables in the model respond to any given surprise. Because the impact of a shock affects the economy—and ultimately company performance—over time, the economic Wavefront reports the effect of an economic surprise not just as the initial impact on other macro variables but as the total impact over the two years in each variable resulting from the initial surprise. In other words, as FIG. 6 provides an example where if GDP is expected to be on average 1% higher over the two years 630, then this will normally be associated with a federal funds rate that is 0.9% higher on average over that period 656. In one embodiment, the Wavefront system averages over eight quarters because a high percentage of economic shocks appear to dissipate within two years. Another advantage is that the economic Wavefront captures the total incremental impact of a particular surprise across all relevant economic variables across time. This approach reflects both the forward-looking nature of the equity market and the interrelatedness of the overall economy. For the equity market, the particular timing of additional GDP over a two-year period is far less important than the total incremental earnings likely to result from the revised GDP path. Furthermore, the Wavefront system can combine Wavefronts to look at complicated series of events. By mixing the different Wavefronts, the Wavefront system can examine the impact on the economy if growth expectations were revised up, but oil price expectations fell. This allows the investor to examine a wide range of scenarios, including ones that may not have occurred in the past. Besides providing a very quick summary of the total incremental impact of a particular economic shock, this approach can be used to tailor the model to particular features of the economic environment. For example, the Wavefront system was used to uncover that the equity market views the consumer as more sensitive to interest rates than usual. This insight makes sense in light of relatively high consumer leverage and the high cash flows and healthy balance sheets of the corporate sector. To account for this, investors may examine interest rate surprises, currently, and can add in a consumer shock to reflect this feature of the current economic environment. This model provides added flexibility in interpreting the way the market will respond to shifts in economic views.

Industry Wavefront

Having mapped an economic event 107 into an economic Wavefront 109, the Wavefront system may move from the macroeconomic realm into the microeconomic. To fully move from the macro to the microeconomic, the Wavefront system needs to map the developed economic Wavefront 109 into a series of changes for company performance. Eventually, the main components of return on equity (sales, margin, turnover and leverage), will serve to make that mapping. However, the primary mapping from macro events to micro performance occurs at the industry level and is based on industry sales. As such, the Wavefront system will develop an industry Wavefront 111 from the economic Wavefront 109. One of the reasons for this industry mapping is that the relative competitiveness and size of companies may shift fairly radically over time, yet the demand for the overall industry is far more stable and relates to a fairly limited number of key macro variables, which describe the key areas of demand.

Figure 7:
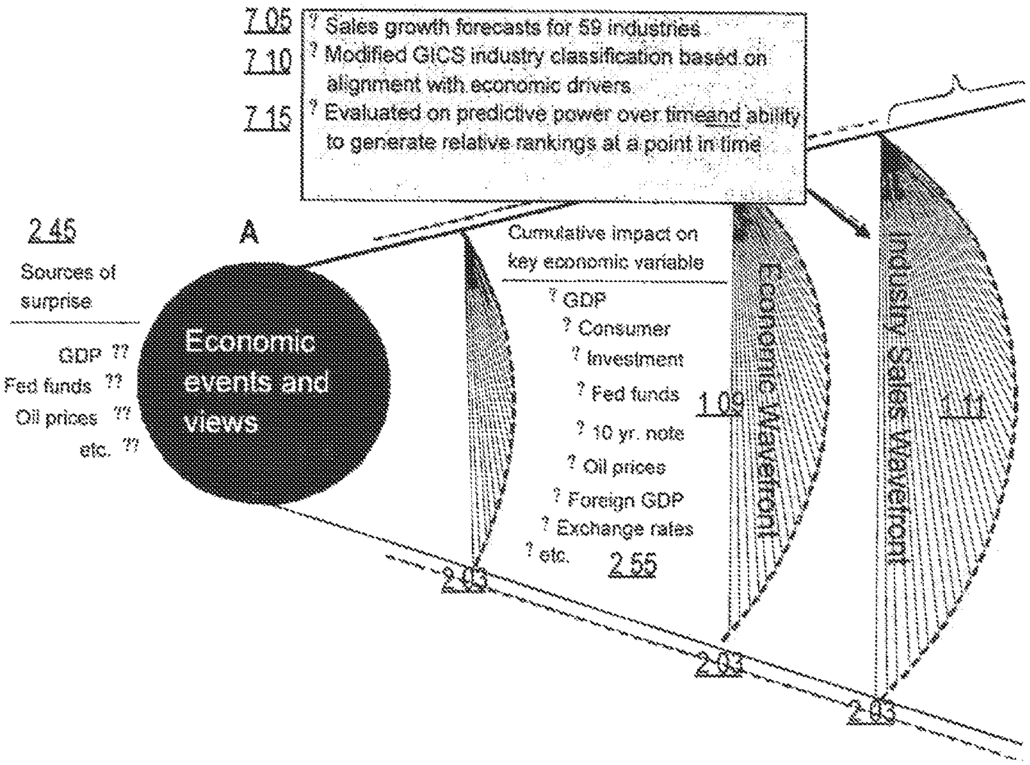
FIG. 7 is of an information topology and flow diagram illustrating embodiments of the present invention of an industry Wavefront.

FIG. 7 is of an information topology and flow diagram illustrating embodiments of the present invention of an industry Wavefront. FIG. 7 basically is a view of the developing Wavefront focusing on elements that map 705, 710, 715 the economic Wavefront 109 into the industry Wavefront 111. In general the mapping uses sales growth forecasts from a number of industries 705 by employing an industry classification system 710. The sales forecasts are evaluated on their ability to generate relative industry sales rankings over time for a given point in time 715.

In one embodiment, comprehensive modeling of the relationships between economic events 107 and the economic impacts 109 reduces the need to include a large number of economic variables in the industry Wavefront models. For example, a GDP surprise has an effect on industrial production as well as on GDP itself. Thus, the Wavefront system is able to compare the sales response to the GDP shock of two different industries even if one is modeled based on GDP and the other based on industrial production.

In one embodiment, the Wavefront system employs a Modified Standards & Poors (S&P) Global Industry Classification Standard (mGICS), wherein the codes were modified to provide better economic alignment. In particular, highly idiosyncratic industries such as apparel and footwear retail have been combined with other retail industries in a general soft goods category. Other industries with highly divergent macro drivers have been split into more coherent sub-groups. For example, REITs was split into office, residential and industrial groups.

The resulting mGICS information is detailed in Appendix 2. In one embodiment, the mGICS information is stored in an industries table in the Wavefront system database. In the embodiment in Appendix 2, the chose industry categories address the following issues:

1. Modeling companies as a group: the industry categories ensure that companies within an industry are economically cohesive enough to be modeled together.

2. Sufficient number of firms in each group: each industry contains an economically meaningful number of firms. A typical classification system often contains small groups with less than a handful of firms. Appendix 2 recombines these small groups to form an industry of greater economic significance.

3. Appendix 2 shows the industry classifications for the current constituents of the S&P 500.

In one embodiment, the industry sales are forecast on a smoothed basis (e.g., a 4 quarter percent change) using as compact a macro specification as possible in order to avoid over-fitting and to provide the optimal estimate of the average smoothed response rather the optimal point in time estimate. This forecast basis is supported by the earlier observation that the equity market prices the incremental shifts in average expectations over time rather than fundamentals at some specific point in time. The idea in such an embodiment is to generate the best estimate of the incremental impact of a macro shift on fundamentals of an industry over a given time period (e.g., the next 2-3 years). However, in an alternative embodiment, the modeling goal of generating the best forecast for next quarter also may be achieved by reducing the given time period (e.g., the next quarter).

Figure 8:
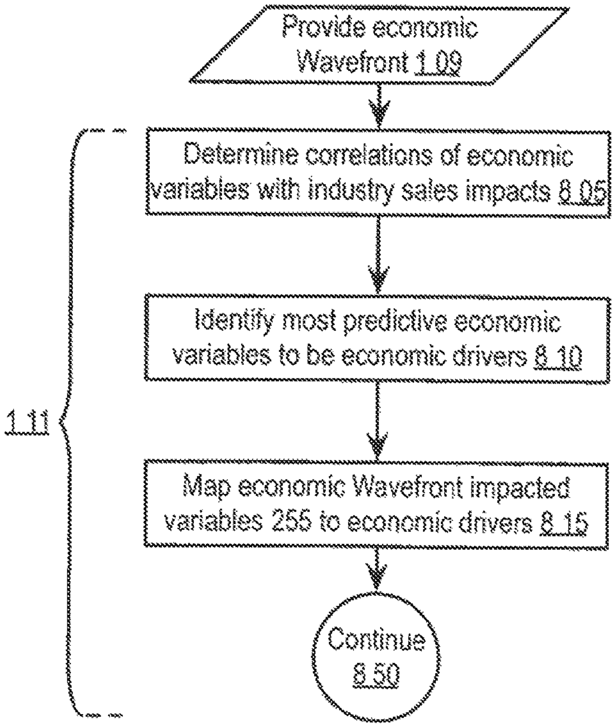
FIG. 8 is of a logic-flow diagram illustrating embodiments of the present invention of industry Wavefront development.

FIG. 8 is of a logic-flow diagram illustrating embodiments of the present invention of industry Wavefront development. As already mentioned above, the Wavefront system mapped an economic event 107 into an economic Wavefront 109. The economic Wavefront will now provide its impacted economic variables 255 of FIG. 7 as inputs for establishing an industry Wavefront 111, 805, 810, 815, 850. In furtherance of industry Wavefront development 111, the Wavefront system forecasts industry sales growth (i.e., for the mGICS industries) as a function of a range of economic drivers. Economic drivers are key economic variables that drive and/or otherwise highly correlate with sales performance for an industry. Such correlations may be determined for various industry by performing statistical analysis (e.g., regression/correlation analysis) for the multitude of economic variables and sales performance per industry 805. Examples of economic drivers include: GDP growth, industrial production growth, consumer spending, interest rates, the dollar, oil prices, etc. As such, for each industry, the Wavefront system selects economic drivers both for their economic plausibility and for their ability to explain sales performance 810. Appendix 3 details sales and valuation impacts on the basis of GDP and PCE economic drivers.

Thus, the industry mapping takes place by feeding the shifts in economic variables 815 provided/identified by the economic Wavefront 109 as inputs to the selected economic drivers 810 and, thus, create an industry Wavefront 111. As such, the industry Wavefront describes the relative responses of industry sales to that shock 850. By delineating the specific channels through which these industries are affected, with careful attention to the relative sizes of those effects, the Wavefront system is able to construct trades that emphasize exposures where the portfolio manager has the strongest views and control exposures where their views are not as strong.

Figure 9:
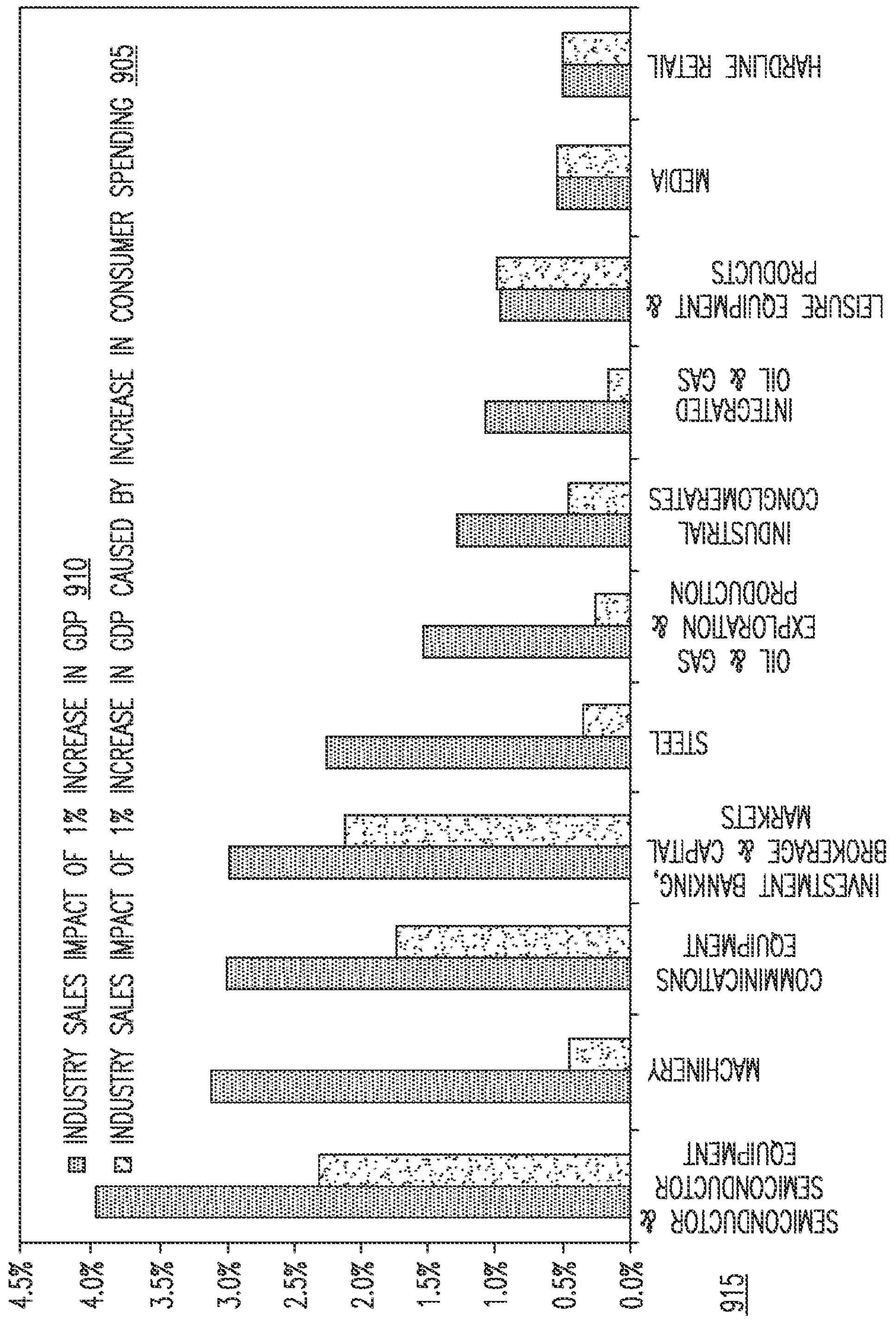
FIG. 9 is of a chart diagram illustrating embodiments of the present invention where industry Wavefronts differ for similar economic events.

In another embodiment, by modeling a relatively wide range of economic variables, the Wavefront system is able to deal with more complex economic shifts. For example, FIG. 9 is of a chart diagram illustrating embodiments of the present invention where industry Wavefronts differ for similar economic events. In the example, the Wavefront system separately identifies sensitivity to consumer 905 and investment spending 910 impacting various industries 915. The figure illustrates, models that estimate each industry's "normal" GDP sensitivity could be highly misleading in assessing relative industry performance on the basis of diverging sensitivities.

Fundamental Wavefront

Figure 10:
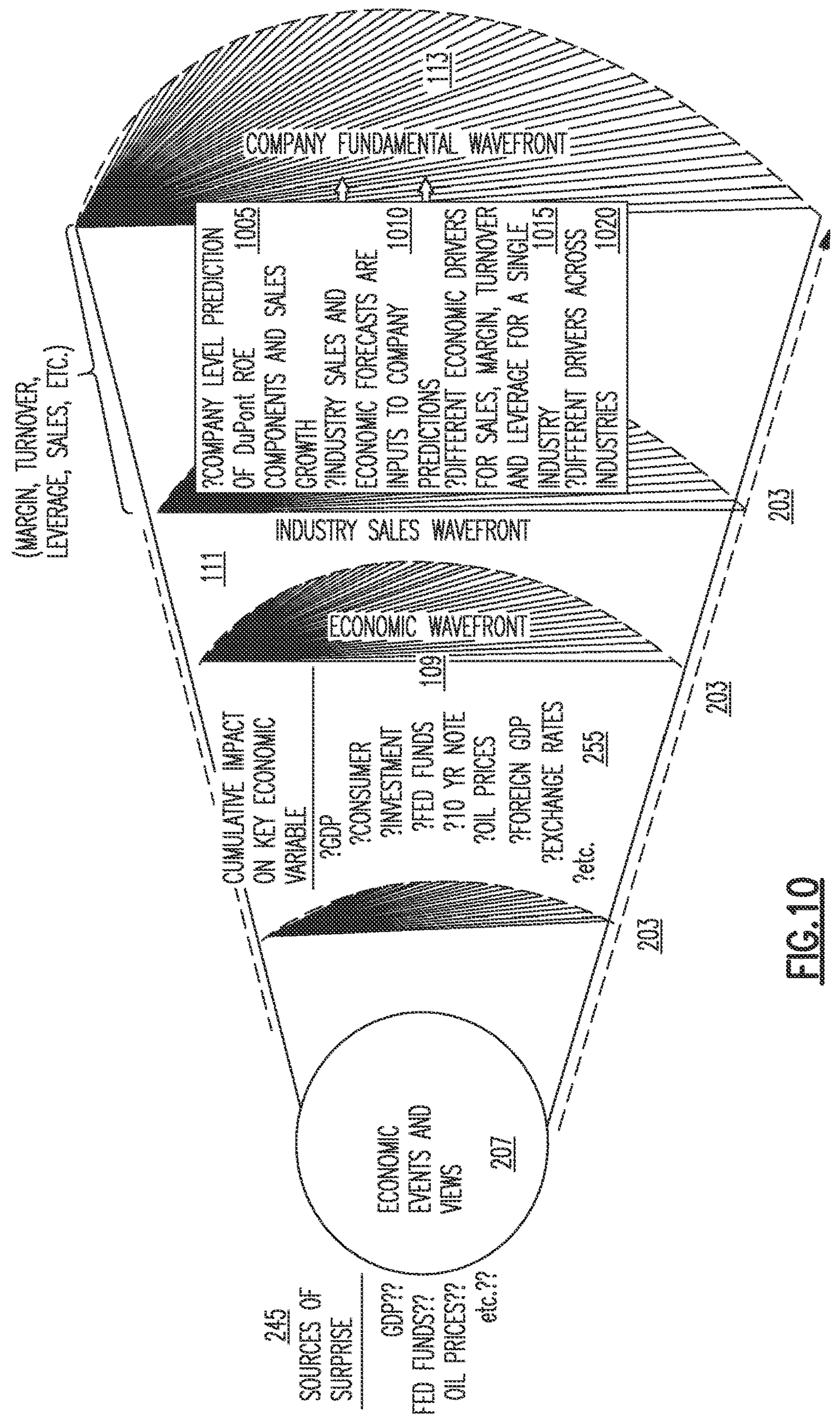
FIG. 10 is of an information topology and flow diagram illustrating embodiments of the present invention of a fundamental Wavefront.

FIG. 10 is of an information topology and flow diagram illustrating embodiments of the present invention of a fundamental Wavefront. FIG. 10 basically is a view of the developing Wavefront focusing on elements that map 1005, 1010, 1015, 1020 the industry Wavefront 111 into the fundamental Wavefront 113. In general the mapping uses industry sales and economic forecasts as inputs to company predictions 1010, company level prediction of the DuPont Return on Equity (ROE) 1005, different economic drivers for a single industry (e.g., different drivers for sales, margin, turnover, leverage, etc.) 1015, and different drivers across industries 1020.

The effect of the changes in industry sales 111 are then modeled at the company level to assess the likely impact on microeconomic variables 113. Microeconomic variables include: company sales, forecasts (i.e., for any of the microeconomic variables), margins, turnover, and leverage. This produces a set of (company) fundamental Wavefronts as shown in FIG. 10. Again, the focus is on estimating the shift in company fundamentals due to macroeconomics rather than getting the best estimate for each company.

There are several added advantages and capabilities to modeling at the company level:

1. The results of the fundamental Wavefront may be re-aggregated to any desired Wavefront level and can be used to construct custom baskets with a large variety of firm-specific or macro criteria (e.g., liquidity, dividends, etc.); and 2. The fundamental Wavefront models automatically adjust for the impact of company-specific structural changes that arise from mergers-and-acquisition activity and other balance sheet actions that can dramatically impact equity performance but do not necessarily change the economic sensitivity of the industry as a whole.

In this way, a resulting fundamental Wavefront describes likely shifts in microeconomic variables which ultimately stem from an economic surprise. The industry Wavefront results in industry sales forecasts 111. To determine impacts on the fundamental company level 113, the Wavefront system may use the industry sales forecasts 111 in conjunction with microeconomic variables that are characteristic of driving company sales (e.g., corporate sales, turnover, leverage, etc.).

In choosing which microeconomic variables and which industries provide the best forecasts, the Wavefront system may use statistical analysis tools to determine correlations as between actual and predicted industry sales growth along with a collection of microeconomic variables 1105. In one embodiment, during each quarter, the Wavefront system computes the correlation of the actual and predicted sales growth across the 59 industries listed in Appendix 3A based on a Pearson and Spearman (i.e., rank order) basis 1110. The latter measure is less affected by a single observation. This provides an estimate of how well the models will correctly assess the relative macro-related performance of these industries. As such, the Wavefront system can use the best industry sales forecast and company specific microeconomic variables to determine company margins 1115. As such, the Wavefront system finishes determining the (company) fundamental Wavefront 113, 1150.

FIG. 12 provides a summary of the process outlined above in FIG. 11, 113 with the auto industry used as an example. In the first stage 1205, consumer spending, exchange rates, and interest rates determine auto industry sales 1210. In the second stage 1115, the impact on an individual auto company's sales 1215 is derived from the industry sales forecast 1220 along with other microeconomic variable values (e.g., previous year's sale for the company, relative size of the company as compared to the industry, previous year's margins, asset growth, etc.). Finally, firm sales forecast and relative debt are combined with information on capacity utilization to forecast margins 1230.

It should be noted that in comparing different specifications, industry-by-industry goodness-of-fit tests took a secondary role to measures that emphasized the ability of the full system of models to predict relative industry movements. This reflects the idea that for generating relative value trades, models that produce the better relative forecasts are preferable to those that produce the best forecast of each company's fundamentals in isolation. This approach tends to reward consistency of approach and punish overfitting.

The results of this effort can be seen in FIG. 13 where the Wavefront system examines the quality of the cross sectional forecasts of the industry sales model given realized macro variables. As has already been noted, in one embodiment Pearson and Spearman correlations are run every quarter to provide rankings of sales forecast bases 1110. The FIG. 13 numbers are quite high by general econometric standards for these types of models, in the neighborhood of 60% in most quarters, and are certainly high enough to show that the models capture a very high percentage of the relative macro information that is available to construct profitable trades.

Valuation Wavefront

Figure 14:
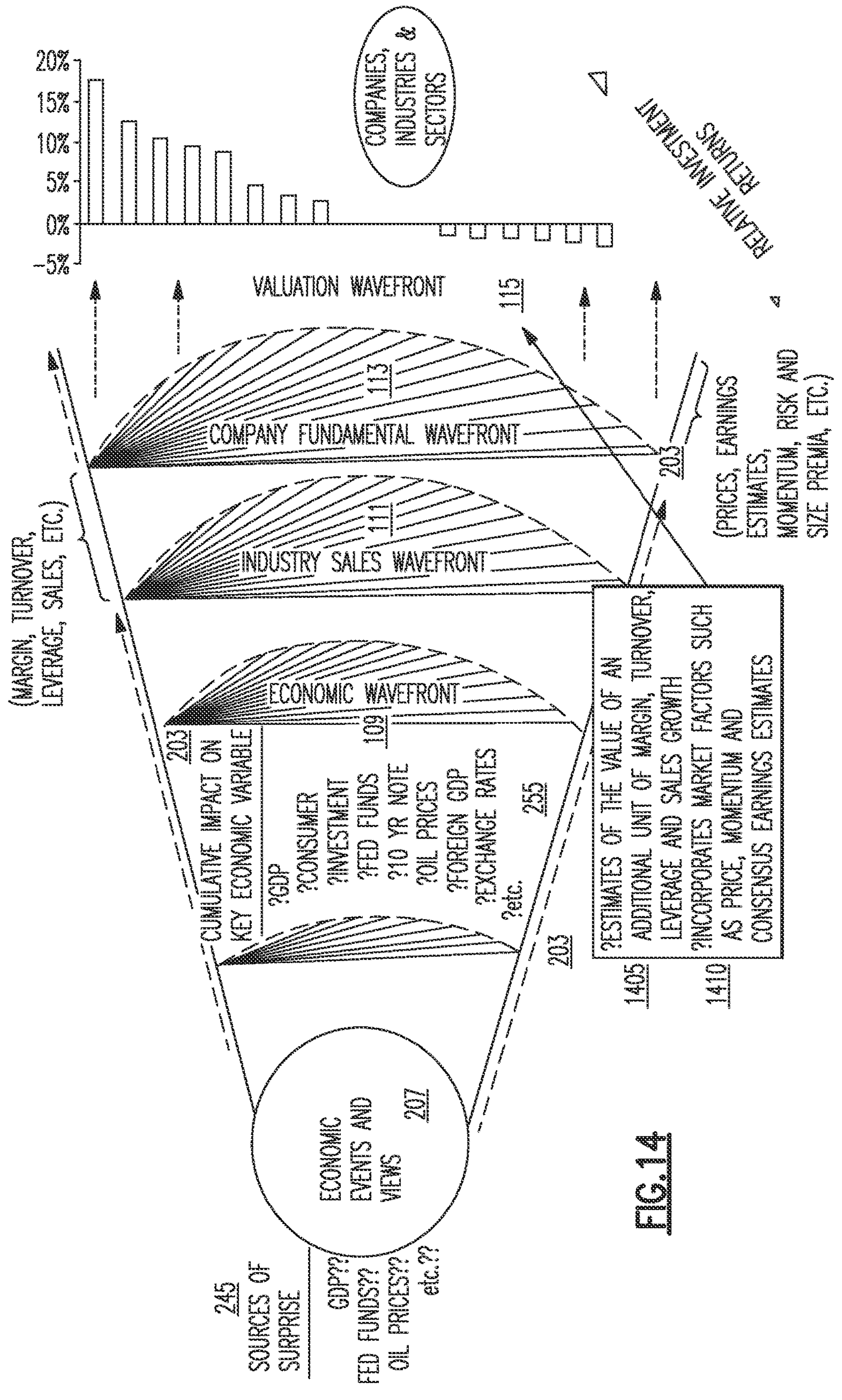

FIG. 14 is of an information topology and flow diagram illustrating embodiments of the present invention of a valuation Wavefront. FIG. 14 basically is a view of the developing Wavefront focusing on elements that map 1405, 1410 the fundamental Wavefront 113 into the valuation Wavefront 115, thereby completing the Wavefront model. In general the mapping uses: estimates of the value of an additional unit of margin, turnover, leverage and sales growth (i.e., microeconomic variables) 1405; and incorporates market factors such as price, momentum and consensus earnings estimates 1410. Here, the Wavefront system assesses how the ripple effects of economic surprises on company performance will affect the market's perception of the relative value of different stocks and sectors in constructing the valuation Wavefront.

In one embodiment, the Wavefront system uses Market-Based Valuation (MBV) 1540. One aspect of Market-Based Valuation is that valuation is driven by the relationship between observable company performance and market prices. Forecasts are included in MBV, but only in terms of observable consensus estimates. The point is that value placed on incremental sales or incremental margins is the average incremental value seen in the market for those changes over the horizon over which the incremental value occurs.

Figure 15:
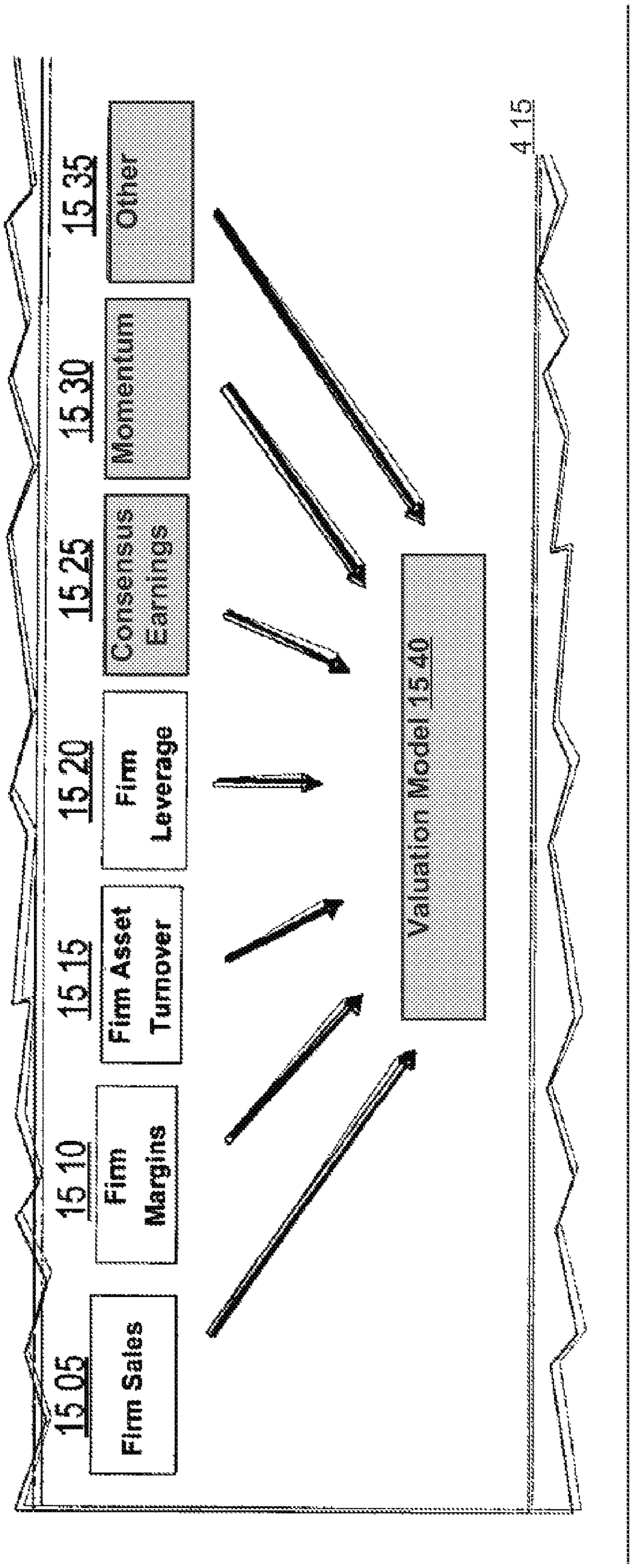

The focus is on what the market actually pays for changes in company fundamentals. FIG. 15 is the valuation model excerpt of FIG. 4, 415 and illustrates that the Wavefront system operates at the company level valuing all the observed characteristics of a company, but is based primarily on what the market pays for the Return on Equity (ROE). A feature of this approach is that the Wavefront system breaks down the components of ROE (i.e., sales 1505, margin 1510, turnover 1515, leverage 1520, etc.) and value them separately. This is important both because economic events affect companies' top and bottom lines differently and because the market does not reward shifts in each component equally. As part of the valuation model, the Wavefront system includes other factors including: observable forward estimates (adjusted consensus earnings estimates 1525); risk factors (premiums for company size and the market as a whole 1535); and price momentum 1530. This establishes a consistent valuation framework across industries and companies, whose use extends well beyond the Wavefront application presented here.

Just as the Wavefront system sales models are structured to focus on identifying relative sales performance, the valuation models are structured to identify relative value across companies. The estimates are based on regressions where long-term differences in companies are statistically neutralized and coefficients are set to optimize the cross-sectional accuracy (i.e., relative valuation). This approach is well suited to estimating the value of incremental shifts in fundamentals even across very different types of firms at different points in time.

In one embodiment, the specific MBV regression techniques are based on panel regression where long-term differences in companies are statistically neutralized and coefficients are set to optimize the cross-sectional accuracy (i.e. relative valuation). This type of regression is well suited to estimating the value of incremental shifts in fundamentals even across very different types of firms at different points in time.

For ease of cognition, the pricing of observable firm characteristics in MBV may be analogized to quant-based models that predict returns given firm characteristics, but the differences are important. A pure quant-based approach directly models the timing of equity returns. Because the market anticipates economic developments in ways that vary across episodes, the timing of when the market realizes the value that results from macro events is highly random. This means that models that focus on the timing of that recognition process may severely underestimate the total value of the macro event, because they estimate only the part of the value that typically occurs with a specific temporal relationship to the macro event. Actual traders or portfolio managers are likely to have fairly strong views on the timing of recognition (e.g., where some given theme/view X is their major focus, or the market has not recognized some theme Y and they believe the value will come later this year). As a result, for real-world usage an accurate assessment of the total value of the trade, although a timing based valuation model may be used by the Wavefront system in an alternative embodiment, the MBV approach, in many cases, is more useful.

Another modeling approach involves feeding shifts in fundamentals through a Discounted Cash Flow (DCF)-type filter to produce estimates of underlying value. Here again there are several important differences between the MBV approach and the way in which DCF models are generally applied. First, DCF approaches are too sensitive to long run growth estimates and not nearly sensitive enough to short-term deviations. They fully value even the most uncertain long-run shifts and fail to fully value the market's typical inference from short-term performance. In theory, the forecast uncertainty can be addressed with an appropriate discount rate, but in practice is a difficult problem in itself to conjure a predictive discount rate. Second, the DCF approach does not recognize that the market actually values different sources of income or cash flow and incremental cash flows in the various industries differently. Also, DCF models cannot account for observed trading patterns, such as the very real value of price momentum. So although DCF models may be used by the Wavefront system in an alternative embodiment, MBV is more flexible in dealing with such distinctions as its framework values the components of ROE separately.

Valuation Evaluation

Figure 16:
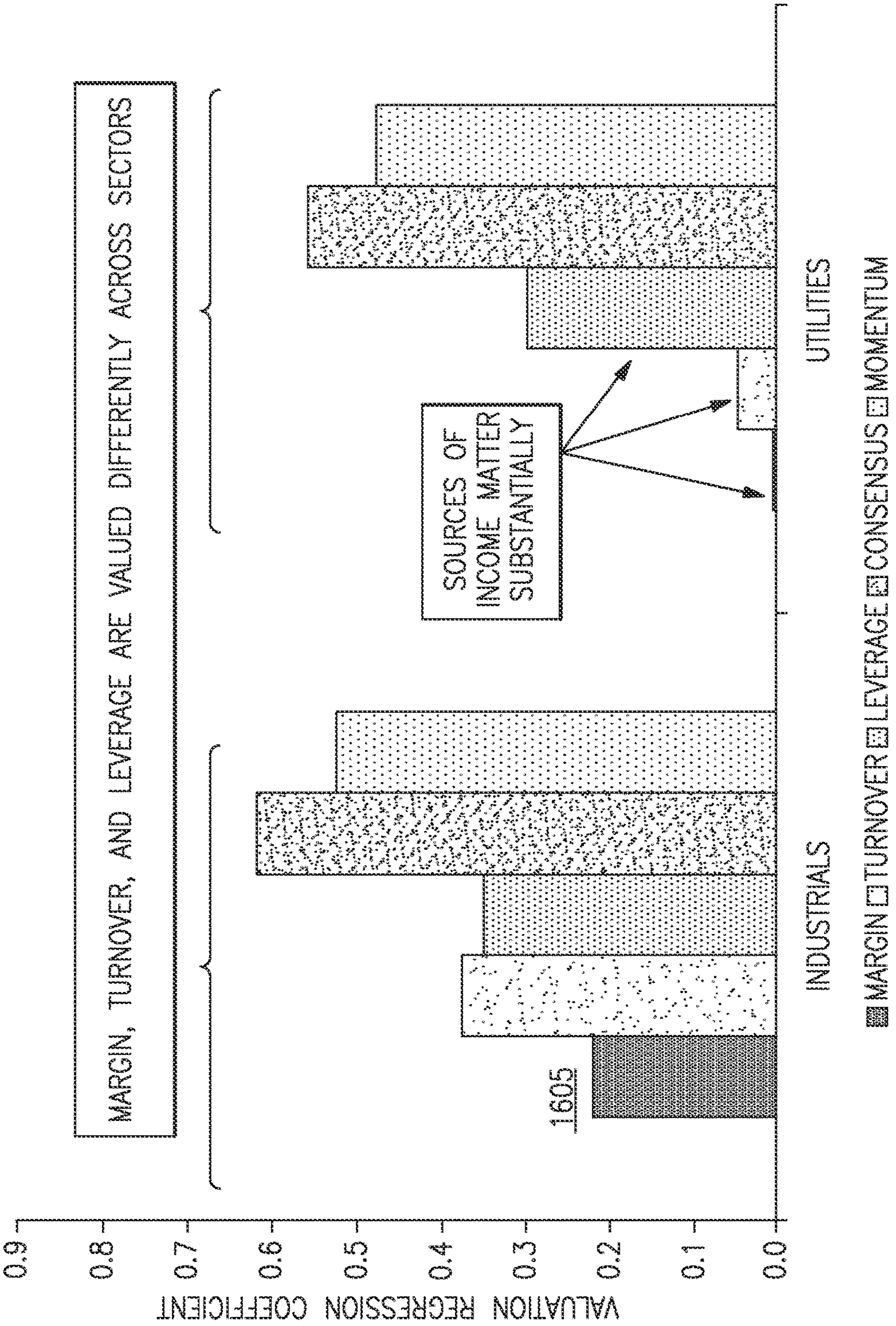
Figure 17:
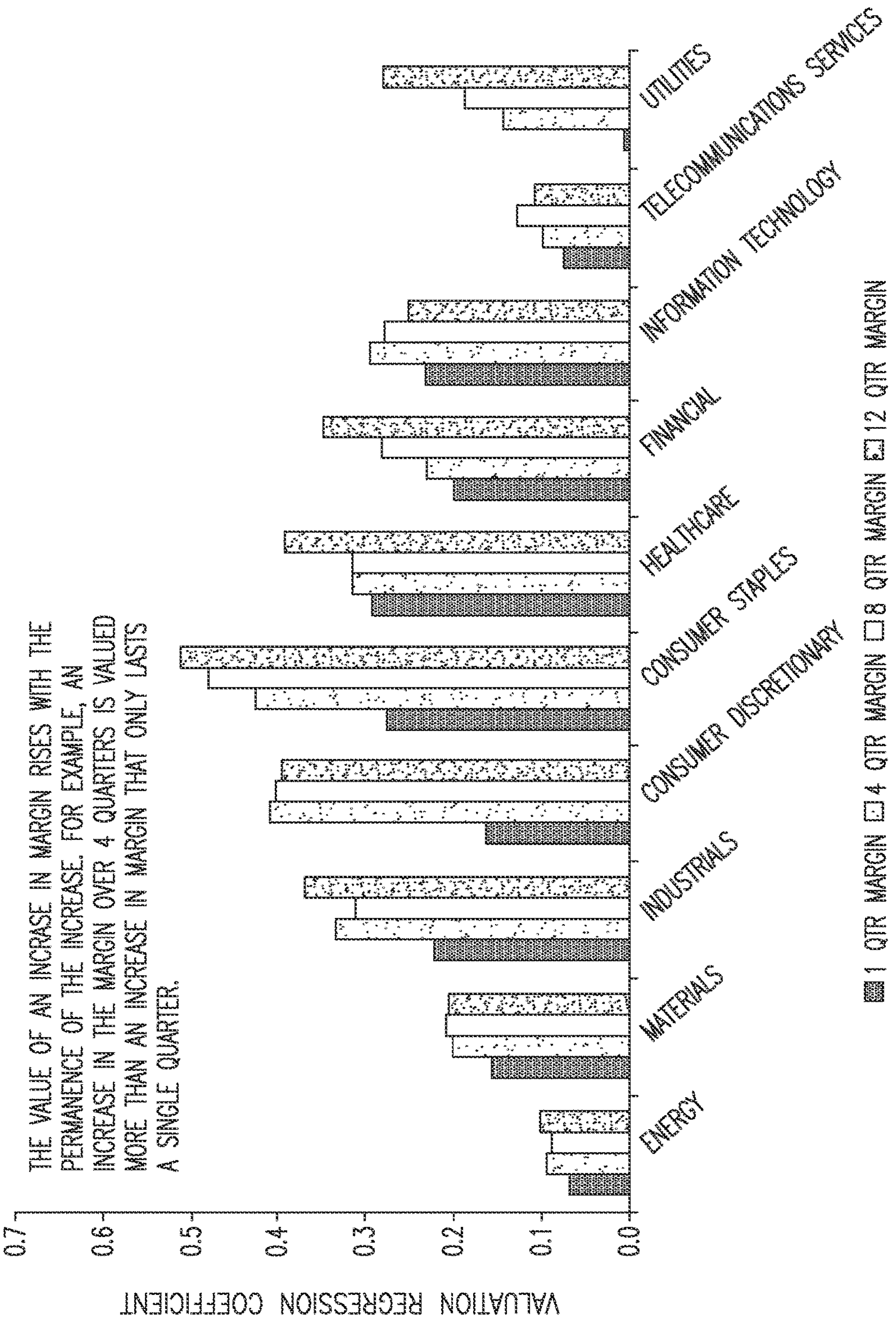

To provide some quantitative feel for the coefficients of these valuation models, FIG. 16 shows a breakdown of how the market values company fundamentals in two sectors of the market. The coefficients can be interpreted as the incremental value in percentage terms of a 1% increase in the observed fundamental. In other words, a 1% change in margins (or by implication a 1% increase in earnings), holding all else constant, would imply a roughly 0.2% increase in the value of a company 1605 in the industrials sector but has negligible impact on the value of a utility company. One interpretation of these differences is that the market will pay more for shifts that are more likely to prove persistent. FIG. 17, which shows the value of incremental changes in margins for different sectors at different horizons, supports this interpretation. The market tends to pay more for increased margins in more stable industries than highly variable ones. The differences become less pronounced as the horizons are extended. Industries with highly variable short-term margin such as utilities (where weather plays a major short-term role) see a greater increase in the market's willingness to pay for improved margins as the horizon is extended, than those where there are fewer short-term disturbances, presumably because the information from improving margins increases.

The Wavefront system's valuation models show good performance under several different measures. The R-squared measures shown in FIG. 18 are quite high, indicating that these models capture most of the sources of differences in the relative valuations of companies over the sample. An additional way to demonstrate the model's performance is its ability to pick stocks. FIG. 19 shows the results of monthly rebalancing a 100 stock long-short portfolio based on the Wavefront system's valuation signal for a sample of the largest companies (e.g., with a market capitalization above $250 million). The first row of the trading back-test shows that the ROE 1905, consensus earnings, and price momentum contain quite high value—in the sense of reasonable excess returns and Sharpe ratios—even if all of the information is historical (i.e. even without a view on the economic or industry outlook beyond consensus earnings). The historical annualized returns are 12.5% in the full sample of firms with a market cap above $250 million and 6.8% in the sample of S&P 500 firms. The difference is due partially to the difference between companies in the sample, but mostly due to selecting 40% of the names in the S&P 500, 100 long and 100 short, while selecting fewer than 15% of the larger samples. Like most quantitative models, MBV generates higher returns when picking more extreme stocks. The MBV approach focuses on detecting relative value in a way different from other approaches and this may be something we explore further. Row 2 1910 shows the back-test results for a sample of firms that are still actively traded a year after they are selected; the effect of the survivorship bias is relatively small. The final row of the table uses the surviving sample to examine the value of one-year forward information within the construct of the MBV model. The results show that accurate knowledge of forward fundamentals substantially enhances performance even in a model that was not optimized for forward information. Thus, forming effective views on the economic outlook and how such views translate into fundamentals has the power to raise returns significantly.

Linking the Wavefront all Together

Figure 20:
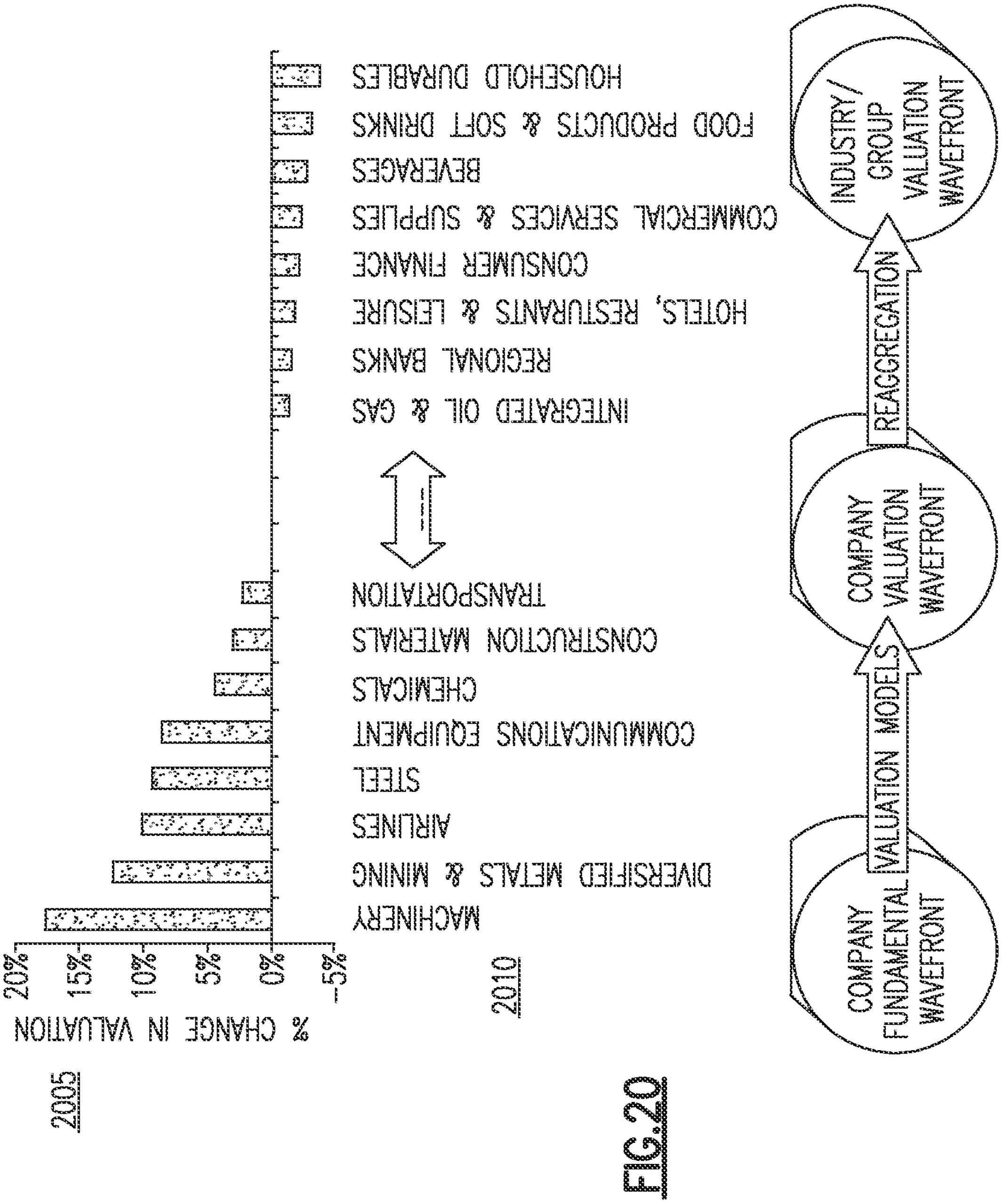

The Wavefront system market-based valuation models provide the last link in the chain between economic shocks 207 and market returns 240 of FIG. 2. They allow investors to value the marginal impact of the various shifts in fundamentals (from fundamental Wavefronts 113) generated from a given economic event (from economic Wavefronts 109). The result is the valuation Wavefront. As an example in FIG. 20, a pattern of expected returns by company or industry associated with a particular economic surprise is shown. The Wavefronts capture the difference 2005 both in what the market pays sector by sector 2010 and the composition of the income stream thus providing substantial benefits over DCF approaches. Although the MBV models do not explicitly model the timing of returns, they do incorporate the likely impact of price momentum by including it as a regressor.

One of the advantages of these models is that define a well described relationship between economic events and market impact. The models can be used to improve portfolio managers' ability to implement views and their assessment both of what the market has priced and what it is likely to price going forward.

With the Wavefront tools in hand, a discussion of several example applications as implemented by the Wavefront system is discussed. As such, the disclosure details how the Wavefront framework is used to construct and risk manage trades, and how it may be used to evaluate the economic themes being traded in the market.

Building a Trade

FIG. 21 is of a logic-flow diagram illustrating embodiments of the present invention to build a trade. To illustrate how the Wavefront tools fit together, what follows is an example of constructing a trade and tracing the tools' impact through the different stages of the model. Building a trade 120 comprises: forming a macro view 2105, translating the view into a valuation Wavefront 2110, and using the valuation Wavefront to construct the alternative trades with different risk profiles and analyze their exposures 2115.

Forming a View

A view is where one thinks the economic environment is going to turn out differently from what is currently reflected in the market. In other words, one forms a view regarding an economic event that is different than what is expected by the market. For example, suppose an investor believes that consumer spending growth is likely to slow more sharply than expected, but that other areas of spending (investment, say) would do relatively better offsetting the impact on growth. This would effectively translate into a view where although headline growth expectations might be roughly correct, the composition of growth could be different from what the market is currently expecting. This example will be used to run through the tools and illustrate how one may use the Wavefront system to come to a set of trades.

In order to run the scenario through the Wavefront system's models, an investor would express the core macro view as a series of surprises relative to the market's current expectations. This economic scenario represents a slowdown in consumer spending that leaves overall growth relatively unaffected. One starting point is to deliver a negative shock to consumer spending. FIG. 22 illustrates an economic model that shows what a typical response of the main economic variables is to a negative consumer spending surprise. Consumer spending falls, GDP growth is dragged down as a result and this in turn leads to a lower interest rates and a weaker currency than otherwise. The scenario one might want to describe, however, is one where overall growth does not slow. To capture the idea of slower consumer spending without a slower growth outlook, one needs to neutralize the growth impact of a consumer shock. To do that the negative consumer "surprise" is offset with a positive "surprise" to growth, adding a mix of the two Economic Wavefronts together so that the net impact on GDP growth is zero.

FIG. 23 shows the combined set of shifts in the economic outlook that one would expect to be associated with that combination, using the format that would normally be shown in a Trade Sheet describing trades. The first column shows the combination of "surprises" that we have fed into the system to generate our scenario (−2.8 units of consumer spending, +2.0 units of GDP growth). The second column shows what the net result is for the major economic variables. That combination gives us a situation in which consumer spending growth disappoints (by a little over 1%), investment spending surprises (by a little over 2%) but overall views of growth remain relatively unchanged.

Translating the View

To translate the view, one may use our economic scenario to generate a valuation Wavefront 115 of expected returns for the different industries, which we use as the basis for our trades. The Wavefront shows the pattern of returns across industries if views about the economic outlook shift in an anticipated way. The shifts implied by the economic Wavefront 109 flow into industry sales 111, then into predictions of company fundamentals 113, and finally into predicted valuation impacts 115 for each company. Each link in the underlying chain of models can be examined to ensure confidence in the results. Further the Wavefront can answer questions like: Is the sales effect large? Do changes in margin offset the sales impact? What is the effect on net income?

The end result is the valuation Wavefront showing the industries expected to do best and those expected to do worst. In one embodiment, the valuation Wavefronts are, relative to the S&P 500, to provide a simple measure of over-/under-performance and to emphasize that the results are optimized for predicting relative performance rather than for predicting absolute returns.

Constructing a Trade

The valuation Wavefront 115 serves as the baseline for constructing the trade; the long positions will typically come from one extreme and the short positions from the other. Specific industries are selected based on secondary risk characteristics. In selecting industries, there is generally a trade-off between the expected returns from an industry and the exposures and risks it adds. One way to exploit our developing example scenario is to take the industries from the extremes of the Wavefront, i.e., picking the longs from the far left hand side (which have the highest expected return) and the shorts from the right hand side (which have the lowest expected return). This kind of trade is the most leveraged to the macro view and yields high expected returns if spending surprises favor investment over consumer spending.

Figure 24:
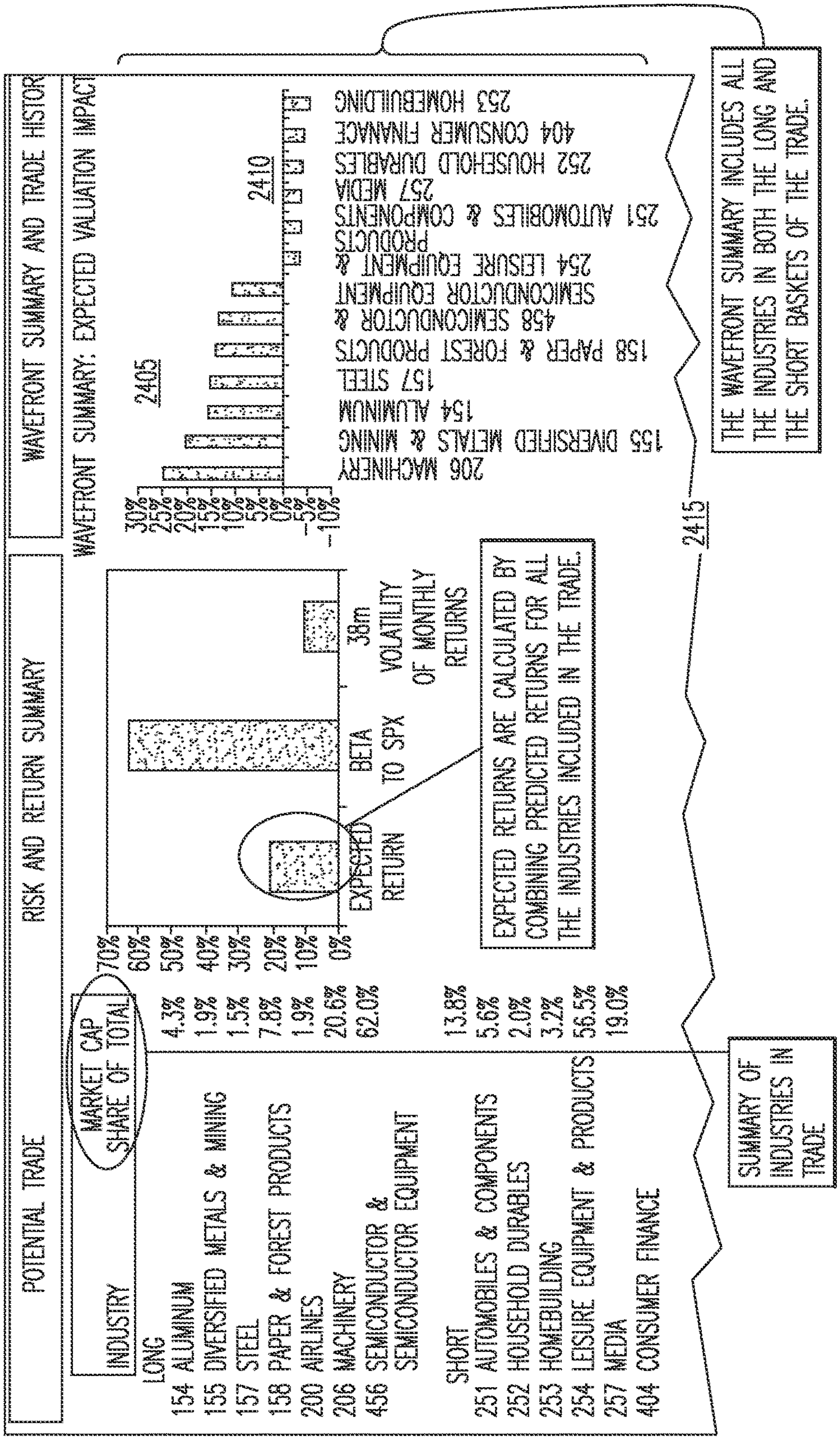

FIG. 24 shows some key details of this example trade. The trade is constructed with seven industries on the long side of the portfolio 2405 and six on the short side 2410. The trade has an expected return of 20% 2415 based on the view.

One advantage of the Wavefront system tools is that they enable one to look not just at the likely returns if such a scenario occurs, but also allows one to see exposures to macro risks. What happens to this position if GDP growth disappoints, or oil prices spike? Answering such questions allows investors to tailor the trade in a way that minimizes exposure to risks that worry them, while maximizing exposure to risks that they think are likely to occur.

Figure 25A:
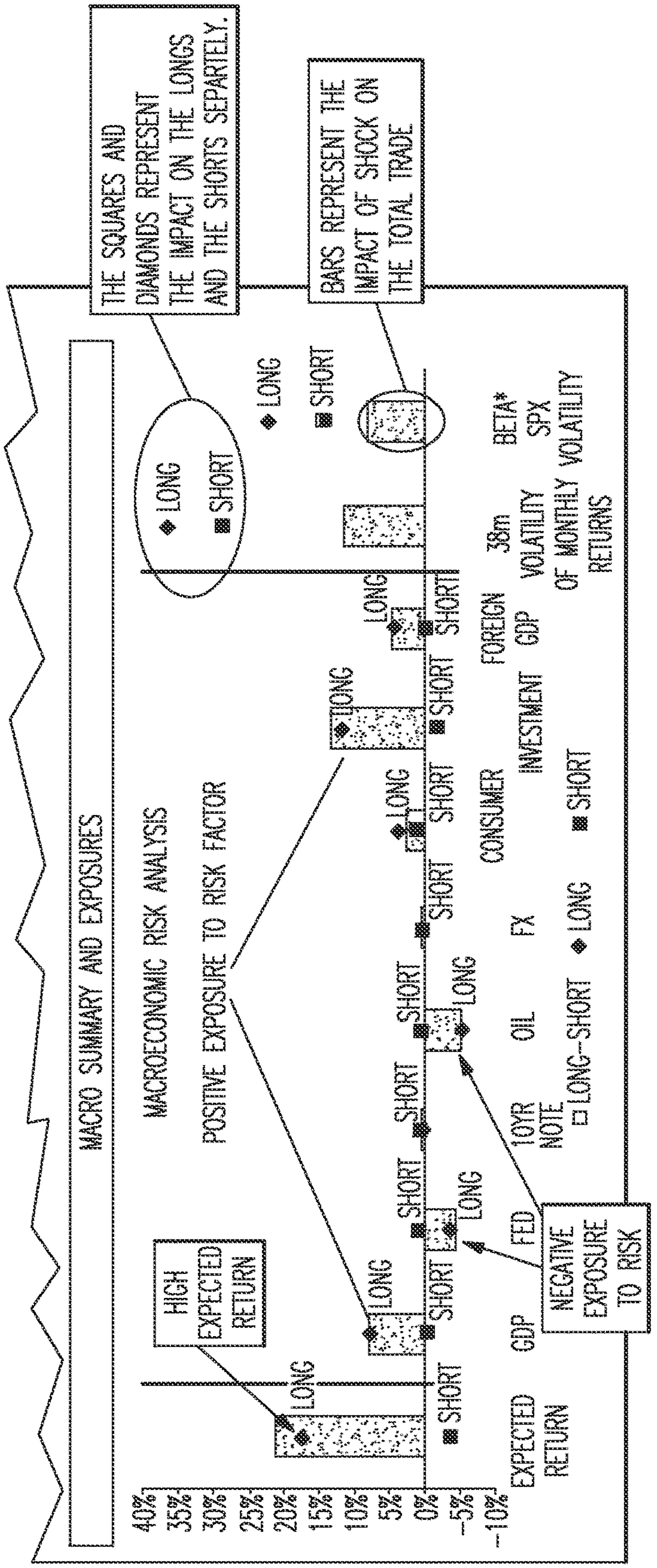

FIG. 25A shows the macro exposures to a one-standard-deviation shock to the main economic variables. Although the expected returns from this trade are high, our analysis of the macro exposures shows that this comes with a price. The trade has major risk exposure to other macro surprises. At its simplest, the trade has a significant cyclical bias. If growth turned out to be 1% lower than expectations, this could be expected to shave around 13% off the trade. The trade would also be significantly exposed to oil prices and interest rates (unexpected rises in rates or oil prices would hurt the trade).

For investors who think that there is upside risk to market views of overall growth, the macro exposure is likely to be an added attraction. But for those with a more cautious view, managing that exposure may be important.

Manage Risk

One theme of the Wave front system tools is that there are multiple ways of forming a trade to express any given view. The general point is that each trade produces a different set of secondary exposures and what follows are examples presenting a number of alternatives for a given trading theme with different risk characteristics that may suit different kinds of investors. As such, a consumer example will serve to illustrate the construction of three trades.

Managing Growth Exposure

One can use the Wavefront techniques to design a trade to manage the growth exposure discovered in an initial trade implementation. One way to do this is to select a combination of long and short positions from the Wavefront, which delivers positive returns, but has less exposure to changing views on GDP growth (either by lowering the exposure in the long or raising it in the short positions). The Wavefront system tools enable one to construct such an alternative trade.

Figure 25B:
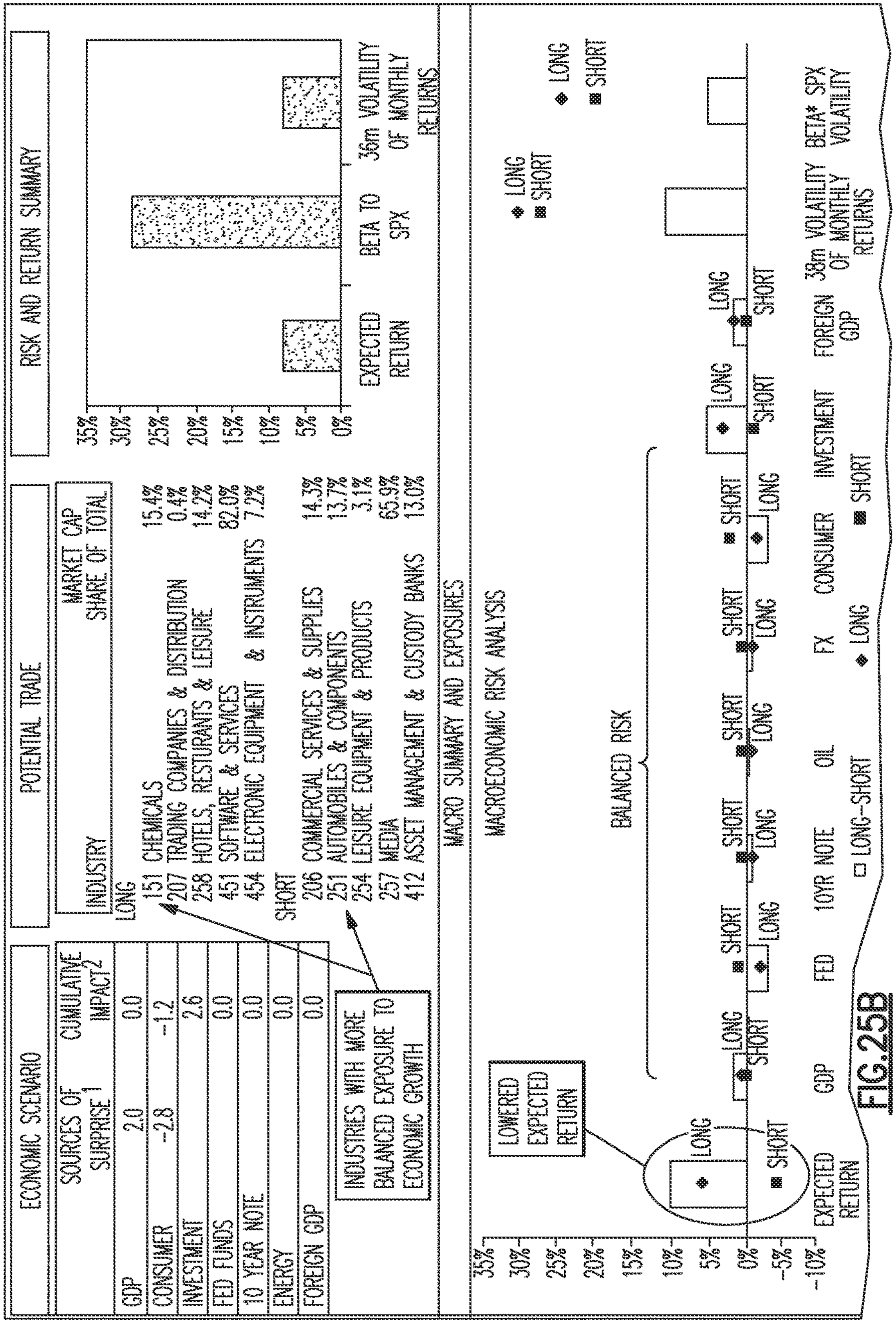

FIG. 25B presents the revised industries in the long and short portfolio along with the risk assessment. The expected return and macro exposures now look quite different. The expected return of the trade is significantly lower than in the previous version, but the macro exposures to the trade have been substantially reduced. By matching the growth-sensitivity of the longs and shorts, the exposure of the trade to a slowdown in growth has been reduced.

Both of the previous scenarios assume that the central scenario was one in which overall growth stayed healthy despite the slowing in consumer spending—effectively, the idea that consumers would disappoint, but that this would be balanced by stronger-than-expected capex spending. In the scenario where there is no offset (and all other things remain equal) a consumer disappointment would then also result in slower growth. This is different from the previous trade in which the central economic scenario was that growth would be unaffected with an aim to minimize risk if growth disappointed. In this case, the central thesis is that a faltering consumer will damage growth and so the underlying economic scenario is different.

To look at this scenario, a straight negative consumer surprise (no longer offsetting it with a positive GDP growth surprise) may be constructed. FIG. 22 already illustrated such a macro scenario and compared it to the growth-neutral version in FIG. 23. The same hit to consumer spending growth now pulls GDP growth and investment spending lower and leads the market to revise down its views of the future path of interest rates and bond yields. The new scenario changes the underlying Wavefront used to generate the trade. Using the new Wavefront, a different set of long-short portfolios can be selected as illustrated in FIG. 25B.

Reading the Market

As well as constructing trades from economic views, the Wavefront models have another useful application. In an alternative embodiment, they can be reversed to see how the market is trading various macro themes. This reversal is reflected by the optional dashed arrows moving upwards in the development of the Wavefront in FIG. 1. This embodiment provides a more sophisticated view on the market's current focus, and on how it is interpreting particular economic events.

FIG. 1 described the Wavefront mapping macro scenarios to shifts in relative equity valuation. By reversing that logic, the Wavefront system can run regressions on historic equity returns using the Wavefronts as regressors to identify shifts in macro expectations that would best explain the observed returns. This provides a useful cross-check on how much shifts of relative equity returns can be explained by macro variables. Effectively, if the pattern of returns across companies shows a high positive correlation with the Wavefront, then this is consistent with the idea that the market is revising up its views of consumer spending.

FIG. 25C shows an example of this exercise. It illustrates that over the prior two months, the market has traded in a way consistent with a downward revision to GDP growth expectations (i.e., the correlation with our GDP Wavefront is high and negative), though that process has weakened recently. It also suggests that expectations of oil prices and the dollar have been revised up over the period.

The application of this "inverse" technology for understanding how the market is trading macro themes is more subtle in application than might be guessed at first glance. For example, there are situations where the market needs to embed two assessments once. First, there is the source of the surprise. Second, there is the mechanism through which the surprise passes through the economy and the markets. The two assessments are sometimes quite different, as illustrated in FIG. 25D, which shows the Wavefront correlation results for returns between Jan. 27, 2004 and Feb. 5, 2004. This period is interesting because it coincides with the Federal Reserve statement of January 28, at which point the Fed shifted its language from maintaining an accommodative policy stance "for a considerable period," to being "patient in removing its policy accommodation." This shift was widely interpreted as moving forward the time when the Federal Reserve would raise interest rates.

If one looks at how the equity market actually traded, our example analysis shows that the primary shift in equity markets looked more like a downward shift in expectations of consumer spending than of an interest rate shift. The interest rate effect of the Federal Reserve statement becomes apparent only after removing the shift in expectations about the consumer. This makes sense because lower interest rates have recently provided an unusually strong support for continued strength in consumer expenditures and consumer indebtedness is unusually high. In other words, the market traded the interest rate surprise quite logically, but not as a naive model might suggest.

Such analysis would allow one to suspect that with the consumer emerging as the "stress point" for the US recovery, that the market response to negative shocks may generally have more of a consumer flavor than is usual. This example shows the strength of the Wavefront approach for dealing with changes in structure and current market context.

As such, the Wavefront system provides the investor with a greater understanding of how the market has been trading economic themes, which can help investors in a number of ways:

1. It may focus their attention on opportunities where the market is trading in a direction that they believe will not be validated by events.

2. It may help them to identify points at which market focus is shifting towards or away from a theme on which they have strong views and to identify inflection points.

3. It may allow them to identify sectors that have under- or over-traded a particular theme that the market has traded.

4 Also, it can give them a sense of whether a particular theme of interest to them has already been trading in the market.

Assessing Trades

FIGS. 26-43 are tables and charts illustrating embodiments of the present invention summarizing the assessment, design and efficacy of various trades; it should be noted that much of the data in the figures is based on empirical market research. There are many ways to implement a macro view. The complexity of the equity market means that there are usually many ways of getting exposure to the same investment thesis. A good trade is one that has high leverage to the desired view for a given level of volatility and minimal exposure to other risks. At the stock level this often means searching out stocks with the highest leverage to the desired theme and hoping that this leverage will overwhelm other (incidental) exposures. "Pairs trades" may be used to further focus the risk. At the macro level, similarly, pairs of exchange-traded funds (ETFs) may be used. Although there are many ways to implement a trade, the difference between a good trade and a bad trade for a given macro theme is often substantial, as is shown here. Different ETF pairs have varying degrees of effectiveness, and a set of pre-structured Wavefront baskets can often increase macro trade focus even further.

Comparing Trading Implementations

There are at least two ways to compare trading implementations. Investors need tools to be able to distinguish good trades from bad ones. As such, a comparison of different implementations designed using the Wavefront models may be achieved by focusing on two such measures of the return per unit of risk (explained in greater detail below):

1) The risk/reward ratio. This measures the expected return of the trade given the macro view relative to the volatility of returns, which may be likened to a Sharpe ratio.

2) The trade efficiency index. This measures the expected return of the trade relative to the trade's "incidental risk," defined as volatility unrelated to the core macro view.

The above measures capture the key features that identify the best trades for a given theme.

FIG. 26 is of a table illustrating embodiments of the present invention summarizing analysis of a menu of macro trades. It sets out a menu of macro trades focusing on five commonly traded major themes: 1. trading US economic growth in the US equity market 2605; 2. trading the consumer outlook in the US equity market 2620; 3. trading interest rates in the US equity market 2610; 4. trading oil prices in the US equity market 2615; 5. trading non-US growth views in the US equity market 2625. For each theme, there is a range of alternative ETF implementations available, along with a set of Wavefront baskets. We report the two risk/reward measures for each. The key message is that there are big differences between the best and worst implementations.

Better risk/reward and higher trade efficiency from managing risks The risk/reward 2630 and trade efficiency 2635 of the best implementations are often many times larger than the worst implementations, and the Wavefront baskets generally outperform even the best ETF implementations. It is also possible to improve ETF implementations substantially. Measuring and managing incidental (unwanted) risks allow us to create more favorable risk/reward characteristics. Exposure to the theme can be increased and unwanted macro risks can be offset through the identification and selection of industry groups with the right combination of exposures, while stock-specific risk can be minimized through diversification. The ability to dig below the sector level turns out to be a big advantage in focusing risk and one of the reason why the Wavefront baskets are helpful. More details regarding the information set out in FIG. 26 by explaining in greater detail how and why the various implementations.

Comparing Trades: Ingredients to Measure Risk/Reward and Trade Efficiency

In order to compare trades, let us focus on two measures. In one embodiment, the risk/reward ratio 2630 is the ratio of the expected return of the trade to its total volatility. The trade efficiency index 2635 is the ratio of the expected return of the trade to its incidental risk. The task of generating these measures is not trivial, however, the Wavefront models give us the tools to make this attribution:

1. Expected return relative to the core scenario. In one embodiment, this is the Wavefront estimate of the expected return from the economic scenario behind the view. The economic scenarios are assumed to play out over a month and are benchmarked as 2 standard deviation monthly events.

2. Total volatility. We present annualized volatility of monthly returns since, e.g., 2002.

3. Incidental risk. A trade's volatility comes partly from exposure to the view and partly from other unwanted exposures. Investors want exposure to factors associated with their view. It is any other risk—what we call incidental risk—that they want to avoid. Comparing returns to total volatility (as our risk/reward ratio does) may not distinguish sufficiently between desired and undesired volatility.

One way to measure incidental risk, is to proceed in three stages. First, one assembles estimates of the equity market's change in macro expectations from the Wavefront Market Monitor. Appendix 5 provides background on the Wavefront Market Monitor. These changes are based on observed relative industry performance. Second, one may use risk analysis tool to assess the exposures of each implementation to the underlying macro view. Third, one may combine the two sets of information to produce an estimate of the performance due to the view—essentially a benchmark tracking basket with returns driven by moves in the macro view. The tracking error around this macro benchmark works as a measure of incidental risk. Because the risk/reward ratio and trade efficiency index are calculated on the assumption that the expected return is realized over a month, they may be calculated relative to the actual non-annualized monthly volatility as follows:

$$\frac{\text{expected return}}{\text{annualized volitility of monthly returns}/\sqrt{12}}$$

Such risk metric tool output is shown in Appendix 4 and allows for a further break down of sources of risk. Additional risk measures are listed below in the Risk Metrics Table below (an expanded set of risk metrics for the various trade implementations are listed in Appendix 4):

| Risk Metrics | Details |
|---|---|
| Number of long and short positions | Number of individual stocks in the long and short sides of the proposed trade implementation. |
| Number of GS Wavefront industries in long and short position | Number of industries represented in the long and short sides of the proposed trade implementation. |
| "Effective N" of long/short positions | "Effective N" is a measure of portfolio concentration. It is the number of equal-weighted stocks that have the same risk profile as the original portfolio. An equal-weighted portfolio has an "Effective N" that is equal to the actual number of stocks in the portfolio. All other portfolios have an "Effective N" that is lower than the number of stocks in the portfolio. "Effective N" is calculated as the reciprocal of the sum of squared portfolio weights. |

-continued

| Risk Metrics | Details |
|---|---|
| "Effective N" of basket | The "Effective N" of the long-short basket is a weighted sum of the "Effective N" of the two baskets separately. If the long basket and short basket have very different "Effective N's" but similar dollar weights in the overall portfolio, the "Effective N" of the resulting basket can be quite low - reflecting the fact that a small number of stocks on one side of the basket leaves the total portfolio quite exposed to stock-specific risks. |
| Share of capital in largest five positions | The summed portfolio weights of the five largest positions from both the long and short side of the trade. |
| Annualized monthly volatility | Annualized volatility of monthly returns. |
| Annualized macro volatility | Annualized volatility of the portion of monthly returns generated by the full set of Wavefront-measured macroeconomic factors. |
| Annualized view volatility | Annualized volatility of the portion of monthly returns generated by the specific macroeconomic factor (or factors) that the given trade implementation is designed to express. |
| Annualized non-macro volatility | Annualized volatility of the portion of monthly returns not attributed to the full set of Wavefront-measured macroeconomic factors. |
| Annualized incidental volatility | Annualized volatility of the portion of monthly returns not attributed to the specific macroeconomic factor (or factors) that the given trade implementation is designed to express. |
| Daily volatility to monthly volatility | The ratio of the annualized volatility of daily returns to the annualized volatility of monthly returns captures the presence of trending returns, as indicated by a ratio less than 1. |

Measuring and Enhancing Risk/Reward in Macro Trades

An effective macro trade comes from maximizing the leverage to the view and minimizing incidental (unwanted) risks. Incidental risks to a macro trade can come from exposures to either non-core macro factors or to non-macro factors. This means that a good macro trade generally has three qualities:

1. A strong leverage to the macro view. A trade designed to be positively levered to economic growth should go up as growth increases, all other considerations being equal.

2. Limited unwanted macro exposures. An effective implementation may have little exposure to macro shifts that are not part of the core trading view.

3. Low stock-specific and idiosyncratic risk. Any equity trade will carry idiosyncratic risks related to the performance of the industries and companies in the trade. Diversification limits these risks.

These factors are usually in tension. Stocks or sectors with strong leverage to an underlying view also have leverage to other (unwanted) macro risks. For instance, the automobile industry is rate-sensitive, but it is also leveraged to growth and consumer spending. Similarly, focusing on a small group of stocks or sectors with very high leverage to a view may increase the expected return of a trade but leave significant stock-specific risk. The Wavefront tools allow one to quantify the macro exposures across stocks and industries, giving one the ability to manage these trade-offs. The basic approach is to assess a trade's return to the underlying theme relative to either overall volatility (risk/reward ratio 2630) or incidental risk (trade efficiency index 2635).

Macro exposures differ significantly across the main ETFs. For macro trading, the desire to diversify away stock-specific risk makes trading portfolios of stocks rather than individual securities a good starting point for managing these trade-offs. One appealing way of gaining exposure to a macro view while diversifying away some stock-specific risk involves implementations of macro views in equity markets by trading ETF pairs. Macro factors are an important driver of relative sector and index returns.

Figure 28:
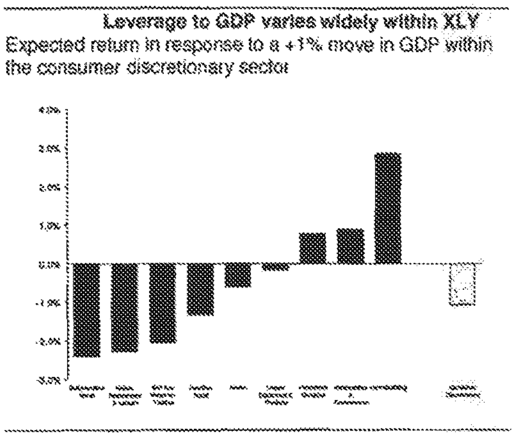
FIGS. 28 and 29 are examples of the consumer discretionary ETF (XLY) 2715 of FIG. 27.
Figure 29:
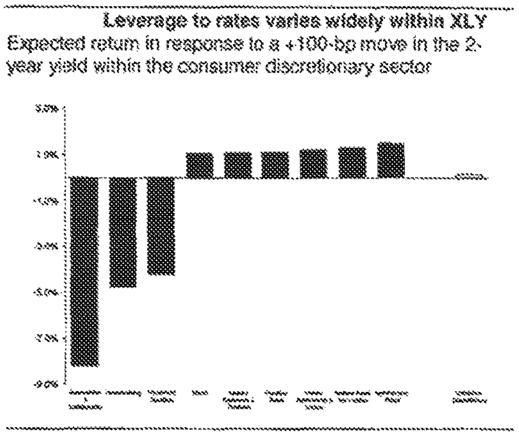

FIG. 27 shows the macro exposures for the major economic drivers of relative returns (GDP growth, short-term interest rates, and oil prices), where the exposures are all expressed relative to the S&P 500 (SPX). The exposures match much (but not all) of the common wisdom about the major ETFs 2705. A 1% increase in expected GDP growth, for instance, is expected to cause the basic materials sector to outperform by 6.0% but consumer staples to underperform by 3.3%. This spread across ETFs, however, hides considerable heterogeneity within them. The ETFs are generally broad aggregations of diverse industries. FIG. 27 shows that the maximum and minimum industry exposures 2710 to macro factors within each ETF vary widely. Although some sectors are relatively homogeneous (like consumer staples) in terms of macro risks, many are composites of groups of industries that have very different macro characteristics. FIGS. 28 and 29 are examples of the consumer discretionary ETF (XLY) 2715 of FIG. 27. Within the sector, there is a wide spread of expected returns in response to macro shifts. The response to a GDP shock ranges from +3% to −3% FIG. 28, while the response to a shock to the two-year yield ranges from +1.5% to −9.5% FIG. 29. The sector aggregates industries that are defensive to moves in both GDP growth and interest rates (retail and leisure) with industries that are both cyclical and (negatively) responsive to interest rates (durables, homebuilding, and autos). Similar variety can be seen in several other sectors. Although macro trading through ETFs is convenient, the fact that many ETFs are aggregates of industries with quite different macro characteristics may limit their flexibility. Because they combine industries with a range of different macro exposures, owning an ETF can dilute the leverage to macroeconomic views and make it harder to manage macro risks. By "slicing and dicing" at least to the industry level, it is often possible to increase the focus and the efficiency of macro trades.

Figure 30:
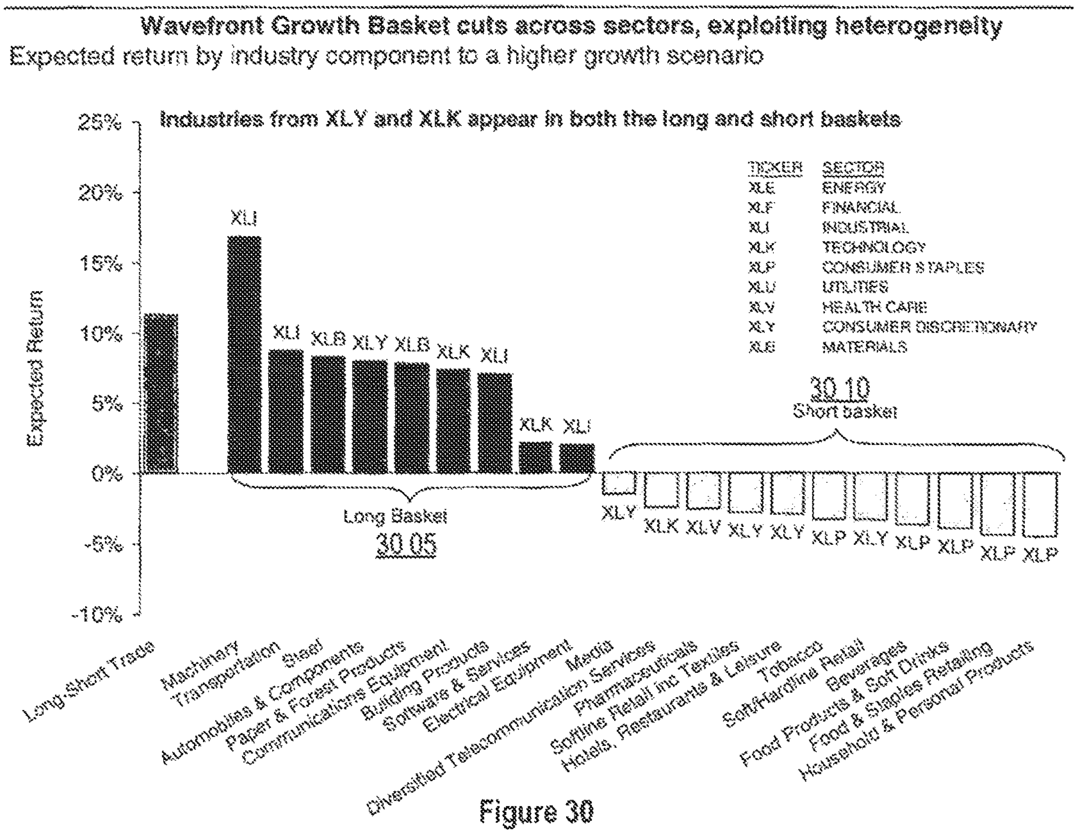
FIG. 30 shows one example of a Wavefront Growth Basket. Wavefront baskets exploit the benefits of "slicing and dicing;"

FIG. 30 shows one example of a Wavefront Growth Basket. Wavefront baskets exploit the benefits of "slicing and dicing." The Wavefront baskets, which in one sense are alternative ways to trade macro themes, are designed to exploit the heterogeneity across industries and are usually designed as collections of industries selected for their macro exposure. This long-short 3005, 3010 basket has been selected at the industry (rather than sector) level to gain leverage to expectations of rising US GDP growth. FIG. 30 shows the industries in the Wavefront Growth Basket and their exposures to a scenario in which GDP growth rises. These industries are drawn from six different sectors 3015 with industries from two sectors (consumer discretionary and technology) actually appearing on both the long and short sides of the trade. Precisely because industries within a sector may have very different exposures, often risk/reward and trade efficiency can be improved by picking out the most appropriate industries without regard to sector boundaries, as will be shown.

Designing Efficient Trades Around Five Macro Themes

One way to illustrate the potential to increase trade efficiency is to consider alternative implementations across a menu of macro themes. In each case, the disclosure sets out the economic scenario that underpins the trading theme and compares the different implementations. In focusing on our two metrics (the risk/reward ratio and the trade efficiency index), developing five example macro themes will help to illustrate the designing of efficient trades. It should be noted that the Risks Metrics Table, above, provides a range of other statistics and some background on how to generate numerous other economic scenarios. For each of the five macro themes, the Wavefront System sets out a scenario that is expected to play out over a month and use the Wavefront models to generate the expected return of the trade over that period. As a result, the expected return of the trade that is reported is a return contingent on the particular scenario that is set out. As such, the return may depend on the intensity of the scenario described. A smaller shift in macro expectations could leave the ranking of risk/reward across different implementations of the theme intact but could reduce the expected return (and also the actual risk/reward ratio and trade efficiency index) proportionally across all implementations. The scenarios are scaled so that they represent a 2 standard deviation monthly event; in other words, the growth scenario is scaled to show a monthly shift in the market's growth expectations that is likely to occur around 2% of the time. In that sense, each of the scenarios for the five themes is roughly comparable to each other in terms of how likely they are to occur.

Theme 1: Trading Growth—Getting "Bang for the Buck"

Investors may wish to seek trades that express views about US economic growth prospects. FIG. 31 shows one version of this economic scenario, in which GDP growth rises 0.5% but interest rates remain stable (our Market Monitor tells us that a 50-bp shift over a month in the equity market's growth expectations is a 2 standard deviation occurrence).

FIG. 32 revisits the menu of alternative trade implementations designed to exploit this kind of growth view. For the ETF trades 3205, these generally involve being long a more "growth-sensitive" ETF against the overall market or a more "defensive" ETF. The Wavefront Growth Basket 3210, described above, and the Wavefront Turbo Growth Basket (which is a higher leverage version of the same trade) 3215 represent alternative implementations. As such, FIG. 32 shows the wide differences in the risk/reward ratio and trade efficiency index and their sources. There are at least four differences, which include:

1) There are differences between the various ETF implementations, with the best ETF implementation (long materials, short consumer staples) 3220 three to four times more efficient than the worst.

2) The leverage of the major ETFs relative to the SPX is surprisingly low, particularly for the tech-oriented trades (QQQQ 3225 and XLK 3230), reflecting the fact that these implementations involve significant exposure to other risks and little leverage to the view.

3) The sector-versus-sector ETF implementations (XLB-XLP 3220 and XLI-XLP 3235) increase this leverage. Although this comes at the expense of significantly higher volatility and less diversification, they are more efficient than the ETF trades against the index. By exploiting leverage to the view on the short as well as the long side of the trade (being short a defensive sector rather than the SPX 3240), investors can add more return than they increase risk.

4) On both measures, the Wavefront baskets are significantly more efficient than the other baskets. Their expected return to increasing GDP growth is the highest of the implementations 3245. This additional return does not come purely from increased risk, so their leverage to the view is more focused. Relative to the most efficient ETF implementations, the Wavefront Growth Basket is also better diversified, which helps to bring the incidental risks down.

Theme 2: Trading the Consumer—Avoiding the Wrong Exposures

Investors may want to leverage to views on the consumer outlook. Equities are arguably the only major asset class where consumer views can be effectively expressed, unlike growth and rate views. The menu (see FIG. 26 and FIG. 36) lists a number of different ways of getting exposure to this theme. One series of ETF implementations involve being long a consumer-related sector against another area of the market. In practice, there are (at least) two different ways to think about a scenario involving stronger consumer spending. In the pure consumer case, set out in the left-hand panel of FIG. 33, a stronger consumer spending outlook takes place in an environment where growth is unchanged 3305 (Scenario 1). In effect, stronger consumer spending comes at the expense of other areas of spending (in the left-hand panel, principally investment 3305) and overall GDP growth is not altered. There is an alternative consumer spending scenario (shown in the right-hand panel) that is arguably more typical 3310 (Scenario 2). In this case, stronger consumer spending leads to stronger GDP growth (as shown in the right-hand panel). Ideally, a trade to exploit an improving consumer outlook would perform in both cases.

Figure 35:
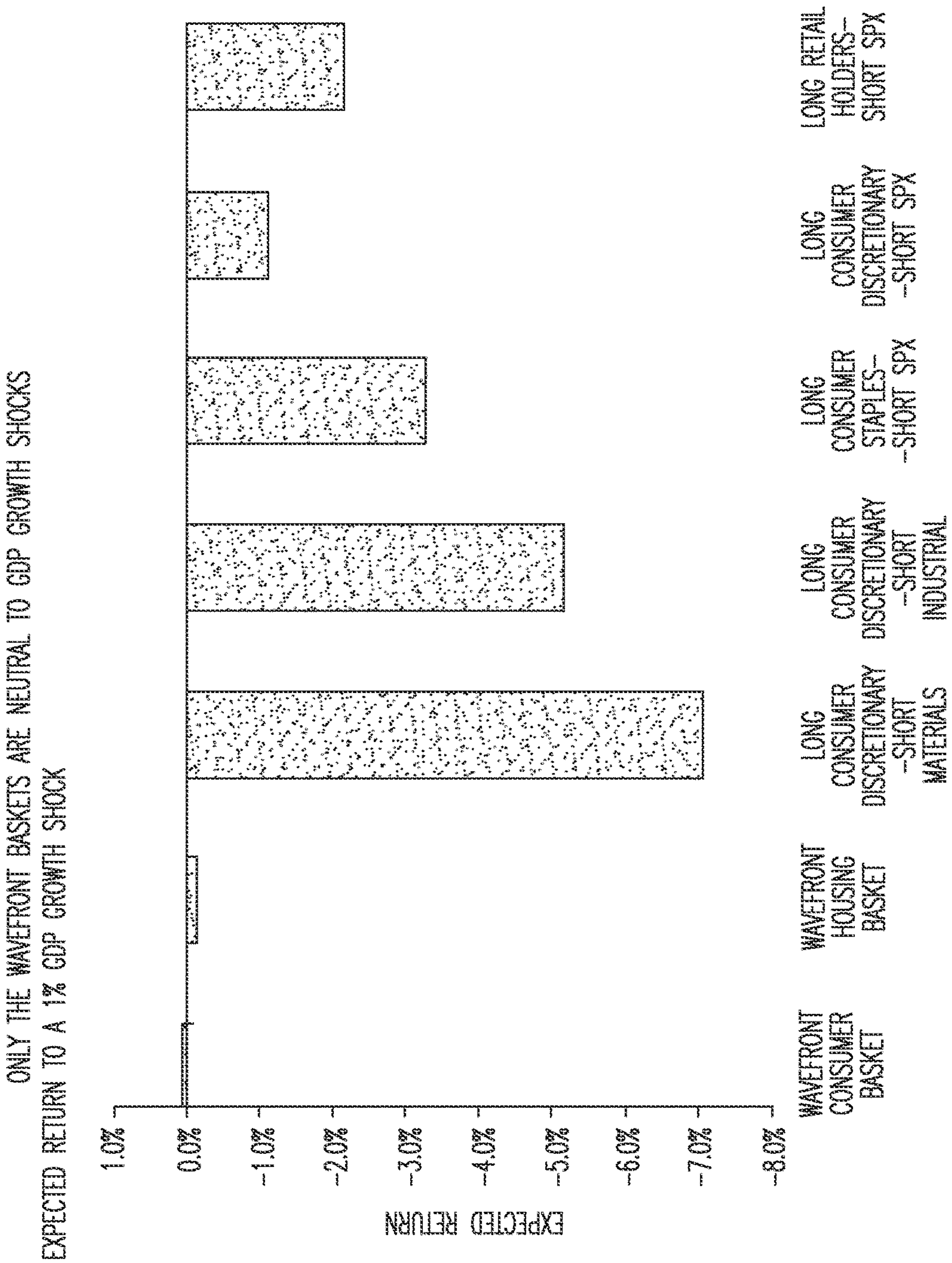
FIG. 35 shows the major ETF pairs have sizable negative exposure to GDP growth.

FIG. 34 highlights the risk/reward metrics relative to the pure consumer case (Scenario 1). The Wavefront Consumer 3410 and Housing Baskets 3415 have the highest risk/reward and trade efficiency scores. Those gains come partly from relatively high expected returns, but at least as much because these baskets have among the lowest incidental risk of the implementations. The higher incidental risk in the ETF implementations 3405 is partly a function of the fact that they have significant exposure to other macro risks, particularly GDP growth. The Wavefront baskets, by contrast, have been explicitly designed to have low exposure to both interest rate and GDP growth risk and thus are more purely leveraged to the consumer theme (see FIG. 35 to see this consumer theme as it responds to growth shocks). In this scenario, the Wavefront basket design comprises a set of consumer variables as shown in Appendix 6A and 6B. Several of the ETF implementations also perform well, although once again the results are generally better for sector-versus-sector implementations than implementations that trade one sector against the index. Some of the classic implementations (long XLY 3420 or RTH 3425, short SPX 3430, for instance) are surprisingly weak, again largely because of low expected returns to the underlying view. FIG. 35 shows the major ETF pairs have sizable negative exposure to GDP growth (they are generally "defensive"). In fact, the ETF implementations pay off in the "pure consumer" case (our Scenario 1), not so much because they have substantial leverage to the consumer but because they have substantial (negative) leverage to investment and to GDP growth (and in this scenario, because the consumer is growing and growth is unchanged, investment is falling). In the situation where higher consumer spending pushes GDP growth up (Scenario 2 above), the macro risks in the ETF implementations present even more serious problems.

FIG. 36 shows the expected returns in Scenario 2 3310 of FIG. 33. In this case, only the Wavefront baskets 3610, 1615 deliver significant positive returns and many of the alternatives actually lose money. With growth moving up, the cyclical shorts in the ETF implementations outperform, which hurts the trade performance. This illustrates the importance of analyzing and managing secondary macro exposures (which we present for the listed trades in the aforementioned Risk Metrics Table). The ETF-based consumer pairs hinge more on the overall growth environment than the consumer component. This s not true for the Wavefront Consumer Basket 3610 and the Wavefront Housing Basket 3615, which are leveraged primarily to the consumer. This highlights the importance of having an explicit view. The expected return, risk/reward ratio, and trade efficiency index are all much lower in FIG. 36 than in the other themes, even for the two Wavefront baskets. These consumer trades are generally not a very effective way of implementing the view implicit in Scenario 2.

Theme 3: Trading Oil—where Implementation Matters Less

For equity trades designed to exploit shifts in oil prices, the difference across alternative implementations is smaller. FIG. 37 sets out a macro scenario in which oil prices rise 3705, driving growth lower 3710. FIG. 38 shows three ways to trade the macro scenario in FIG. 37: two different Wavefront baskets 3810 and a standard ETF implementation (long XLE, short SPX) 3815.

FIG. 39 looks across the risk/reward metrics. The differences across baskets are less stark than in earlier cases. The Wavefront Oil Basket 3910 with GDP Risk 3915 has the highest expected return 3920 in this scenario and the highest risk/reward ratio 3925. This basket has been designed to be long oil producers and short a group of industries that are generally hurt by rising oil prices, so both the longs and the shorts are sensitive to rising oil prices. Also, the Wavefront Oil Basket 3910 with GDP Risk 3915 scores much lower on the trade efficiency index 3930, however, because its incidental risk 3935 is more than double that of the alternatives. The problem is that the basket carries sizable cyclical risk because the oil consumers in the short side (airlines, for instance) are generally highly exposed to growth. A significant part of the trade's return and volatility comes from growth exposure, which may not be part of the core view. The Wavefront Oil Basket 3910 and the XLE-SPX 3940 implementation both avoid this problem because they are broadly neutral to other macro risks. While they have lower leverage to the scenario, their incidental risk is lower, so more of their overall volatility is coming from oil prices themselves. The two trades are similar in terms of their risk/reward ratio and trade efficiency index. It is still possible to "slice and dice" the sector, picking out industries to increase risk/reward. The Wavefront Oil Basket does this by focusing on the two energy industries that have the highest leverage to oil prices (E&P and integrateds). This is only a modest change relative to the XLE-SPX trade, so the increase in risk/reward and trade efficiency is small. It also comes at the partial cost of reducing the diversification of the basket, as the Wavefront Oil Basket only includes two of the energy industries (E&P and integrateds).

Theme 4: Trading Rates—Preventing Dilution of the View

Another theme is to trade the impact of shifts in the interest rate environment in the equity market. To the extent that higher interest rates hurt growth, it makes more sense to trade this through a growth trade. FIG. 40, in contrast, shows a scenario that represents a "pure" rates scenario, in which short- and long-term rates move higher but growth is unchanged (think of this as the Fed raising rates to cap growth). Leaving aside the "bond-like" equity trades (trading utilities and REITs, for instance) which we regard as close to trading bonds themselves, the most common sector trades to exploit higher interest rates generally involve going short the financial sector (XLF), or parts of it, against the index.

FIG. 41 compares the various implementations. There is significant variation across the different implementations, with the Wavefront Rates Basket 4110 delivering the best risk/reward and (particularly) trade efficiency scores, this time by a substantial margin. The Wavefront basket's higher scores come from both higher expected return to rates and lower incidental risk. Of the two ETF implementations, trading the whole financial sector is also clearly superior in terms of both return and incidental risk relative to trading just the regional banks against the index. The main problem with the ETF trades is that rates exposure within the financial sector varies significantly and parts of other sectors (building products from the industrial sector or parts of durable consumer spending) that are highly rate-sensitive are excluded. As a result, the leverage to the rates theme is lower than it could be by being more selective. The Wavefront Rates Basket allows us to carve out the most rate-sensitive areas of different sectors. By adding non-financial, rate-sensitive industries such as homebuilding and building products and excluding some of the less rate-sensitive parts of the financial sector, significant improvements are possible.

Theme 5: Trading Non-US Growth—Getting Exposure to Unique Themes

It can be difficult to get the appropriate level of focus for some common themes. In some cases, the problem can be so acute that it is hard to design any kind of sensible sector-based trading implementation for a particular view. This is likely to be true if the theme cuts across different parts of the sector and ETF space. One broad category of macro themes where those problems appear particularly acute is in trading views on foreign growth in the US equity market. With the growing internationalization of corporate performance and increased sensitivity of US companies to overseas developments, investors are looking to trade views on non-US growth in the US equity market. Without certain ETF implementations, custom baskets or portfolios may appear to be the default option for implementing these views.

FIG. 42 shows a Wavefront Foreign Growth Basket designed to allow investors to exploit the economic scenario portrayed therein. The basket is designed to be leveraged to shifts in non-US GDP growth, broadly defined. The industries in the long side of the trade were selected by the Wavefront models and cross-checked with data on foreign sales exposure. The short side of the basket was used to balance other macroeconomic risks. The industries cut across a range of sectors, which is why ETF alternatives are hard to find. Appendix 7 shows the construction of this type of basket. An example of such a construction includes a Wavefront China Growth Basket, which may be used to gain leverage to Chinese growth, an increasingly important market theme. That basket again cuts across sectors and thus is hard to replicate through standard ETFs. FIG. 43 compares foreign growth using trade performance metrics.

Separating Good Trades from Bad

Figure 44:
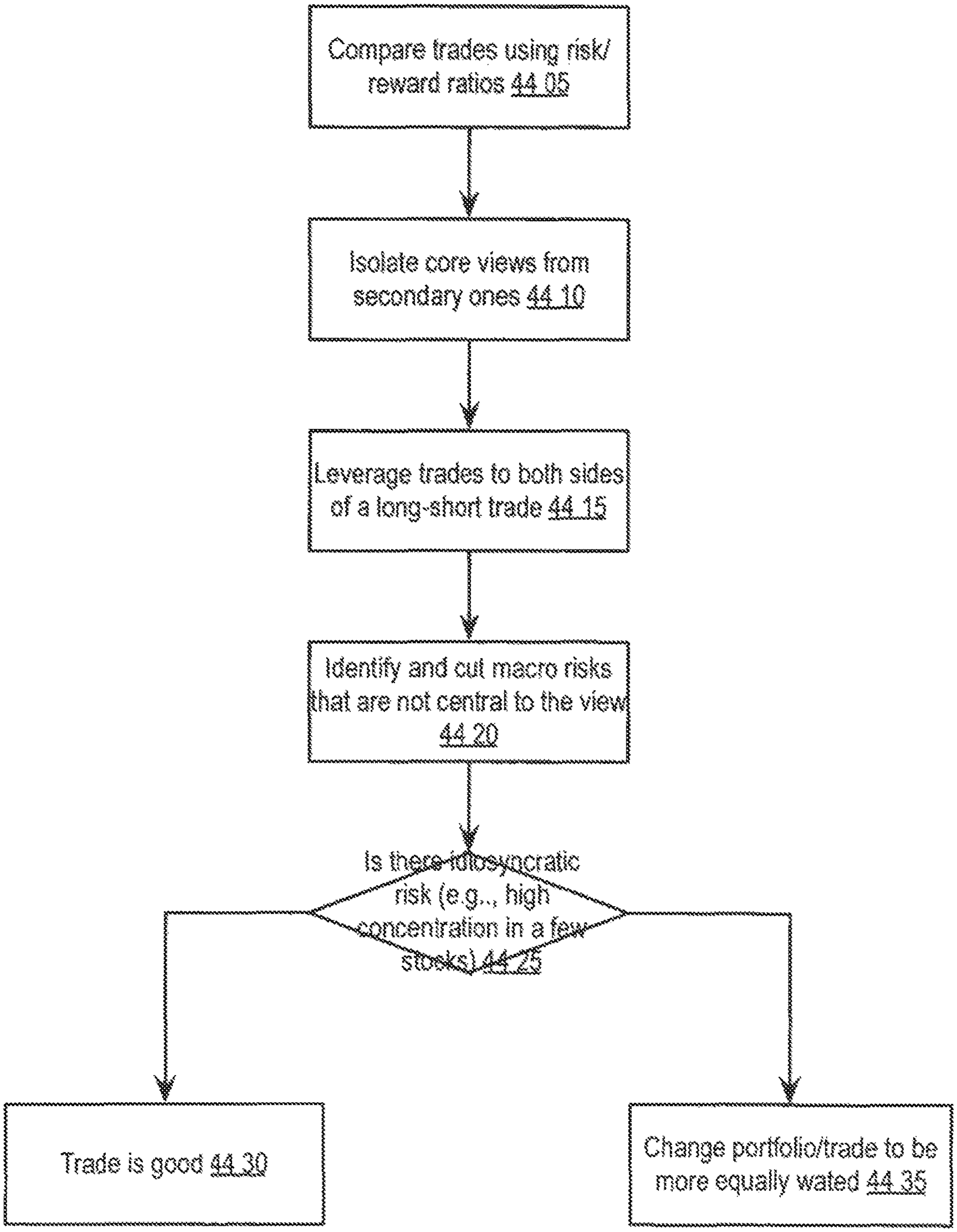
FIG. 44 shows a mechanism to identify good trades.

FIG. 44 shows a mechanism to identify superior trades. The efficiency of trading implementations matters enormously and varies greatly. Our Wavefront baskets offer one way of increasing focus, increasing efficiency, and managing macro-related risks in equity markets. However, even across heavily used ETF strategies, there are significant payoffs to analyzing macro exposures in more detail. This suggests that investors who are committed to ETF implementations can still improve trade efficiency. Strategies that combine ETFs in more sophisticated ways are also likely to be able to improve efficiency beyond the pair trades we have considered here, and are considered to be a part of the present invention. To that end, the presented themes show instances of using Wavefronts and the process of separating a good trade from a bad one.

Focus on Risk/Reward and Trade Efficiency

The strategy of analyzing trades in terms of return per unit of incidental risk is an important insight. Volatility matters, but not all volatility is created equal. Some risks investors seek out, others they seek to avoid. A comparison of trades using our risk/reward ratio and trade efficiency index can help to focus on the strengths and weaknesses of different strategies 4405.

Be Precise about the Theme

It is important to be able to isolate core views from secondary ones. Is a view on the consumer really a view on the consumer or is it a view on GDP growth or interest rates? Expressing views in the most direct way possible and expressing separate views separately can enhance efficiency and create greater flexibility to manage positions 4410.

Look for Leverage in Longs as Well as Shorts

In most cases, trade efficiency appears to be improved by looking for leverage to the view in both sides of a long-short trade, rather than simply trading one side against the index 4415. This is true for many of the ETF implementations and generally underpins the Wavefront baskets.

Beware of Other Macro Risks

Primary exposures can be derailed if other macro risks are not recognized (recall our consumer example). Identifying and managing macro risks that are not central to the view is one way to improve trade efficiency 4420. For trading non-macro themes, where any macro risk is probably unwanted, it may be even more important.

Watch for Stock-Specific Exposure

When expressing a macro view, there is little to be gained from having significant idiosyncratic risk. An important warning sign is determining if there is a high concentration in a few names 4425. If there is are no idiosyncratic risks, e.g., if there is not a high concentration of risk in a few stocks, then that is indicative of a better trade 4430. Conversely, if there is idiosyncratic risk 4425, then more equal-weighted portfolios can serve to reduce these problems, i.e., significant concentration in a few stocks can be a problem with some ETF implementations.

Macroeconomic Equity Investment Design and Trade System Controller

Figure 45:
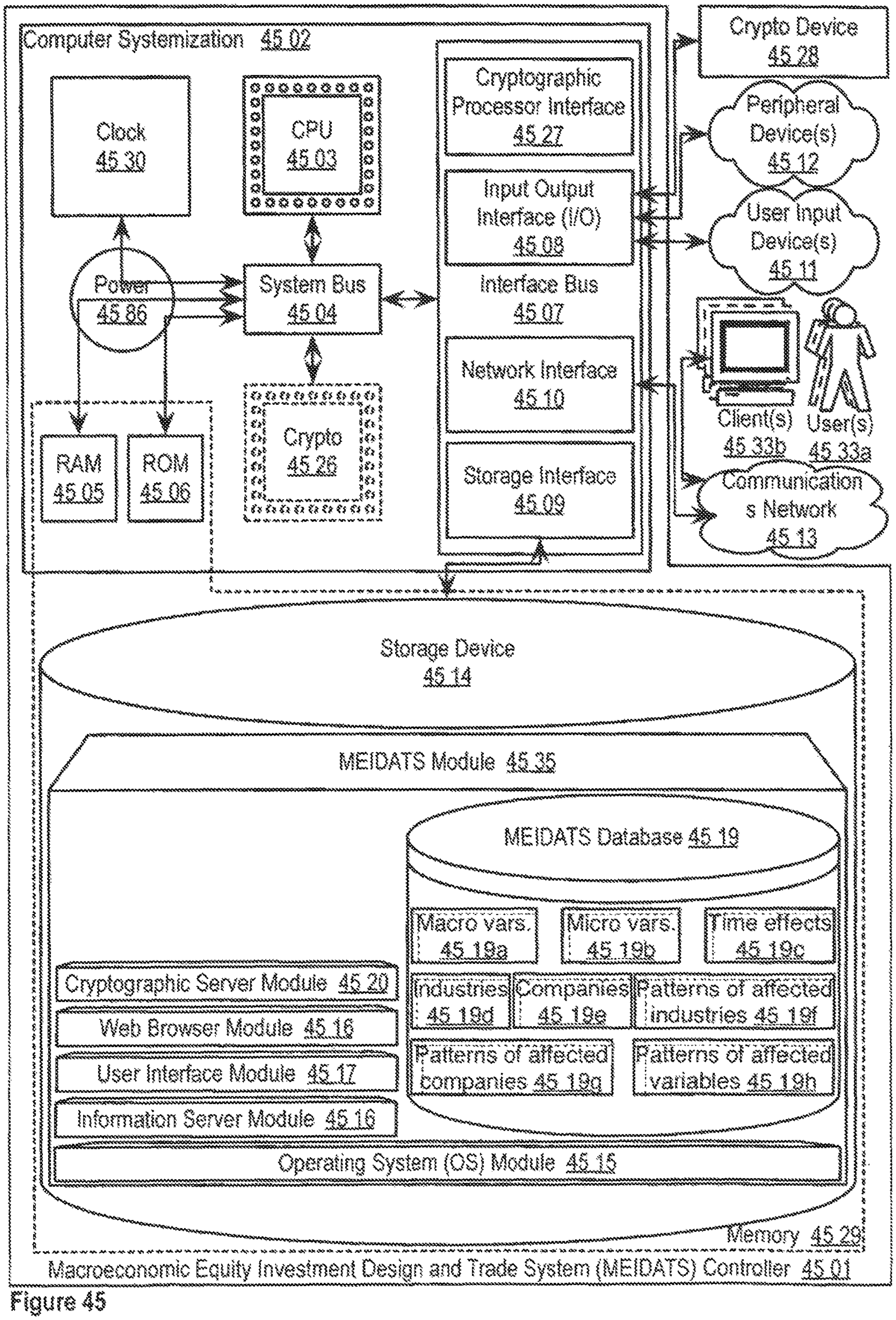
FIG. 45 is of a block diagram illustrating embodiments of the present invention of a Macroeconomic Equity Investment Design and Trade System controller.

FIG. 45 is of a block diagram illustrating embodiments of a macroeconomic equity investment design and trade system (the Wavefront system) controller 4501. In this embodiment, the Wavefront system controller 4501 may serve to process, store, search, serve, identify, instruct, generate, match, and/or update recordings, expirations, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the Wavefront system controller 4501 may be connected to and/or communicate with entities such as, but not limited to: one or more users from user input devices 4511; peripheral devices 4512; a cryptographic processor device 4528; and/or a communications network 4513.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A the Wavefront system controller 4501 may be based on common computer systems that may comprise, but are not limited to, components such as: a computer systemization 4502 connected to memory 4529.

Computer Systemization

A computer systemization 4502 may comprise a clock 4530, central processing unit (CPU) 4503, a read only memory (ROM) 4506, a random access memory (RAM) 4505, and/or an interface bus 4507, and most frequently, although not necessarily, are all interconnected and/or communicating through a system bus 4504. Optionally, the computer systemization may be connected to an internal power source 4586. Optionally, a cryptographic processor 4526 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the Wavefront system controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 4586 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 4586 is connected to at least one of the interconnected subsequent components of the Wavefront system thereby providing an electric current to all subsequent components. In one example, the power source 4586 is connected to the system bus component 4504. In an alternative embodiment, an outside power source 4586 is provided through a connection across the I/O 4508 interface. For example, a USB and/or IEEE 1394 connection carries both data and power across the connection and is therefore a suitable source of power.

Interface Adapters

Interface bus(ses) 4507 may accept, connect, and/or communicate to a number of interface adapters, conventionally although not necessarily in the form of adapter cards, such as but not limited to: input output interfaces (I/O) 4508, storage interfaces 4509, network interfaces 4510, and/or the like. Optionally, cryptographic processor interfaces 4527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 4509 may accept, communicate, and/or connect to a number of storage devices such as, but not limited to: storage devices 4514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 4510 may accept, communicate, and/or connect to a communications network 4513. Through a communications network 113, the Wavefront system controller is accessible through remote clients **4533*b* (e.g., computers with web browsers) by users 4533*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 4510 may be used to engage with various communications network types 4513**. For example, multiple network interfaces may be employed to allow for the communication over broadcast, multicast, and/or unicast networks.

Input Output interfaces (I/O) 4508 may accept, communicate, and/or connect to user input devices 4511, peripheral devices 4512, cryptographic processor devices 4528, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 4511 may be card readers, dongles, finger print readers, gloves, graphics tablets, joysticks, keyboards, mouse (mice), remote controls, retina readers, trackballs, trackpads, and/or the like.

Peripheral devices 4512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Wavefront system controller may be embodied as an embedded, dedicated, and/or monitor-less (i.e., headless) device, wherein access would be provided over a network interface connection.

Cryptographic units such as, but not limited to, microcontrollers, processors 4526, interfaces 4527, and/or devices 4528 may be attached, and/or communicate with the Wavefront system controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 4529. However, memory is a fungible technology and resource, thus, any number of memory embodiments may be employed in lieu of or in concert with one another. It is to be understood that a the Wavefront system controller and/or a computer systemization may employ various forms of memory 4529. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 4529 will include ROM 4506, RAM 4505, and a storage device 4514. A storage device 4514 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 4529 may contain a collection of program and/or database modules and/or data such as, but not limited to: operating system module(s) 4515 (operating system); information server module(s) 4516 (information server); user interface module(s) 4517 (user interface); Web browser module(s) 4518 (Web browser); database(s) 4519; cryptographic server module(s) 4520 (cryptographic server); the Wavefront system module(s) 4535; and/or the like (i.e., collectively a module collection). These modules may be stored and accessed from the storage devices and/or from storage devices accessible through an interface bus. Although non-conventional software modules such as those in the module collection, typically, are stored in a local storage device 4514, they may also be loaded and/or stored in memory such as: peripheral devices, RAM, remote storage facilities through a communications network, ROM, various forms of memory, and/or the like.

Operating System

The operating system module 4515 is executable program code facilitating the operation of a the Wavefront system controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the Wavefront system controller to communicate with other entities through a communications network 4513. Various communication protocols may be used by the Wavefront system controller as a subcarrier transport mechanism for interaction, such as, but not limited to: multicast, TCP/IP, UDP, unicast, and/or the like.

Information Server

An information server module 4516 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective−) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on a the Wavefront system controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the Wavefront system database 4519, operating systems, other program modules, user interfaces, Web browsers, and/or the like.

Access to the Wavefront system database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Wavefront system. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Wavefront system as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface module 4517 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 4518 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the Wavefront system enabled nodes. The combined application may be nugatory on systems employing standard Web browsers.

Cryptographic Server

A cryptographic server module 4520 is stored program code that is executed by the CPU 4503, cryptographic processor 4526, cryptographic processor interface 4527, cryptographic processor device 4528, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Wavefront system may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable a the Wavefront system module to engage in secure transactions if so desired. The cryptographic module facilitates the secure accessing of resources on the Wavefront system and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

The Wavefront System Database

A the Wavefront system database module 4519 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Wavefront system database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the Wavefront system database is implemented as a data-structure, the use of the Wavefront system database 4519 may be integrated into another module such as the Wavefront system module 4535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database module 4519 includes several tables 4519*a-h*. A macroeconomic variables table 4519*a* includes fields such as, but not limited to: variable name (which may be a key field—e.g., variable names may include: GDP, oil prices, etc.), expected value, current value, historic value, associated macroeconomic variables, associated industry, time period, time duration, and/or the like. A microeconomic variables table 4519*b* includes fields such as, but not limited to: variable name (which may be a key field—e.g., variable names may include: sales revenue, margin, profit, costs, turnover, leverage, price to earnings ratio, etc.), expected value, current value, historic value, associated industry, associated company, time period, time duration, and/or the like. A time effects table 4519*c* includes fields such as, but not limited to: variable name (which may be a key field), time period, time duration, decay curve, and/or the like. An industries table 4519*d* includes fields such as, but not limited to: industry code (which may be a key field), industry name, associated macroeconomic variables, associated aggregate microeconomic variables, associated companies, and/or the like. A companies table 4519*e* includes fields such as, but not limited to: company code (which may be a key fiend—e.g., a ticker symbol), company name, associated microeconomic variables, and/or the like. An affected industries patterns table 4519*f* includes fields such as, but not limited to: associated macroeconomic variable (which may be key), industry code, industry name, and/or the like. An affected companies patterns table 4519*g* includes fields such as, but not limited to: associated industries (which may be key), company code, company name, and/or the like. An affected macroeconomic variables patterns table 4519*h* includes fields such as, but not limited to: variance from expectation for event, macroeconomic event variable (the combination of the preceding two fields may be key), associated macroeconomic variable, and/or the like.

In one embodiment, the Wavefront system database may interact with other database systems. For example, employing a distributed database system, queries and data access by the Wavefront system modules may treat the combination of the Wavefront system database, an integrated data security layer database as a single database entity.

In one embodiment, user programs may contain various user interface primitives, which may serve to update the Wavefront system. Also, various accounts may require custom database tables depending upon the environments and the types of clients a the Wavefront system may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 4519*a* j. The Wavefront system may be configured to keep track of various settings, inputs, and parameters via database controllers.

A the Wavefront system database may communicate to and/or with other modules in a module collection, including itself, and/or facilities of the like. Most frequently, the Wavefront system database communicates with a the Wavefront system module, other program modules, and/or the like. The database may contain, retain, and provide information regarding other nodes and data.

The Wavefront System

A the Wavefront system module 4535 is stored program code that is executed by the CPU. The Wavefront system affects accessing, obtaining and the provision of information, services, transactions, and/or the like across various communications networks.

The Wavefront system enables investors to design trades around macro themes. Part of the approach is a linked set of models called Wavefronts. Also, the Wavefront system may employ spreadsheets, databases, and/or other computational engines a basis for its computations and data interchange. The Wavefront system tracks viewing habits, enables the purchasing of extended views of programs, removes expired media programming content, and more. The Wavefront system coordinates with the Wavefront system database to identify interassociations as between macro and microeconomic variables, and/or any related information, such as industry sectors and specific companies.

A the Wavefront system module enabling access of information between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. In one embodiment, the Wavefront system server employs a cryptographic server to encrypt and decrypt communications. A the Wavefront system module may communicate to and/or with other modules in a module collection, including itself, and/or facilities of the like. Most frequently, the Wavefront system module communicates with a the Wavefront system database, operating systems, other program modules, and/or the like. The Wavefront system may contain, communicate, generate, obtain, and/or provide program module, system, user, and/or data communications, requests, and/or responses.

Distributed the Wavefront System

The structure and/or operation of any of the Wavefront system node controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the Wavefront system controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D) COM), (Distributed) Object Linking and Embedding ((D) OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

Appendix 1

| Universe | Index | Correlation with 1 month (21 trading day) return | | | | | | | |
|---|---|---|---|---|---|---|---|---|---|
| | | Consumer | Fed | Foreign GDP | Investment | 10 Year Note | Oil | GDP | TWI |
| Stock | SPX | -0.02 | 0.03 | 0.01 | 0.00 | 0.02 | 0.04 | -0.01 | 0.04 |
| | SPSUP | -0.08 | 0.12 | -0.11 | -0.10 | 0.07 | 0.07 | -0.11 | 0.11 |
| | RUI | 0.05 | -0.04 | 0.06 | 0.02 | -0.02 | -0.05 | 0.05 | -0.02 |
| Cap weighted industries | SPX | -0.40 | 0.16 | -0.17 | -0.13 | 0.07 | 0.15 | -0.25 | 0.24 |
| | SPSUP | -0.43 | 0.28 | -0.27 | -0.22 | 0.15 | 0.19 | -0.33 | 0.36 |
| | RUI | -0.20 | 0.20 | -0.10 | -0.19 | 0.11 | 0.17 | -0.24 | 0.30 |
| Cap weighted industries | SPX | -0.37 | 0.35 | -0.05 | -0.08 | 0.47 | 0.23 | -0.21 | 0.27 |
| | SPSUP | -0.45 | 0.48 | -0.16 | -0.20 | 0.56 | 0.27 | -0.32 | 0.39 |
| | RUI | -0.14 | 0.29 | 0.02 | -0.10 | 0.46 | 0.19 | -0.16 | 0.30 |

| Universe | Index | Correlation with 3 month (63 trading day) return | | | | | | | |
|---|---|---|---|---|---|---|---|---|---|
| | | Consumer | Fed | Foreign GDP | Investment | 10 Year Note | Oil | GDP | TWI |
| Stock | SPX | -0.11 | 0.03 | -0.11 | -0.01 | -0.03 | 0.13 | -0.05 | -0.03 |
| | SPSUP | -0.05 | 0.06 | -0.09 | -0.02 | 0.05 | 0.08 | -0.04 | 0.06 |
| | RUI | -0.06 | 0.06 | -0.06 | -0.06 | 0.06 | 0.07 | -0.06 | 0.06 |
| Cap weighted industries | SPX | -0.19 | 0.11 | -0.13 | 0.03 | 0.10 | 0.28 | -0.06 | -0.02 |
| | SPSUP | -0.20 | 0.19 | -0.17 | 0.00 | 0.18 | 0.30 | -0.08 | 0.04 |
| | RUI | -0.11 | 0.12 | -0.08 | 0.03 | 0.14 | 0.28 | -0.04 | 0.00 |
| Cap weighted industries | SPX | -0.03 | 0.24 | -0.08 | 0.07 | 0.54 | 0.57 | 0.02 | 0.41 |
| | SPSUP | -0.02 | 0.26 | -0.08 | 0.06 | 0.58 | 0.58 | 0.01 | 0.40 |
| | RUI | 0.25 | 0.11 | 0.19 | 0.08 | 0.50 | 0.45 | 0.13 | 0.28 |

Appendix 2A

Sector: Energy

| GS Group | Ticker | Company Name |
|---|---|---|
| Energy Equipment & Services | BHI | BAKER HUGHES INC |
| | BJS | BJ SERVICES CO |
| | HAL | HALLIBURTON CO |
| | NBR | NABORS INDUSTRIES LTD |
| | NE | NOBLE CORP |
| | RDC | ROWAN COS INC |
| | SLB | SCHLUMBERGER LTD |
| | RIG | TRANSOCEAN OFFSHORE INC |
| Integrated Oil & Gas | AHC | AMERADA HESS CORP |
| | CVX | CHEVRONTEXACO CORP |
| | COP | CONOCOPHILLIPS |
| | XOM | EXXON MOBIL CORP |
| | MRO | MARATHON OIL CORP |
| | OXY | OCCIDENTAL PETROLEUM CORP |

| GS Group | Ticker | Company Name |
|---|---|---|
| Oil & Gas Exploration & Production | APC | ANADARKO PETROLEUM CORP |
| | APA | APACHE CORP |
| | BR | BURLINGTON RESOURCES INC |
| | DVN | DEVON ENERGY CORP |
| | EOG | EOG RESOURCES INC |
| | KMG | KERR-MCGEE CORP |
| | UCL | UNOCAL CORP |
| Oil & Gas Refining, Marketing & Transportation | ASH | ASHLAND INC |
| | SUN | SUNOCO INC |

Sector: Materials

| GS Group | Ticker | Company Name |
|---|---|---|
| Chemicals | APD | AIR PRODUCTS & CHEMICALS INC |
| | DOW | DOW CHEMICAL |
| | DD | DU PONT (E I) DE NEMOURS |
| | EMN | EASTMAN CHEMICAL CO |
| | ECL | ECOLAB INC |
| | EC | ENGELHARD CORP |
| | GLK | GREAT LAKES CHEMICAL CORP |
| | HPC | HERCULES INC |
| | IFF | INTL FLAVORS & FRAGRANCES |
| | MON | MONSANTO CO |
| | PPG | PPG INDUSTRIES INC |
| | PX | PRAXAIR INC |
| | ROH | ROHM & HAAS CO |
| | SIAL | SIGMA-ALDRICH |
| Containers & Packaging | BLL | BALL CORP |
| | BMS | BEMIS CO |
| | PTV | PACTIV CORP |
| | SEE | SEALED AIR CORP |
| | TIN | TEMPLE-INLAND INC |

| GS Group | Ticker | Company Name |
|---|---|---|
| Construction Materials | VMC | VULCAN MATERIALS CO |
| Aluminum | AA | ALCOA INC |
| Diversified Metals & Mining | FCX | FREEPRT MCMOR COP&GLD -CL B |
| | PD | PHELPS DODGE CORP |
| Steel | ATI | ALLEGHENY TECHNOLOGIES INC |
| | NUE | NUCOR CORP |
| | X | UNITED STATES STEEL CORP |
| | WOR | WORTHINGTON INDUSTRIES |
| Paper & Forest Products | GP | GEORGIA-PACIFIC CORP |
| | IP | INTL PAPER CO |
| | LPX | LOUISIANA-PACIFIC CORP |
| | MWV | MEADWESTVACO CORP |
| | PCL | PLUM CREEK TIMBER CO INC |
| | WY | WEYERHAEUSER CO |

Sector: Industrials

| GS Group | Ticker | Company Name |
|---|---|---|
| Airlines | DAL | DELTA AIR LINES INC |
| | LUV | SOUTHWEST AIRLINES |
| Aerospace & Defense | BA | BOEING CO |
| | GD | GENERAL DYNAMICS CORP |
| | GR | GOODRICH CORP |
| | HON | HONEYWELL INTERNATIONAL INC |
| | LMT | LOCKHEED MARTIN CORP |
| | NOC | NORTHROP GRUMMAN CORP |
| | RTN | RAYTHEON CO |
| | COL | ROCKWELL COLLINS INC |
| | UTX | UNITED TECHNOLOGIES CORP |
| Construction & Engineering | FLR | FLUOR CORP |
| Industrial Conglomerates | MMM | 3M CO |
| | GE | GENERAL ELECTRIC CO |
| | TXT | TEXTRON INC |
| | TYC | TYCO INTERNATIONAL LTD |
| Machinery | CAT | CATERPILLAR INC |
| | CR | CRANE CO |
| | CMI | CUMMINS INC |
| | DHR | DANAHER CORP |
| | DE | DEERE & CO |
| | DOV | DOVER CORP |
| | ETN | EATON CORP |
| | ITW | ILLINOIS TOOL WORKS |
| | IR | INGERSOLL-RAND CO LTD |
| | ITT | ITT INDUSTRIES INC |
| | NAV | NAVISTAR INTERNATIONAL |
| | PCAR | PACCAR INC |
| | PLL | PALL CORP |
| | PH | PARKER-HANNIFIN CORP |

| GS Group | Ticker | Company Name |
|---|---|---|
| Building Products | ASD | AMERICAN STANDARD COS INC |
| | MAS | MASCO CORP |
| Electrical Equipment | APCC | AMERICAN PWR CNVRSION |
| | CBE | COOPER INDUSTRIES LTD |
| | EMR | EMERSON ELECTRIC CO |
| | PWER | POWER-ONE INC |
| | ROK | ROCKWELL AUTOMATION |
| | TNB | THOMAS & BETTS CORP |
| Trading Companies & Distributors | GWW | GRAINGER (W W) INC |
| Commercial Services & Supplies | AW | ALLIED WASTE INDUSTRIES INC |
| | APOL | APOLLO GROUP INC -CL A |
| | AVY | AVERY DENNISON CORP |
| | HRB | BLOCK H & R INC |
| | CD | CENDANT CORP |
| | CTAS | CINTAS CORP |
| | DLX | DELUXE CORP |
| | RRD | DONNELLEY (R R) & SONS CO |
| | EFX | EQUIFAX INC |
| | MNST | MONSTER WORLDWIDE INC |
| | PBI | PITNEY BOWES INC |
| | RHI | ROBERT HALF INTL INC |
| | WMI | WASTE MANAGEMENT INC |
| Transportation | BNI | BURLINGTON NORTHERN SANTA FE |
| | CSX | CSX CORP |
| | FDX | FEDEX CORP |
| | NSC | NORFOLK SOUTHERN CORP |
| | R | RYDER SYSTEM INC |
| | UNP | UNION PACIFIC CORP |
| | UPS | UNITED PARCEL SERVICE INC |

Sector: Consumer Discretionary

| GS Group | Ticker | Company Name |
|---|---|---|
| Hardline Retail | AN | AUTONATION INC |
| | AZO | AUTOZONE INC |
| | BBBY | BED BATH & BEYOND INC |
| | BBY | BEST BUY CO INC |
| | BLI | BIG LOTS INC |
| | BCC | BOISE CASCADE CORP |
| | CC | CIRCUIT CITY STORES INC |
| | EBAY | EBAY INC |
| | HD | HOME DEPOT INC |
| | LOW | LOWES COS |
| | ODP | OFFICE DEPOT INC |
| | RSH | RADIOSHACK CORP |
| | SHW | SHERWIN-WILLIAMS CO |
| | SPLS | STAPLES INC |
| | TIF | TIFFANY & CO |
| | TOY | TOYS R US INC |
| Automobiles & Components | CTB | COOPER TIRE & RUBBER |
| | DCN | DANA CORP |
| | DPH | DELPHI CORP |
| | F | FORD MOTOR CO |
| | GM | GENERAL MOTORS CORP |
| | GPC | GENUINE PARTS CO |
| | GT | GOODYEAR TIRE & RUBBER CO |
| | HDI | HARLEY-DAVIDSON INC |
| | JCI | JOHNSON CONTROLS INC |
| | VC | VISTEON CORP |
| Household Durables | AM | AMERICAN GREETINGS -CL A |
| | BDK | BLACK & DECKER CORP |
| | FO | FORTUNE BRANDS INC |
| | LEG | LEGGETT & PLATT INC |
| | MYG | MAYTAG CORP |
| | NWL | NEWELL RUBBERMAID INC |
| | SNA | SNAP-ON INC |
| | SWK | STANLEY WORKS |
| | TUP | TUPPERWARE CORP |
| | WHR | WHIRLPOOL CORP |
| Homebuilding | CTX | CENTEX CORP |
| | KBH | KB HOME |
| | PHM | PULTE HOMES INC |
| Leisure Equipment & Products | BC | BRUNSWICK CORP |
| | EK | EASTMAN KODAK CO |
| | HAS | HASBRO INC |
| | MAT | MATTEL INC |
| Softline Retail including Textiles | DDS | DILLARDS INC -CL A |

| GS Group | Ticker | Company Name |
|---|---|---|
| Softline Retail including Textiles | FD | FEDERATED DEPT STORES |
| | GPS | GAP INC |
| | JNY | JONES APPAREL GROUP INC |
| | KSS | KOHLS CORP |
| | LTD | LIMITED BRANDS INC |
| | LIZ | LIZ CLAIBORNE INC |
| | MAY | MAY DEPARTMENT STORES CO |
| | NKE | NIKE INC |
| | JWN | NORDSTROM INC |
| | JCP | PENNEY (J C) CO |
| | RBK | REEBOK INTERNATIONAL LTD |
| | TJX | TJX COMPANIES INC |
| | VFC | VF CORP |
| Hotels, Restaurants & Leisure | CCL | CARNIVAL CORP |
| | DRI | DARDEN RESTAURANTS INC |
| | HET | HARRAHS ENTERTAINMENT INC |
| | HLT | HILTON HOTELS CORP |
| | IGT | INTL GAME TECHNOLOGY |
| | MAR | MARRIOTT INTL INC |
| | MCD | MCDONALDS CORP |
| | SBUX | STARBUCKS CORP |
| | HOT | STARWOOD HOTELS&RESORTS WRLD |
| | WEN | WENDYS INTERNATIONAL INC |
| | YUM | YUM BRANDS INC |
| Media | CCU | CLEAR CHANNEL COMMUNICATIONS |
| | CMCSA | COMCAST CORP |
| | DIS | DISNEY (WALT) CO |
| | DJ | DOW JONES & CO INC |
| | GCI | GANNETT CO |
| | IPG | INTERPUBLIC GROUP OF COS |
| | KRI | KNIGHT-RIDDER INC |
| | MHP | MCGRAW-HILL COMPANIES |
| | MDP | MEREDITH CORP |
| | NYT | NEW YORK TIMES CO -CL A |
| | OMC | OMNICOM GROUP |
| | TWX | TIME WARNER INC |
| | TRB | TRIBUNE CO |
| | UVN | UNIVISION COMMUNICATIONS INC |
| | VIA.B | VIACOM INC -CL B |
| Multiline Retail | DG | DOLLAR GENERAL CORP |
| | FDO | FAMILY DOLLAR STORES |
| | S | SEARS ROEBUCK & CO |
| | TGT | TARGET CORP |
| | WMT | WAL-MART STORES |

Appendix 2B

Sector: Consumer Staples

| GS Group | Ticker | Company Name |
|---|---|---|
| Food & Staples Retailing | ABS | ALBERTSONS INC |
| | COST | COSTCO WHOLESALE CORP |
| | CVS | CVS CORP |
| | KR | KROGER CO |
| | SWY | SAFEWAY INC |
| | SVU | SUPERVALU INC |
| | SYY | SYSCO CORP |
| | WAG | WALGREEN CO |
| | WIN | WINN-DIXIE STORES INC |
| Beverages | BUD | ANHEUSER-BUSCH COS INC |
| | BF.B | BROWN-FORMAN -CL B |
| | RKY | COORS (ADOLPH) -CL B |
| Household & Personal Products | ACV | ALBERTO-CULVER CO |
| | AVP | AVON PRODUCTS |
| | CLX | CLOROX CO/DE |
| | CL | COLGATE-PALMOLIVE CO |
| | G | GILLETTE CO |
| | KMB | KIMBERLY-CLARK CORP |
| | PG | PROCTER & GAMBLE CO |

| GS Group | Ticker | Company Name |
|---|---|---|
| Food Products & Soft Drinks | ADM | ARCHER-DANIELS-MIDLAND CO |
| | CPB | CAMPBELL SOUP CO |
| | KO | COCA-COLA CO |
| | CCE | COCA-COLA ENTERPRISES |
| | CAG | CONAGRA FOODS INC |
| | GIS | GENERAL MILLS INC |
| | HNZ | HEINZ (H J) CO |
| | HSY | HERSHEY FOODS CORP |
| | K | KELLOGG CO |
| | MKC | MCCORMICK & CO |
| | PBG | PEPSI BOTTLING GROUP INC |
| | PEP | PEPSICO INC |
| | SLE | SARA LEE CORP |
| | WWY | WRIGLEY (WM) JR CO |
| Tobacco | MO | ALTRIA GROUP INC |
| | RJR | RJ REYNOLDS TOBACCO HLDGS |
| | UST | UST INC |

Sector: Health Care

| GS Group | Ticker | Company Name |
|---|---|---|
| Health Care Equipment & Supplies | ABI | APPLERA CORP APPLIED BIOSYS |
| | BCR | BARD (C.R.) INC |
| | BOL | BAUSCH & LOMB INC |
| | BAX | BAXTER INTERNATIONAL INC |
| | BDX | BECTON DICKINSON & CO |
| | BMET | BIOMET INC |
| | BSX | BOSTON SCIENTIFIC CORP |
| | GDT | GUIDANT CORP |
| | MDT | MEDTRONIC INC |
| | MIL | MILLIPORE CORP |
| | STJ | ST JUDE MEDICAL INC |
| | SYK | STRYKER CORP |
| | ZMH | ZIMMER HOLDINGS INC |
| Pharmaceuticals | ABT | ABBOTT LABORATORIES |
| | AGN | ALLERGAN INC |
| | BMY | BRISTOL MYERS SQUIBB |
| | FRX | FOREST LABORATORIES -CL A |
| | JNJ | JOHNSON & JOHNSON |
| | KG | KING PHARMACEUTICALS INC |
| | LLY | LILLY (ELI) & CO |
| | MRK | MERCK & CO |
| | PFE | PFIZER INC |
| | SGP | SCHERING-PLOUGH |
| | WPI | WATSON PHARMACEUTICALS INC |
| | WYE | WYETH |

| GS Group | Ticker | Company Name |
|---|---|---|
| Health Care Providers & Services | AET | AETNA INC |
| | ABC | AMERISOURCEBERGEN CORP |
| | ATH | ANTHEM INC |
| | CAH | CARDINAL HEALTH INC |
| | CI | CIGNA CORP |
| | ESRX | EXPRESS SCRIPTS INC |
| | HCA | HCA INC |
| | HMA | HEALTH MANAGEMENT ASSOC |
| | HUM | HUMANA INC |
| | RX | IMS HEALTH INC |
| | HCR | MANOR CARE INC |
| | MCK | MCKESSON CORP |
| | MHS | MEDCO HEALTH SOLUTIONS INC |
| | DGX | QUEST DIAGNOSTICS INC |
| | THC | TENET HEALTHCARE CORP |
| | UNH | UNITEDHEALTH GROUP INC |
| | WLP | WELLPOINT HEALTH NETWORKS INC |
| Biotechnology | AMGN | AMGEN INC |
| | BIIB | BIOGEN IDEC INC |
| | CHIR | CHIRON CORP |
| | GENZ | GENZYME CORP |
| | MEDI | MEDIMMUNE INC |

Sector: Financials

| GS Group | Ticker | Company Name |
|---|---|---|
| Thrifts & Mortgage Finance | CFC | COUNTRYWIDE FINANCIAL CORP |
| | GDW | GOLDEN WEST FINANCIAL CORP |
| | MTG | MGIC INVESTMENT CORP/WI |
| | WM | WASHINGTON MUTUAL INC |
| Diversified Financial Services | MCO | MOODYS CORP |
| | PFG | PRINCIPAL FINANCIAL GRP INC |
| Consumer Finance | AXP | AMERICAN EXPRESS |
| | COF | CAPITAL ONE FINL CORP |
| | KRB | MBNA CORP |
| | PVN | PROVIDIAN FINANCIAL CORP |
| | SLM | SLM CORP |
| Insurance | ACE | ACE LIMITED |
| | AFL | AFLAC INC |
| | ALL | ALLSTATE CORP |
| | ABK | AMBAC FINANCIAL GP |
| | AIG | AMERICAN INTERNATIONAL GROUP |
| | AOC | AON CORP |
| | CB | CHUBB CORP |
| | CINF | CINCINNATI FINANCIAL CORP |
| | JHF | HANCOCK JOHN FINL SVCS INC |
| | HIG | HARTFORD FINL SVCS GRP INC |
| | JP | JEFFERSON-PILOT CORP |
| | LNC | LINCOLN NATIONAL CORP |
| | LTR | LOEWS CORP |
| | MMC | MARSH & MCLENNAN COS |
| | MBI | MBIA INC |
| | MET | METLIFE INC |
| | PGR | PROGRESSIVE CORP-OHIO |
| | PRU | PRUDENTIAL FINANCIAL INC |
| | SAFC | SAFECO CORP |
| | SPC | ST PAUL COS |
| | TMK | TORCHMARK CORP |
| | TAP.B | TRAVELERS PPTY CAS CP -CL B |
| | UNM | UNUMPROVIDENT CORP |
| | XL | XL CAPITAL LTD |
| REITS: Industrial | PLD | PROLOGIS |
| REITS: Office Buildings | EOP | EQUITY OFFICE PROPERTIES TR |
| REITS: Retail | SPG | SIMON PROPERTY GROUP INC |
| REITS: Residential | AIV | APARTMENT INVT &MGMT -CL A |
| | EQR | EQUITY RESIDENTIAL |

| GS Group | Ticker | Company Name |
|---|---|---|
| Diversified Banks | BAC | BANK OF AMERICA CORP |
| | ONE | BANK ONE CORP |
| | CMA | COMERICA INC |
| | FBF | FLEETBOSTON FINANCIAL CORP |
| | USB | U S BANCORP |
| | WB | WACHOVIA CORP |
| | WFC | WELLS FARGO & CO |
| Regional Banks | ASO | AMSOUTH BANCORPORATION |
| | BBT | BB&T CORP |
| | CF | CHARTER ONE FINANCIAL INC |
| | FITB | FIFTH THIRD BANCORP |
| | FTN | FIRST TENNESSEE NATL CORP |
| | HBAN | HUNTINGTON BANCSHARES |
| | KEY | KEYCORP |
| | MTB | M & T BANK CORP |
| | MI | MARSHALL & ILSLEY CORP |
| | NCC | NATIONAL CITY CORP |
| | NFB | NORTH FORK BANCORPORATION |
| | PNC | PNC FINANCIAL SVCS GROUP INC |
| | RF | REGIONS FINL CORP |
| | SOTR | SOUTHTRUST CORP |
| | STI | SUNTRUST BANKS INC |
| | SNV | SYNOVUS FINANCIAL CP |
| | UPC | UNION PLANTERS CORP |
| | ZION | ZIONS BANCORPORATION |
| Asset Management & Custody Banks | BK | BANK OF NEW YORK CO INC |
| | FII | FEDERATED INVESTORS INC |
| | BEN | FRANKLIN RESOURCES INC |
| | JNS | JANUS CAPITAL GROUP INC |
| | MEL | MELLON FINANCIAL CORP |
| | NTRS | NORTHERN TRUST CORP |
| | TROW | PRICE (T. ROWE) GROUP |
| | STT | STATE STREET CORP |
| Investment Banking, Brokerage & Capital Markets | BSC | BEAR STEARNS COMPANIES INC |
| | C | CITIGROUP INC |
| | GS | GOLDMAN SACHS GROUP INC |
| | JPM | J P MORGAN CHASE & CO |
| | LEH | LEHMAN BROTHERS HOLDINGS INC |
| | MER | MERRILL LYNCH & CO |
| | MWD | MORGAN STANLEY |
| | SCH | SCHWAB (CHARLES) CORP |
| Freddie Mac & Fannie Mae | FNM | FANNIE MAE |
| | FRE | FEDERAL HOME LOAN MORTG CORP |

Appendix 2C

Sector: Information Technology

| GS Group | Ticker | Company Name |
|---|---|---|
| Software & Services | ADBE | ADOBE SYSTEMS INC |
| | ADSK | AUTODESK INC |
| | ADP | AUTOMATIC DATA PROCESSING |
| | BMC | BMC SOFTWARE INC |
| | CTXS | CITRIX SYSTEMS INC |
| | CA | COMPUTER ASSOCIATES INTL INC |
| | CSC | COMPUTER SCIENCES CORP |
| | CPWR | COMPUWARE CORP |
| | CE | CONCORD EFS INC |
| | CVG | CONVERGYS CORP |
| | ERTS | ELECTRONIC ARTS INC |
| | EDS | ELECTRONIC DATA SYSTEMS CORP |
| | FDC | FIRST DATA CORP |
| | FISV | FISERV INC |
| | INTU | INTUIT INC |
| | MERQ | MERCURY INTERACTIVE CORP |
| | MSFT | MICROSOFT CORP |
| | NOVL | NOVELL INC |
| | ORCL | ORACLE CORP |
| | PMTC | PARAMETRIC TECHNOLOGY CORP |
| | PAYX | PAYCHEX INC |
| | PSFT | PEOPLESOFT INC |
| | TSG | SABRE HOLDINGS CORP -CL A |
| | SEBL | SIEBEL SYSTEMS INC |
| | SDS | SUNGARD DATA SYSTEMS INC |
| | SYMC | SYMANTEC CORP |
| | UIS | UNISYS CORP |
| | VRTS | VERITAS SOFTWARE CO |
| | YHOO | YAHOO INC |
| Communications Equipment | ADCT | ADC TELECOMMUNICATIONS INC |
| | ANDW | ANDREW CORP |
| | AV | AVAYA INC |
| | CIEN | CIENA CORP |
| | CSCO | CISCO SYSTEMS INC |
| | CMVT | COMVERSE TECHNOLOGY INC |
| | GLW | CORNING INC |
| | JDSU | JDS UNIPHASE CORP |
| | LU | LUCENT TECHNOLOGIES INC |
| | MOT | MOTOROLA INC |
| | QLGC | QLOGIC CORP |
| | QCOM | QUALCOMM INC |
| | SFA | SCIENTIFIC-ATLANTA INC |
| | TLAB | TELLABS INC |

| GS Group | Ticker | Company Name |
|---|---|---|
| Computers & Peripherals | AAPL | APPLE COMPUTER INC |
| | DELL | DELL INC |
| | EMC | EMC CORP/MA |
| | GTW | GATEWAY INC |
| | HPQ | HEWLETT-PACKARD CO |
| | IBM | INTL BUSINESS MACHINES CORP |
| | LXK | LEXMARK INTL INC -CL A |
| | NCR | NCR CORP |
| | NTAP | NETWORK APPLIANCE INC |
| | SUNW | SUN MICROSYSTEMS INC |
| Electronic Equipment & Instruments | A | AGILENT TECHNOLOGIES INC |
| | JBL | JABIL CIRCUIT INC |
| | MOLX | MOLEX INC |
| | PKI | PERKINELMER INC |
| | SANM | SANMINA-SCI CORP |
| | SLR | SOLECTRON CORP |
| | SBL | SYMBOL TECHNOLOGIES |
| | TEK | TEKTRONIX INC |
| | TMO | THERMO ELECTRON CORP |
| | WAT | WATERS CORP |
| | XRX | XEROX CORP |
| Semiconductors & Semiconductor Equipment | AMD | ADVANCED MICRO DEVICES |
| | ALTR | ALTERA CORP |
| | ADI | ANALOG DEVICES |
| | AMAT | APPLIED MATERIALS INC |
| | AMCC | APPLIED MICRO CIRCUITS CORP |
| | BRCM | BROADCOM CORP |
| | INTC | INTEL CORP |
| | KLAC | KLA-TENCOR CORP |
| | LLTC | LINEAR TECHNOLOGY CORP |
| | LSI | LSI LOGIC CORP |
| | MXIM | MAXIM INTEGRATED PRODUCTS |
| | MU | MICRON TECHNOLOGY INC |
| | NSM | NATIONAL SEMICONDUCTOR CORP |
| | NVLS | NOVELLUS SYSTEMS INC |
| | NVDA | NVIDIA CORP |
| | PMCS | PMC-SIERRA INC |
| | TER | TERADYNE INC |
| | TXN | TEXAS INSTRUMENTS INC |
| | XLNX | XILINX INC |

Sector: Telecommunication Services

| GS Group | Ticker | Company Name |
|---|---|---|
| Diversified Telecommunication Services | AT | ALLTEL CORP |
| | T | AT&T CORP |
| | BLS | BELLSOUTH CORP |
| | CTL | CENTURYTEL INC |
| | CZN | CITIZENS COMMUNICATIONS CO |
| | Q | QWEST COMMUNICATION INTL INC |
| | SBC | SBC COMMUNICATIONS INC |
| | FON | SPRINT FON GROUP |
| | VZ | VERIZON COMMUNICATIONS |

| GS Group | Ticker | Company Name |
|---|---|---|
| Wireless Telecommunication Services | AWE | AT&T WIRELESS SERVICES INC |
| | NXTL | NEXTEL COMMUNICATIONS |
| | PCS | SPRINT PCS GROUP |

Sector: Utilities

| GS Group | Ticker | Company Name |
|---|---|---|
| Utilities | AES | AES CORP (THE) |
| | AYE | ALLEGHENY ENERGY INC |
| | AEE | AMEREN CORP |
| | AEP | AMERICAN ELECTRIC POWER |
| | CPN | CALPINE CORP |
| | CNP | CENTERPOINT ENERGY INC |
| | CIN | CINERGY CORP |
| | CMS | CMS ENERGY CORP |
| | ED | CONSOLIDATED EDISON INC |
| | CEG | CONSTELLATION ENERGY GRP INC |
| | D | DOMINION RESOURCES INC |
| | DTE | DTE ENERGY CO |
| | DUK | DUKE ENERGY CORP |
| | DYN | DYNEGY INC |
| | EIX | EDISON INTERNATIONAL |
| | EP | EL PASO CORP |
| | ETR | ENTERGY CORP |
| | EXC | EXELON CORP |

| GS Group | Ticker | Company Name |
|---|---|---|
| Utilities | FE | FIRSTENERGY CORP |
| | FPL | FPL GROUP INC |
| | KSE | KEYSPAN CORP |
| | KMI | KINDER MORGAN INC |
| | GAS | NICOR INC |
| | NI | NISOURCE INC |
| | PGL | PEOPLES ENERGY CORP |
| | PCG | PG&E CORP |
| | PNW | PINNACLE WEST CAPITAL |
| | PPL | PPL CORP |
| | PGN | PROGRESS ENERGY INC |
| | PEG | PUBLIC SERVICE ENTRP GRP INC |
| | SRE | SEMPRA ENERGY |
| | SO | SOUTHERN CO |
| | TE | TECO ENERGY INC |
| | TXU | TXU CORP |
| | WMB | WILLIAMS COS INC |
| | XEL | XCEL ENERGY INC |

Appendix 3A

| Ind # | Industry | Industry Sales Impact GDP | Industry Sales Impact PCE | Valuation Impact GDP | Valuation Impact PCE | Sales Impact DELTA |
|---|---|---|---|---|---|---|
| 206 | Machinery | 3.1% | 0.3% | 17.6% | 1.7% | 2.8% |
| 101 | Energy Equipment & Services | 2.9% | 0.3% | 1.5% | -0.1% | 2.6% |
| 456 | Semiconductor & Semiconductor Equipment | 4.0% | 1.7% | 12.2% | 4.2% | 2.2% |
| 154 | Aluminium | 2.6% | 0.6% | 9.6% | 1.5% | 2.2% |
| 207 | Trading Companies & Distributors | 2.4% | 0.3% | 0.6% | -0.5% | 2.2% |
| 155 | Diversified Metals & Mining | 2.5% | 0.7% | 12.4% | 2.5% | 2.0% |
| 157 | Steel | 2.3% | 0.3% | 9.2% | 0.8% | 2.0% |
| 152 | Construction Materials | 2.2% | 0.3% | 3.1% | -0.1% | 1.9% |
| 452 | Communications Equipment | 3.0% | 1.3% | 8.5% | 3.6% | 1.7% |
| 4010 | Diversified Banks | 4.0% | 2.3% | 0.4% | 0.9% | 1.7% |
| 4012 | Asset Management & Custody Banks | 4.5% | 2.8% | 1.8% | 2.2% | 1.7% |
| 203 | Construction & Engineering | 1.8% | -0.1% | -0.7% | -0.7% | 1.7% |
| 158 | Paper & Forest Products | 2.0% | 0.3% | 9.9% | 2.1% | 1.7% |
| 151 | Chemicals | 2.0% | 0.4% | 4.4% | 0.6% | 1.6% |
| 4013 | Investment Banking, Brokerage & Capital Markets | 3.0% | 1.6% | 0.8% | 0.9% | 1.4% |
| 454 | Electronic Equipment & Instruments | 1.2% | -0.2% | 1.6% | -0.6% | 1.4% |
| 103 | Oil & Gas Exploration & Production | 1.5% | 0.2% | -0.3% | -0.2% | 1.4% |
| 402 | Thrifts & Mortgage Finance | 0.4% | -0.9% | -4.1% | -2.8% | 1.3% |
| 4011 | Regional Banks | 3.0% | 1.8% | -1.6% | -0.1% | 1.2% |
| 102 | Integrated Oil & Gas | 1.1% | 0.1% | -1.3% | -0.4% | 1.0% |
| 205 | Industrial Conglomerates | 1.3% | 0.3% | -1.5% | -0.8% | 1.0% |
| 204 | Electrical Equipment | 1.7% | 0.8% | 3.3% | 3.0% | 0.9% |
| 551 | Utilities | 1.0% | 0.1% | -1.3% | -0.4% | 0.9% |
| 153 | Containers & Packaging | 1.1% | 0.2% | 1.4% | 0.1% | 0.9% |
| 453 | Computer & Peripherals | 1.3% | 0.5% | -0.3% | -0.6% | 0.8% |
| 209 | Transportation | 1.3% | 0.5% | 2.3% | 1.8% | 0.7% |
| 404 | Consumer Finance | 2.9% | 2.2% | -3.1% | -0.1% | 0.7% |
| 200 | Airlines | 1.2% | 0.6% | 10.1% | 3.9% | 0.6% |
| 501 | Diversified Telecommunication Services | 1.0% | 0.4% | -1.2% | 0.0% | 0.6% |
| 4014 | Freddie Mac & Fannie Mae | -0.3% | -0.8% | -5.5% | -3.2% | 0.5% |
| 208 | Commercial Services & Supplies | 2.1% | 1.6% | -2.3% | -0.2% | 0.5% |
| 104 | Oil & Gas Refining & Marketing & Transportation | 0.5% | 0.1% | -0.6% | 0.7% | 0.5% |
| 451 | Software & Services | 0.5% | 0.1% | 0.0% | -1.6% | 0.4% |
| 254 | Leisure Equipment & Products | 1.0% | 0.7% | 0.2% | 1.7% | 0.2% |
| 257 | Media | 0.5% | 0.4% | -0.1% | 1.4% | 0.1% |
| 250 | Hardline Retail | 0.5% | 0.4% | -0.9% | 0.8% | 0.1% |
| 354 | Pharmaceuticals | -0.1% | -0.2% | -3.8% | -1.8% | 0.1% |
| 304 | Tobacco | 0.5% | 0.4% | -3.4% | -1.3% | 0.1% |
| 256 | Hotels, Restaurants & Leisure | 0.4% | 0.3% | -1.8% | -1.7% | 0.1% |
| 305 | Household & Personal Products | 0.4% | 0.3% | -3.3% | -0.9% | 0.1% |
| 301 | Food & Staples Retailing | 0.4% | 0.3% | -2.7% | -0.5% | 0.1% |
| 258 | Soft/Hardline Retail | 0.2% | 0.2% | -1.9% | 0.1% | 0.1% |
| 502 | Wireless Telecommunication Services | 0.0% | 0.0% | -2.6% | -0.5% | 0.0% |
| 303 | Food Products & Soft Drinks | 0.0% | 0.0% | -3.1% | -0.8% | 0.0% |
| 353 | Biotechnology | 0.0% | 0.0% | 0.0% | 0.0% | 0.0% |
| 352 | Health Care Providers & Services | 0.0% | 0.0% | 0.0% | 0.0% | 0.0% |
| 351 | Health Care Equipment & Supplies | 0.0% | 0.0% | 0.0% | 0.0% | 0.0% |
| 201 | Aerospace & Defense | 0.0% | 0.0% | -0.7% | -0.3% | 0.0% |
| 255 | Softline Retail inc Textiles | 0.1% | 0.1% | -1.7% | -0.4% | 0.0% |
| 302 | Beverages | 0.1% | 0.1% | -2.7% | -0.5% | 0.0% |
| 406 | Insurance | -0.2% | -0.2% | -3.2% | -0.9% | -0.1% |
| 251 | Automobiles & Components | 0.1% | 0.2% | 0.2% | 1.5% | -0.1% |
| 202 | Building Products | 0.1% | 0.2% | 1.9% | 0.6% | -0.1% |
| 407 | REITS: Office Buildings | -0.4% | -0.3% | -9.3% | -5.5% | -0.1% |
| 252 | Household Durables | -0.3% | -0.2% | -3.7% | -1.3% | -0.2% |
| 253 | Homebuilding | 0.0% | 0.2% | -2.1% | 0.5% | -0.2% |
| 409 | REITS: Retail | -2.0% | -1.5% | -2.8% | -0.6% | -0.5% |
| 400 | REITS: Industrial | 0.2% | -1.3% | -1.1% | -2.9% | 1.5% |
| 4001 | REITS: Residential | 2.3% | 0.8% | -0.1% | 0.4% | 1.5% |

Appendix 3B

| Industry | Industry sales impact of 1% GDP Growth | Industry sales impact of 1% GDP growth generated via PCE | Industry sales impact of 1% PCE Gropwth |
|---|---|---|---|
| Semiconductor & Semiconductor Equipment | 4.0% | 2.3% | 1.7% |
| Machinery | 3.1% | 0.5% | 0.3% |
| Communications Equipment | 3.0% | 1.7% | 1.3% |
| Investment Banking, Brokerage & Capital Markets | 3.0% | 2.1% | 1.6% |
| Steel | 2.3% | 0.3% | 0.3% |
| Oil & Gas Exploration & Production | 1.5% | 0.2% | 0.2% |
| Industrial Conglomerates | 1.3% | 0.5% | 0.3% |
| Integrated Oil & Gas | 1.1% | 0.2% | 0.1% |
| Leisure Equipment & Products | 1.0% | 1.0% | 0.7% |
| Media | 0.5% | 0.5% | 0.4% |
| Hardline Retail | 0.5% | 0.5% | 0.4% |

Note a 1% PCE shock generates .75% GDP so we scale by 4/3

Additional risk metrics for the major ETF pairs and Wavefront baskets

Appendix 4

| Trade Implementation | Number of Long Positions | Number of Short Positions | Number of Industries in the Long Position | Number of Industries in the Short Position | Effective N of the Long Position | Effective N of the Short Position | Effective N of Basket | Share of Capital in Largest 5 Positions | Annualized Monthly Volatility (%) | Annualized Macro Volatility (%) | Annualized View Volatility (%) | Annualized Non-Macro Volatility (%) | Annualized Incidental Risk (%) | Daily Volatility to Monthly Volatility (%) |
|---|---|---|---|---|---|---|---|---|---|---|---|---|---|---|
| Wavefront Growth Basket | 89 | 124 | 9 | 11 | 46 | 57 | 102 | 7.7% | 18.1 | 14.8 | 21.8 | 14.1 | 14.4 | 0.8 |
| Wavefront Turbo Growth Basket | 42 | 37 | 6 | 8 | 26 | 23 | 48 | 18.1% | 28.5 | 28.7 | 33.8 | 20.6 | 23.1 | 0.8 |
| Wavefront Rates Basket | 112 | 58 | 12 | 9 | 51 | 36 | 85 | 10.3% | 12.9 | 7.7 | 7.1 | 7.7 | 8.1 | 0.8 |
| Wavefront Consumer Basket | 71 | 123 | 9 | 17 | 54 | 76 | 128 | 10.1% | 10.3 | 6.1 | 6.2 | 9.8 | 9.7 | 0.8 |
| Wavefront Housing Basket | 33 | 91 | 4 | 11 | 15 | 29 | 39 | 46.0% | 12.3 | 13.9 | 8.5 | 8.4 | 10.7 | 1.0 |
| Wavefront Oil Basket | 13 | 500 | 2 | 60 | 13 | 117 | 47 | 42.0% | 22.6 | 22.0 | 22.8 | 10.8 | 10.4 | 0.8 |
| Wavefront Oil Basket with GDP Risk | 27 | 42 | 4 | 8 | 25 | 33 | 57 | 17.4% | 30.8 | 34.8 | 33.2 | 17.4 | 22.4 | 0.8 |
| Wavefront Foreign Growth Basket | 62 | 63 | 8 | 8 | 29 | 38 | 65 | | 9.7 | 8.8 | 7.1 | 7.7 | 8.2 | 0.9 |
| Long Industrials - Short SPX (XLI-SPX) | 58 | 500 | 10 | 60 | 15 | 117 | 53 | 21.5% | 8.8 | 8.1 | 7.0 | 11.1 | 9.9 | 0.9 |
| Long Materials - Short SPX (XLB-SPX) | 33 | 500 | 7 | 60 | 16 | 117 | 58 | 23.0% | 16.5 | 12.5 | 10.9 | 16.1 | 15.3 | 0.8 |
| Long Tech - Short SPX (XLK-SPX) | 90 | 500 | 7 | 60 | 21 | 117 | 71 | 20.0% | 20.1 | 4.9 | 5.8 | 18.2 | 18.3 | 0.8 |
| Long QQQQ - Short SPX (QQQQ-SPX) | 100 | 500 | 17 | 60 | 38 | 117 | 115 | 13.5% | 17.8 | 4.3 | 5.2 | 16.5 | 16.0 | 0.9 |
| Long Consumer Staples - Short SPX (XLP-SPX) | 37 | 500 | 5 | 60 | 13 | 117 | 47 | 24.7% | 14.1 | 5.9 | 2.2 | 13.3 | 13.5 | 1.0 |
| Long Consumer Discretionary - Short SPX (XLY-SPX) | 85 | 500 | 9 | 60 | 33 | 117 | 104 | 15.0% | 11.7 | 2.2 | 2.2 | 11.0 | 10.5 | 0.9 |
| Long Retail - Short SPX (RTH-SPX) | 20 | 500 | 3 | 60 | 10 | 117 | 36 | 31.0% | 16.4 | 4.3 | 3.2 | 16.8 | 15.8 | 0.8 |
| Long Energy ETF - Short SPX (XLE-SPX) | 27 | 500 | 4 | 60 | 11 | 117 | 41 | 26.0% | 20.4 | 17.7 | 18.1 | 9.0 | 8.6 | 0.8 |
| Long SPX - Short Financials (SPX-XLF) | 500 | 80 | 60 | 13 | 117 | 26 | 84 | 19.5% | 9.4 | 2.4 | 0.8 | 9.4 | 9.1 | 0.9 |
| Long SPX - Short Regional Banks (SPX-RKH) | 500 | 19 | 60 | 4 | 117 | 12 | 42 | 29.5% | 13.4 | 2.1 | 0.3 | 13.7 | 13.3 | 0.8 |
| Long Materials - Short Consumer Staples (XLB-XLP) | 33 | 37 | 7 | 5 | 18 | 13 | 29 | 33.4% | 20.2 | 17.4 | 18.4 | 16.6 | 18.1 | 0.9 |
| Long Industrials - Short Consumer Staples (XLI-XLP) | 58 | 37 | 10 | 5 | 15 | 13 | 28 | 34.8% | 17.3 | 11.2 | 14.5 | 18.5 | 14.8 | 0.9 |
| Long Consumer Discretionary - Short Materials (XLY-XLB) | 86 | 33 | 9 | 7 | 33 | 18 | 43 | 24.5% | 17.8 | 13.6 | 8.5 | 18.1 | 15.3 | 0.9 |
| Long Consumer Discretionary - Short Industrials (XLY-XLI) | 86 | 58 | 9 | 10 | 33 | 15 | 41 | 24.2% | 14.9 | 6.9 | 3.2 | 16.6 | 13.9 | 0.8 |

Appendix 5

Global Economics Weekly

Issue No: 04/34
29th September 2004

GS GLOBAL ECONOMIC WEBSITE
Economic Research from the GS Institutional Portal
at https://portal.gs.com

A New Way of Reading Macro From the Markets: the Wavefront Market Monitor

We have recently introduced a new product, the Wavefront Market Monitor, which is designed to show how equity markets are changing their views on the major macro parameters—growth, rates and oil prices—over time, using the relative performance of industries in the US equity market as its guide.

The information in the Market Monitor can be incorporated into investment decisions in several ways. First, they provide a clean read on what at least one asset market is saying about the economic environment.

Second, we have seen that a move in one market often precedes a move in another market. Differences between various asset markets may be relevant in helping to form, reinforce or discourage views about one or other markets.

Third, it may be possible to exploit the tensions between views in different markets directly, by trading the two markets against each other.

The equity market's recent performance suggests that macro views are at an interesting point. The market has been revising its growth views up recently, largely shrugging off any signs of deceleration. Instead, it has assumed that the rate environment will be much more benign. Either growth expectations will have to come down or rate views will have to go up. Our economic views suggest that expectations may be forced to adjust on both fronts.

Change in equity market's view of GDP growth (% points) *

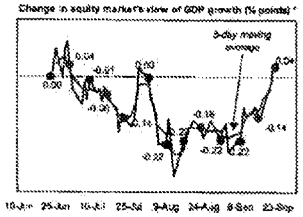

Change in equity market's view of 2-year rate (% points) *

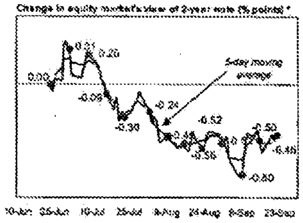

Change in equity market's view of oil price ($/bbl) *

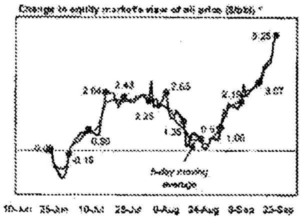

*Cumulative daily changes relative to 3 months ago.
Numbered circles represent weekly intervals.
Source: Goldman Sachs Research.

Goldman Sachs

Important disclosures appear at the back of this document.

A New Way of Reading Macro From the Markets: the Wavefront Market Monitor

An ongoing challenge in macro investing is working out what economic expectations are built into markets and how those views are changing. Increasingly, we find that investors pull information from multiple sources and multiple asset markets to generate their views. Equity investors pay more attention to the bond, currency and commodity markets than they did a decade ago. And currency and bond traders look increasingly to clues from the equity market as to where new trends are emerging. Earlier this year, we introduced our Wavefront SM models as a tool for translating economic views into equity market trades.

We have recently introduced a new product -- the Wavefront Market Monitor -- which is designed to show how equity markets are changing their views on the major macro parameters -- growth, rates and oil prices -- over time, using the relative performance of industries in the US equity market as its guide. Perhaps most importantly, we can quantify those shifts and illustrate how extreme they are relative to history. We do not know of anyone who has done this before.

Although the original Wavefront models are essentially designed for trading and implementing macro views in equities, we have found the shifts in the equity market's views to be a useful input for investors in other asset markets. Revisions to the equity market's economic views can sometimes signal changes elsewhere and tension between the equity market's views and views in other markets can also help to generate trading ideas.

We describe the main features of the Market Monitor here -- what it presents and where that information comes from. The equity market's recent performance suggests that macro views are currently at an interesting point. The market has actually been revising its growth views up recently -- despite rising oil prices -- largely shrugging off any signs of deceleration in the economy over the last few months. Instead, it has assumed that the rate environment will be much more benign. We think a tension is building: either growth expectations will have to come down or rate views will have to go up. Rising oil prices probably add to that tension. Our own economic views suggest that a combination of both corrections may lie ahead of us.

Why the equity market is a rich vein of macro information

Our Equity Trading Strategies Group has recently started to publish the Wavefront Market Monitor on a weekly basis, for release on Thursday mornings. The Market Monitor is a 2-page document that is designed to summarise a number of key message about shifting economic expectations from the equity market's performance.

The main sections in the Market Monitor are set out in the box on page 6, but the most important information that the Monitor provides is a view on what the price action in the US equity market says about how investors must be shifting their views of growth rates and oil. In particular, the tools allow us to make statements of the following kind:

- The equity markets view of GDP growth has increased by 50 basis points over the last month; a 90th percentile move.
- The oil price built into the equity market has moved up 15% or $6 in the past month.
- Interest rate expectations have increased by 25 basis points following the release of the payrolls numbers.

Although the equity market on the surface is arguably the least directly macro-focused of the major markets, it is actually surprisingly well-suited for identifying shifts in economic views. Equity markets contain many instruments and investors, synthesising a vast quantity of micro-level information about economic performance. As a result, they respond to a large amount of information that is additional to (and often ahead of) the main macro news releases.

Although many investors watch the main equity indices for clues, the richest source of information comes from the relative performance of industries and stocks below the index level, where shifts in macro views often play out even as the index remains stable. To interpret the complex combinations of expectations that are continually expressed at this level, we need a relatively high-powered set of models.

A whistle-stop tour of the Wavefront models: mapping economics into returns

We first introduced the Wavefront models in April to provide a way for investors to convert economic views into long-short/over-underweight positions in the equity market and to risk-adjust the resulting trades to provide the highest return to a macro view at the lowest risk to other macro and market factors. (See Introducing Wavefronts, April 28, 2004 for a full description).

Essentially the tool (shown in the figure on page 3) combines a time-series model of the US economy with a series of industry- and company-level models to estimate

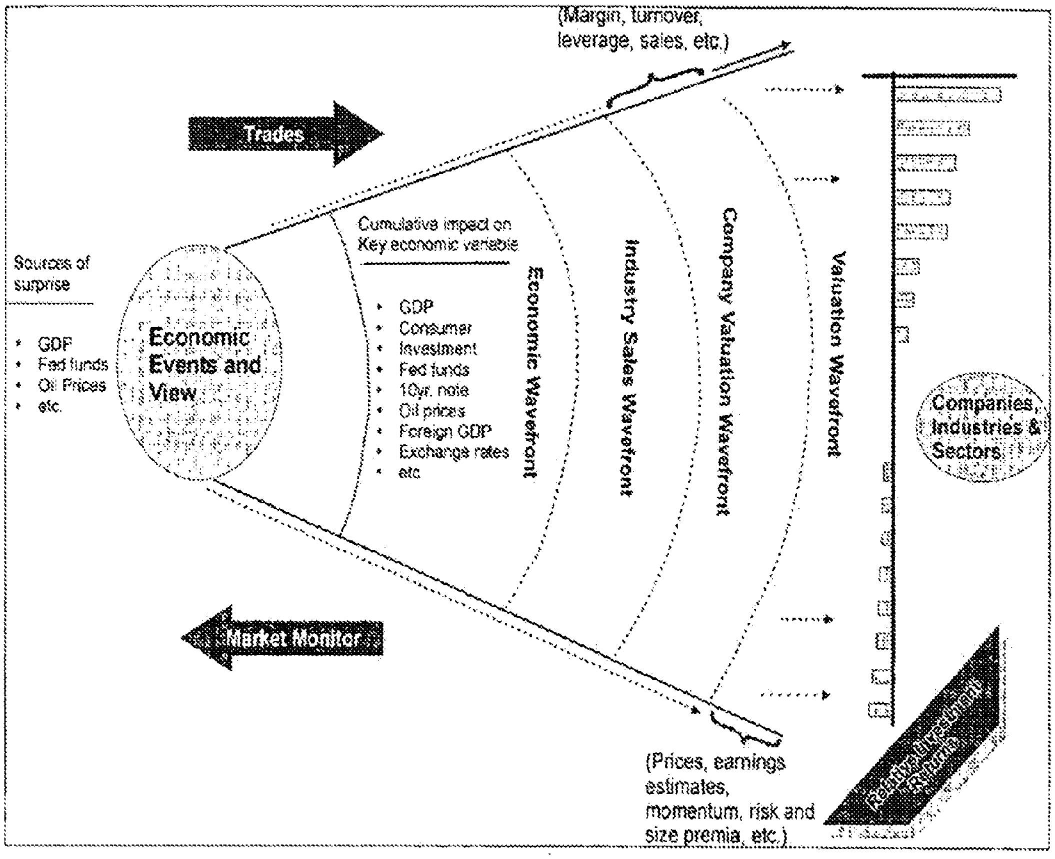

the sensitivity of each stock to economic factors such as GDP growth; changes in yields and the shape of the yield curve; energy costs; consumer spending; investment and a range of other macro variables.

Moving through the system from left to right allows us to map shifts in the economic outlook into views on the likely returns across industries and stocks. This in turn allows us to create a portfolio of equity holdings to express a macro view.

Reversing the logic: what returns say about economics

The Wavefront Market Monitor reverses that logic and operates the system from right to left. It asks the question "What pattern of the change in economic expectations is most consistent with the pattern of returns observed in the equity market?" To get an answer, we use the returns of the S&P 500 stocks as described by the 60 Wavefront industries.

The intuition is straightforward: at a crude level, when energy stocks outperform, then it is likely that oil price expectations have increased. When industries that are negatively affected by rate increases underperform, then rate expectations have risen. And when cyclicals outperform defensives then growth expectations have increased. The Market Monitor measures the effects simultaneously in order to account for the interaction between each of the main macro factors and allows us to quantify them by running them back through the Wavefront system. Industry returns can, of course, be driven by non-economic factors, but these are unlikely to affect the relevant groups systematically and so should not contaminate the results.

The panel of three charts in the left column of page 5 shows the revisions over the past three months to the market's view of GDP growth, interest rates and oil prices (we focus on these three variables, since they appear to be the first order macro drivers of industry returns). The panel of charts presents the most recent (September 22) Market Monitor's answer to this question (a new Market Monitor will be released tomorrow morning).

The top chart of the panel displays the changes in the equity market's view of GDP growth baselined to three months ago. Over the period from June 23 to Sep 22 the equity market's view of GDP growth has been virtually flat, rising by only 4bps cumulatively over the three month period. These estimates represent changes to the average annualized growth rate over the next two years. Expectations fell from June to early August by approximately 22 bps, held flat for the next 4 weeks and have moved up again since the beginning of September.

The middle chart of the panel shows the change in the equity market's view of interest rates (remember this is basically defined by the performance of rate-sensitive sectors of the equity market, not by bond market activity). Perhaps unsurprisingly, given the recent fall in yields, the equity market's view of rates has fallen sharply over the 3-month period. From peak to trough the chart shows a move of more than 110bp (+0.31 to -0.80 on the picture). Ignoring the day to day wiggles, we would characterize the market's rate view as approximately 50bp below where it was 3 months ago and in a narrow range for the past six weeks.

The bottom chart of the panel shows the change in the equity market's view of oil prices. With actual oil prices rising over the past three months, the equity market has significantly revised up its view of the average oil price likely to prevail over the next two years higher (by over $5/bbl), though the two markets have not always moved in lockstep.

Several of these moves are quite significant on a historical basis. The 18bp upward revision in growth over the week to September 22 is in the 90th percentile of weekly moves over the past 20 years. As we discuss below, the combination of shifts we have seen (upward revisions to growth views, downward revisions to rates views and higher oil price expectations) point at tensions – both across markets and relative to our own views of how the world is likely to unfold.

How can investors use the information?

The information in the Market Monitor can be incorporated into investment decisions in several different ways.

First, they provide a clean way of getting a fix on what at least one asset market is saying about the economic environment. By comparing this against an investor's own views, they can work out whether they think that view is reasonable or whether a theme they were hoping would play out has already been priced.

Second, we have seen that a move in one market often precedes a move in another market. For example, the pattern of industry rotations may suggest a growth slowdown that is not yet reflected in the index or in other growth-sensitive assets (commodity currencies, Asian equity indices) or a decline in rate expectations within the equity market may be a precursor to a move in the bond market. We are not saying that one market always leads or lags the other, but different markets *are* connected and differences between them may be relevant in helping to

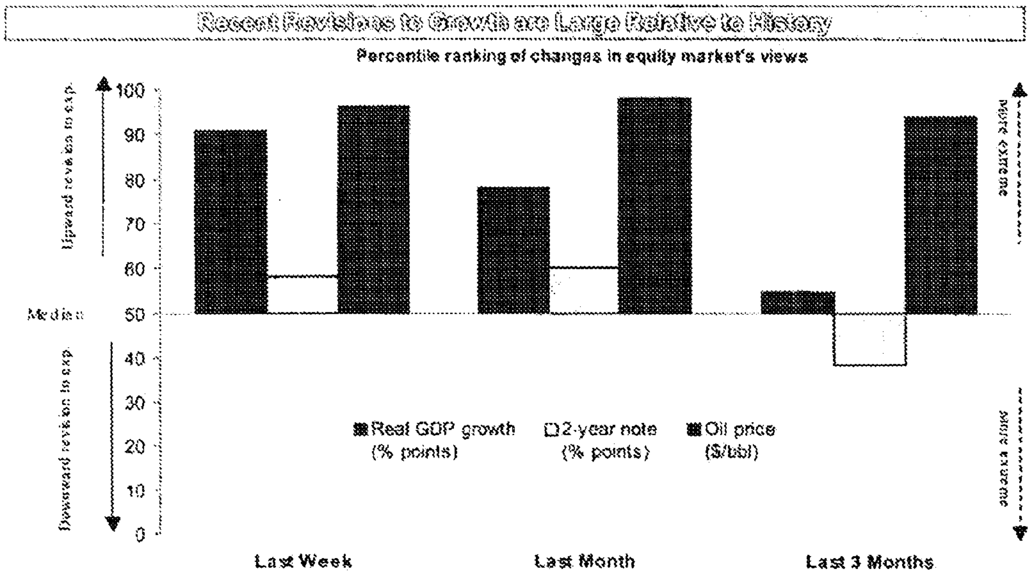

Goldman Sachs Economic Research Global Economics Weekly

Change in equity market's view of GDP growth (% points) *

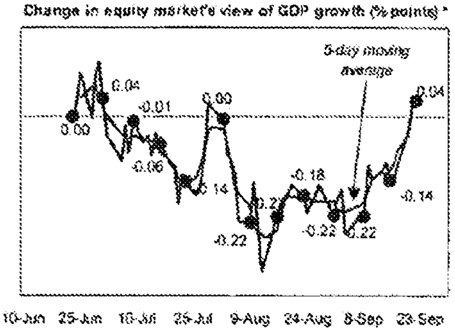

Change in equity market's view of 2-year note (% points) *

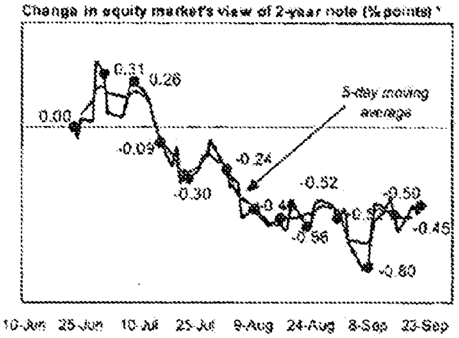

Change in equity market's view of oil price ($/bbl) *

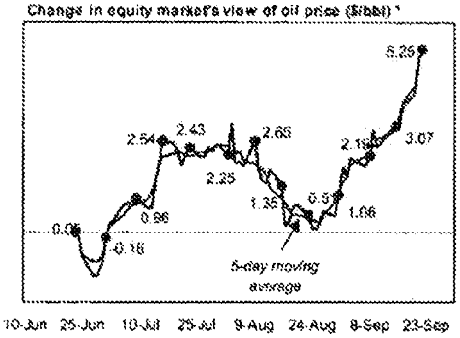

*Cumulative daily changes relative to 3 months ago
Numbered circles represent weekly intervals
Source: Goldman Sachs Research form, reinforce or discourage views about one or other market.

Third, it may be possible to exploit the tensions between views in different markets directly, by trading the two markets against each other. Where the equity market's view of rates appears to differ from the bond markets, or its view of oil prices from the commodities market, it may be possible to design trades to exploit a convergence.

The basic insight is that the information here provides investors across different asset markets with additional information about how macro expectations are shifting and

Equity Market's Growth Views Stuck in a Range After a Big Upgrade in 2003

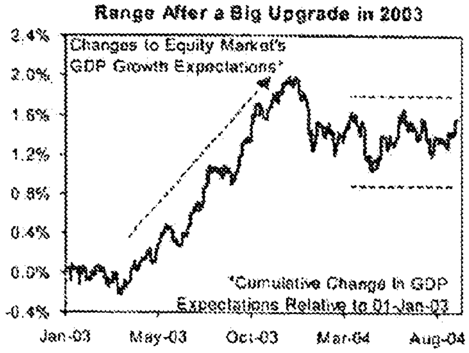

Equity Market Has Revised its Rate Views Down Since April

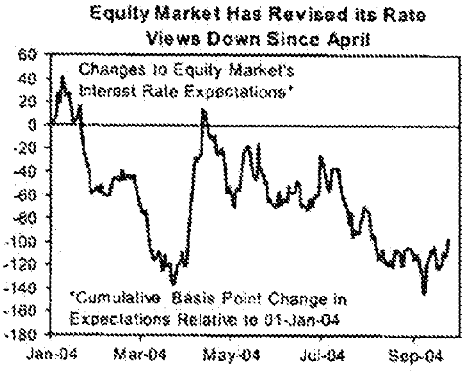

where tensions and opportunities may be building relative to their views.

What we see now: emerging tension between growth and rates

What has the market been telling us now and how does that fit with our economic views? Perhaps the key feature has been that the equity market has not revised its growth expectations down significantly and as we showed earlier, in fact in recent weeks has become more optimistic about growth. A longer time series of growth expectations shows even more starkly that after a big upward revision to growth views through 2003 as it became clear that the economy was coming out of recession, growth expectations have been relatively stable since the start of 2004.

What has happened though, at least until very recently, is that the equity market has revised down its view of rates significantly, unwinding much of the fear of higher rates that it priced in ahead of the start of Fed tightening in March. This means that the equity market has effectively taken any evidence of softer growth that we have seen over the last few months -- including the possible damage from higher oil prices -- and assumed that it would be offset (if not overcompensated for) by a relatively more relaxed approach to monetary tightening.

That benign view has its limits, particularly when we compare it to our own economic forecasts. Those forecasts look for US growth to be lower than expected over the next 12 months, but for inflation to remain stickier, as productivity growth slows and unit labour cost pressure emerges. The latest rise in oil prices reinforces our views both that growth risks are rising and that more inflationary pressure is due to come through the pipeline.

In that sense the latest Market Monitor readings point to a growing tension: it seems likely that either growth expectations will have to come down or rate views will have to go up (both in the equity and bond markets). Our own economic views suggest that over the next few months, expectations may be forced to adjust on both fronts. We will be watching the Wavefront Market Monitor closely for early signals that this is starting to occur.

Dominic Wilson and Lewis Segal
Equity Trading Strategies Group

Five questions addressed in the Wavefront Market Monitor

The Market Monitor is organized around five basic sections each corresponding to a question:

1. How has the equity market changed its economic views?

We use the relative move in industry returns to describe the change in economic views. The equity market focuses on a relatively long horizon so these changes are reported on a two-year average basis. In other words, a 50bp change in GDP growth expectations would be an upward revision in the average GDP growth rate over the next year and the year after that. We also examine how extreme the weekly, monthly, and quarterly points are relative to the past 20 years of history. Comparisons across these horizons and relative to history are particularly helpful in identifying turning points.

2. What is driving the changes in the equity market's economic views?

The second section of the Market Monitor shows what is driving the market's changing views. The market's views are measured against three Wavefronts: one corresponding to a growth shock; one corresponding to a rate shock; and one corresponding to an oil shock. Each shock affects expectations of the other variables. This section tells you for instance, whether an upward revision to growth expectations is being driven by lower oil prices, lower rates or a more optimistic view of demand itself or some combination.

3. Is the equity market trading macro themes?

Sometimes the equity market is focused on macro themes and sometimes, perhaps during earning season, it is focused on micro themes. Our Macro Trading Index is an attempt to distinguish when macro is and isn't an important driver of industry returns. The index is designed to tell us whether macro factors are dominant in the equity market.

4. What are the returns to trading a single macro theme?

The fourth section of the Market Monitor shows the recent returns from trading a long-short industry basket leveraged to a particular macroeconomic theme such as increased growth or a consumer slowdown. These are tracking baskets to help investors understand the recent performance through a macro filter. The baskets are cap-weighted within industry, equal-weighted across industries, and rebalanced daily.

5. What are the top ten and bottom ten industry performers?

The final section of the Market Monitor simply reports the performance of the S&P500 along with the top and bottom 10 industries at each horizon. We have found it helpful to see the returns of the individual industries, particularly for those who do not watch the equity market on a regular basis.

Global Economic Indicators: Policies and Markets

*Real short rates are at their lowest levels for decades.*

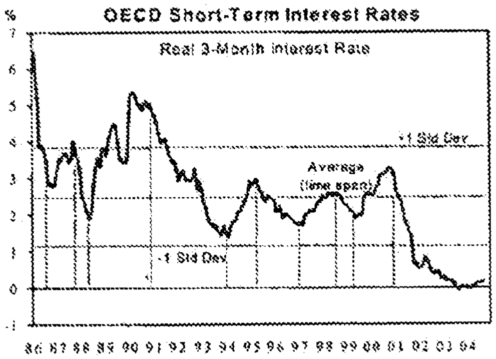

Shaded areas denote periods of monetary tightening

*Real bond yields remain well below their long-term averages.*

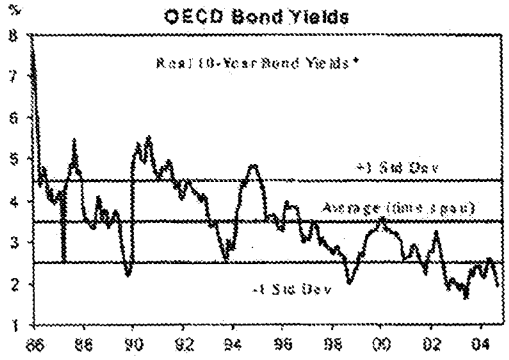

*Italy included from March 1991

*Equity markets have recovered in recent weeks.*

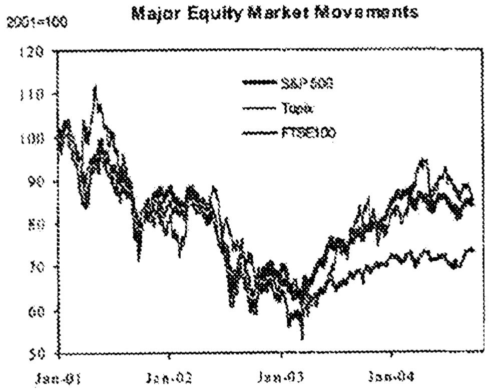

*Despite improving fundamentals, the strong case for favouring credit over other asset classes has faded.*

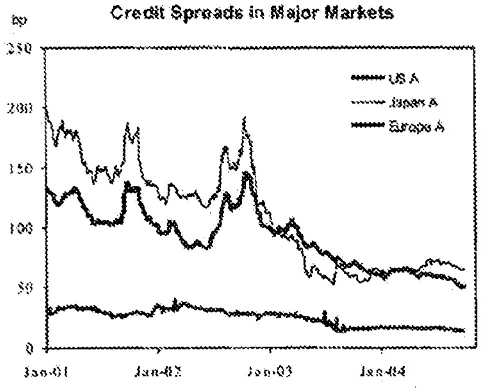

*The trade-weighted dollar has lost ground in recent months.*

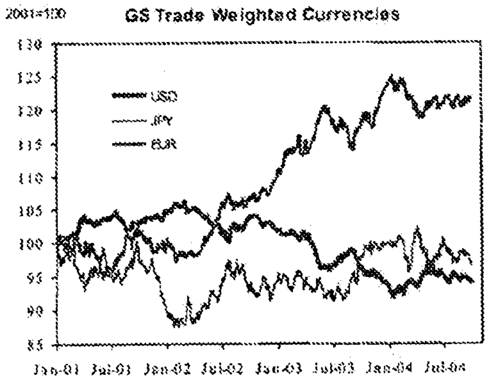

*US financial conditions have tightened, while Euroland remains flat and Japan's financial conditions have eased.*

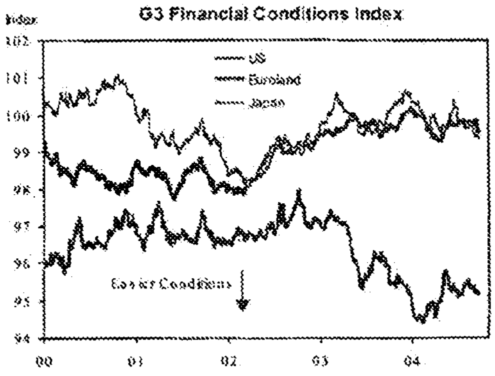

Global Economic Indicators: Macroeconomic Developments

*Our Global Leading Indicator shows growth momentum is slowing.*

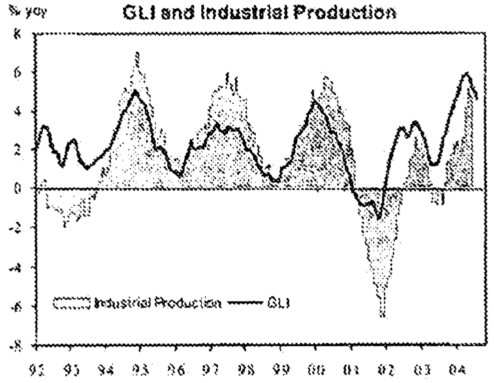

*The fall in our Euroland GS Analyst Index is still consistent with ongoing, but moderate, expansion in activity.*

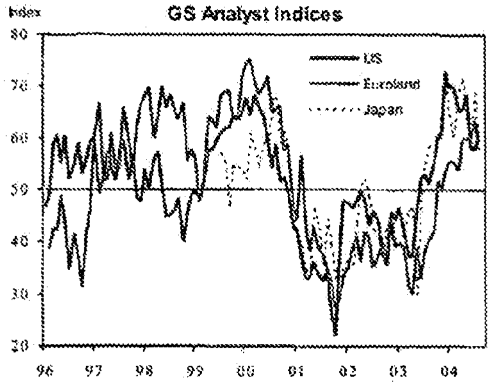

*Industrial production and export volumes are recovering together this year, although we see a moderate slowdown ahead.*

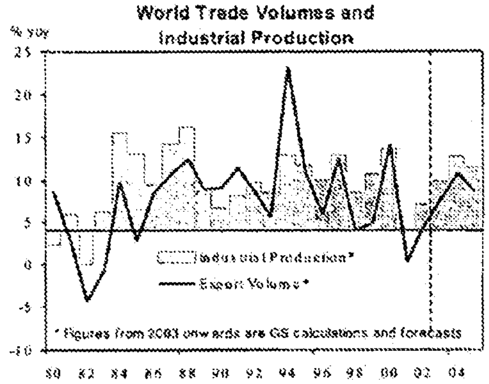

*Chinese activity lost momentum during the summer.*

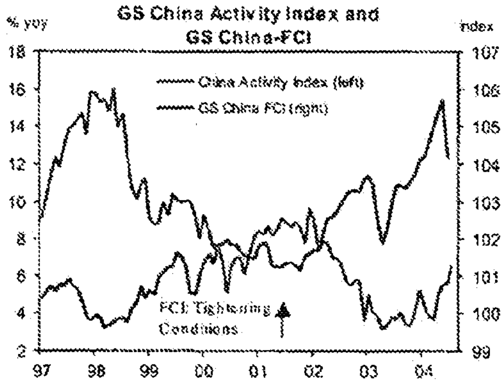

*Rising commodity prices reflect stronger global demand, especially from China.*

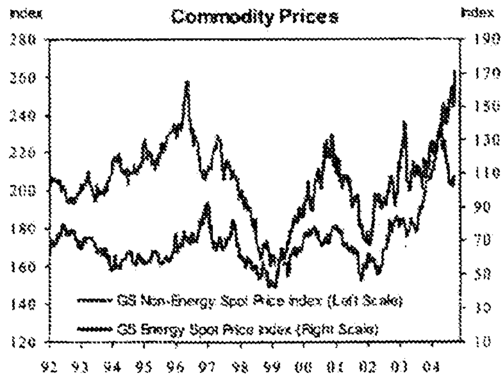

*Inflationary pressures in the advanced economies will edge higher throughout 2004.*

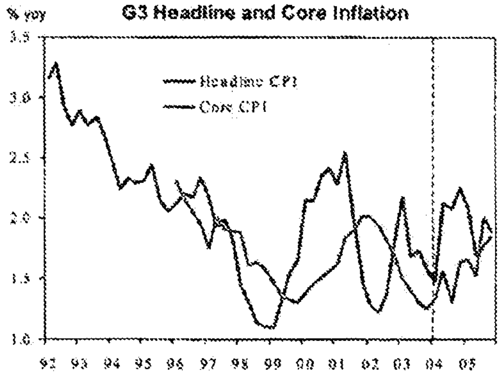

Global Economic Indicators: Market Valuations

*Our economics-based estimates show the Equity Risk Premium (ERP) moving back to historical averages.*

Updated Estimates for the Equity Risk Premium*

| | Real GDP Growth | Real Earnings Growth | + Dividend Yield | = Expected Real Return | - Real Bond Yield | = Implied ERP | Expected Inflation | Expected Nominal Return |
|---|---|---|---|---|---|---|---|---|
| US | 3.0 | 3.0 | 1.8 | 4.8 | 1.7 | 3.1 | 2.0 | 6.8 |
| Japan | 1.5 | 2.0 | 1.0 | 3.0 | 0.9 | 2.1 | 0.5 | 3.5 |
| UK | 2.5 | 2.5 | 3.3 | 5.8 | 1.5 | 4.2 | 2.0 | 7.8 |
| Europe ex UK | 2.3 | 2.3 | 2.9 | 5.1 | 1.5 | 3.6 | 2.0 | 7.1 |
| World | 2.5 | 2.5 | 2.2 | 4.7 | 1.5 | 3.2 | 1.8 | 6.4 |

*Calculated as of 28 September 2004.

*Global equity markets remain jittery across the board.*

Weekly Equity Market Performance

Price change for the week ending 28/09/04, % local currency terms

| | US | Europe | Japan | Hong Kong |
|---|---|---|---|---|
| **Market** | **-1.61** | **-0.45** | **-2.36** | **-2.67** |
| Basic industries | 0.61 | 0.26 | -2.14 | -3.78 |
| Resources | 0.55 | 1.27 | 2.47 | 4.42 |
| Engineering & machinery | -1.32 | -1.57 | -2.00 | 1.74 |
| Financials | -2.12 | -1.01 | -1.62 | -1.82 |
| Health | 0.08 | 0.49 | -1.46 | - |
| Utilities | -0.04 | 0.70 | -2.44 | -1.55 |
| Transport | -1.15 | -0.20 | -2.33 | -3.89 |
| Information techology | -3.29 | -2.40 | -4.21 | -4.49 |
| Telecom services | -1.49 | -0.09 | -5.70 | -6.02 |
| Media & entertainment | -1.31 | -1.39 | -1.91 | -2.47 |

Source: Datastream

*The US equity risk premium is rising, driven by the fall in bond yields.*

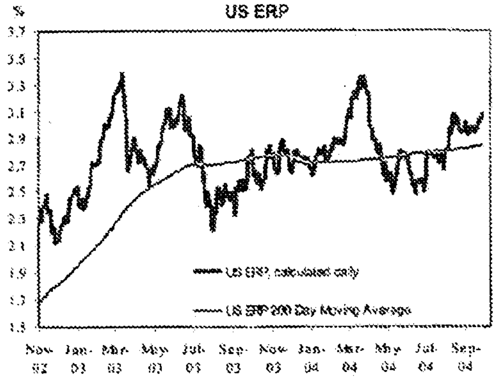

*Expected equity returns relative to corporate bonds continue to rise.*

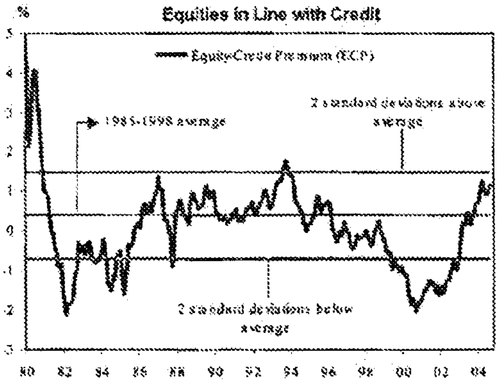

Main Economic Forecasts

| % yoy | Real GDP | | | | Consumer Prices | | | |
|---|---|---|---|---|---|---|---|---|
| | 2002 | 2003 (e) | 2004 (f) | 2005 (f) | 2002 | 2003 (e) | 2004 (f) | 2005 (f) |
| USA | 1.9 | 3.0 | 4.3 | 3.0 | 1.6 | 2.3 | 2.6 | 2.4 |
| Japan | -0.3 | 2.4 | 4.4 | 3.0 | -0.9 | -0.3 | -0.2 | 0.1 |
| Euroland | 0.9 | 0.5 | 2.0 | 1.9 | 2.3 | 2.1 | 2.1 | 1.9 |
| Germany | 0.1 | -0.1 | 1.9 | 1.7 | 1.4 | 1.1 | 1.8 | 1.2 |
| France | 1.1 | 0.5 | 2.6 | 2.3 | 1.9 | 2.2 | 2.4 | 2.0 |
| Italy | 0.4 | 0.4 | 1.2 | 1.8 | 2.6 | 2.8 | 2.2 | 2.2 |
| UK | 1.8 | 2.3 | 3.6 | 2.7 | 1.3 | 1.4 | 1.3 | 1.7 |
| Netherlands | 0.6 | -0.9 | 1.2 | 2.0 | 3.9 | 2.2 | 1.3 | 1.4 |
| Spain | 2.4 | 2.5 | 2.6 | 2.4 | 3.6 | 3.1 | 3.0 | 2.6 |
| Switzerland | 0.1 | -0.5 | 2.0 | 2.0 | 0.6 | 0.6 | 0.8 | 1.5 |
| Sweden | 2.0 | 1.7 | 3.3 | 2.9 | 2.5 | 2.3 | 1.1 | 1.4 |
| Denmark | 1.0 | 0.5 | 2.2 | 2.4 | 2.4 | 2.0 | 1.0 | 1.6 |
| Canada | 3.4 | 2.0 | 3.0 | 3.3 | 2.3 | 2.8 | 2.0 | 2.2 |
| Australia | 3.9 | 3.0 | 3.8 | 2.8 | 3.0 | 2.8 | 2.4 | 2.6 |
| **Latin America** | **-0.3** | **1.7** | **4.8** | **3.5** | **10.6** | **10.7** | **6.8** | **5.1** |
| **Central and E.Europe** | **2.7** | **3.7** | **4.8** | **4.2** | **6.1** | **3.8** | **5.4** | **5.0** |
| Russia | 4.7 | 7.3 | 7.0 | 6.0 | 15.9 | 14.8 | 10.5 | 10.0 |
| South Africa | 3.6 | 1.9 | 3.0 | 3.2 | 9.3 | 6.8 | 4.3 | 4.4 |
| **Asia ex Japan** | **7.1** | **7.4** | **8.3** | **6.8** | **0.7** | **1.8** | **4.1** | **3.9** |
| **NIE** | **5.2** | **3.0** | **5.6** | **4.2** | **1.0** | **1.6** | **2.5** | **3.1** |
| **ASEAN** | **4.6** | **5.2** | **5.6** | **4.6** | **5.9** | **3.9** | **4.1** | **4.2** |
| China | 8.3 | 9.1 | 9.7 | 8.1 | -0.8 | 1.2 | 4.5 | 4.0 |
| **Advanced Economies** | **1.6** | **2.1** | **3.5** | **2.7** | **1.5** | **1.8** | **2.0** | **2.0** |
| **Emerging Markets** | **5.0** | **6.1** | **7.3** | **6.0** | **6.4** | **6.3** | **5.9** | **5.2** |
| **World** | **2.7** | **3.5** | **4.8** | **3.9** | **3.2** | **3.4** | **3.4** | **3.0** |

| % yoy | Real GDP | | | | Consumer Prices | | | |
|---|---|---|---|---|---|---|---|---|
| | 2002 | 2003 (e) | 2004 (f) | 2005 (f) | 2002 | 2003 (e) | 2004 (f) | 2005 (f) |
| **Emerging Markets** | **5.0** | **6.1** | **7.3** | **6.0** | **6.4** | **6.3** | **5.9** | **5.2** |
| **Central and E.Europe** | **2.7** | **3.7** | **4.8** | **4.2** | **6.1** | **3.8** | **5.4** | **5.0** |
| **Latin America** | **-0.3** | **1.7** | **4.8** | **3.5** | **10.6** | **10.7** | **6.8** | **5.1** |
| **Asia ex Japan** | **7.1** | **7.4** | **8.3** | **6.8** | **0.7** | **1.8** | **4.1** | **3.9** |
| **NIE** | **5.2** | **3.0** | **5.6** | **4.2** | **1.0** | **1.6** | **2.5** | **3.1** |
| **ASEAN** | **4.6** | **5.2** | **5.6** | **4.6** | **5.9** | **3.9** | **4.1** | **4.2** |
| Turkey | 7.9 | 5.9 | 9.8 | 5.0 | 45.0 | 25.3 | 11.2 | 9.9 |
| Russia | 4.7 | 7.3 | 7.0 | 6.0 | 15.9 | 14.8 | 10.5 | 10.0 |
| South Africa | 3.6 | 1.9 | 3.0 | 3.2 | 9.3 | 6.8 | 4.3 | 4.4 |
| Argentina | -10.9 | 8.8 | 7.0 | 3.4 | 25.9 | 13.4 | 4.5 | 6.2 |
| Brazil | 1.5 | -0.2 | 4.0 | 3.5 | 10.1 | 14.5 | 7.6 | -- |
| Mexico | 0.9 | 1.3 | 4.0 | 3.5 | 5.1 | 4.2 | 4.2 | 3.9 |
| Venezuela | -8.9 | -7.8 | 12.8 | 2.8 | 30.6 | 28.3 | 23.0 | 13.6 |
| Hong Kong | 2.3 | 3.2 | 7.7 | 4.7 | -3.1 | -2.6 | 0.0 | 1.6 |
| South Korea | 7.0 | 3.1 | 4.8 | 4.0 | 2.7 | 3.6 | 3.6 | 3.6 |
| Singapore | 2.2 | 1.1 | 8.0 | 4.5 | -0.4 | 0.5 | 1.6 | 2.3 |
| Taiwan | 3.6 | 3.3 | 5.7 | 4.2 | -0.2 | -0.3 | 1.7 | 3.0 |
| Indonesia | 4.3 | 4.5 | 5.0 | 4.5 | 11.9 | 6.6 | 6.5 | 6.5 |
| Malaysia | 4.4 | 5.3 | 7.0 | 4.8 | 1.8 | 1.2 | 1.2 | 1.7 |
| Philippines | 4.4 | 4.5 | 5.0 | 4.0 | 3.1 | 2.9 | 3.9 | 4.1 |
| Thailand | 5.4 | 6.8 | 6.3 | 5.0 | 0.6 | 1.8 | 2.0 | 2.0 |
| China | 8.3 | 9.1 | 9.7 | 8.1 | -0.8 | 1.2 | 4.5 | 4.0 |

GS Economic Research Group

© 2004 The Goldman Sachs Group, Inc. All rights reserved. Goldman Sachs 133 Fleet Street, London EC4A 2BB This material should not be construed as an offer to sell or the solicitation of an offer to buy any security in any jurisdiction where such an offer or solicitation would be illegal. We are not soliciting any action based on this material. It is for the general information of clients of The Goldman Sachs Group, Inc. It does not constitute a personal recommendation or take into account the particular investment objectives, financial situations, or needs of individual clients. Before acting on any advice or recommendation in this material, clients should consider whether it is suitable for their particular circumstances and, if necessary, seek professional advice. The price and value of the investments referred to in this material and the income from them may go down as well as up, and investors may realize losses on any investments. Past performance is not a guide to future performance. Future returns are not guaranteed, and a loss of original capital may occur. The Goldman Sachs Group, Inc. does not provide tax advice to its clients, and all investors are strongly advised to consult with their tax advisers regarding any potential investment. Certain transactions - including those involving futures, options, and other derivatives as well as non-investment grade securities - give rise to substantial risk and are not suitable for all investors. The material is based on information that we consider reliable, but we do not represent that it is accurate or complete, and it should not be relied on as such. Opinions expressed are our current opinions as of the date appearing on this material only.

We endeavour to update on a reasonable basis the information discussed in this material, but regulatory, compliance, or other reasons may prevent us from doing so. We and our affiliates, officers, directors, and employees, including persons involved in the preparation or issuance of this material, may from time to time have "long" or "short" positions in, act as principal in, and buy or sell the securities or derivatives (including options) thereof of companies mentioned herein. For purposes of calculating whether The Goldman Sachs Group, Inc. beneficially owns or controls, including having the right to vote for directors, 1% of more of a class of the common equity security of the subject issuer of a research report, The Goldman Sachs Group, Inc. includes all derivatives that, by their terms, give a right to acquire the common equity security within 60 days through the conversion or exercise of a warrant, option, or other right but does not aggregate accounts managed by Goldman Sachs Asset Management. No part of this material may be (i) copied, photocopied, or duplicated in any form by any means or (ii) redistributed without The Goldman Sachs Group, Inc.'s prior written consent.

This material is distributed in the United States by Goldman, Sachs & Co., in Hong Kong by Goldman Sachs (Asia) L.L.C., in Korea by Goldman Sachs (Asia) L.L.C., Seoul Branch, in Japan by Goldman Sachs (Japan) Ltd., in Australia by Goldman Sachs JBWere Pty Ltd. (ABN 21 006 797 897), in New Zealand by Goldman Sachs JBWere (NZ) Ltd., and in Singapore by Goldman Sachs (Singapore) Pte. This material has been issued by The Goldman Sachs Group, Inc. and/or one of its affiliates and has been approved for the purposes of section 21 of the Financial Services and Markets Act 2000 by Goldman Sachs International, which is regulated by the Financial Services Authority, in connection with its distribution in the United Kingdom, and by Goldman Sachs Canada, in connection with its distribution in Canada. Goldman Sachs International and its non-US affiliates may, to the extent permitted under applicable law, have acted on or used this research, to the extent that it relates to non-US issuers, prior to or immediately following its publication. Foreign-currency-denominated securities are subject to fluctuations in exchange rates that could have an adverse effect on the value or price of, or income derived from, the investment. In addition, investors in securities such as ADRs, the values of which are influenced by foreign currencies, effectively assume currency risk. In addition, options involve risk and are not suitable for all investors. Please ensure that you have read and understood the current options disclosure document before entering into any options transactions.

Further information on any of the securities mentioned in this material may be obtained on request, and for this purpose, persons in Italy should contact Goldman Sachs S.I.M. S.p.A. in Milan or its London branch office at 133 Fleet Street; persons in Hong Kong should contact Goldman Sachs (Asia) L.L.C. at 2 Queen's Road Central; persons in Australia should contact Goldman Sachs JBWere Pty Ltd. (ABN 21 006 797 897); and persons in New Zealand should contact Goldman Sachs JBWere (NZ) Ltd. Persons who would be categorized as private customers in the United Kingdom, as such term is defined in the rules of the Financial Services Authority, should read this material in conjunction with the last published reports on the companies mentioned herein and should refer to the risk warnings that have been sent to them by Goldman Sachs International. A copy of these risk warnings is available from the offices of Goldman Sachs International on request. A glossary of certain of the financial terms used in this material is also available on request. Derivatives research is not suitable for private customers. Unless governing law permits otherwise, you must contact a Goldman Sachs entity in your home jurisdiction if you want to use our services in effecting a transaction in the securities mentioned in this material.

The World in a Nutshell

THE GLOBAL ECONOMY

| | OUTLOOK | KEY ISSUES |
|---|---|---|
| UNITED STATES | The US economy is losing steam. Although we have not changed our GDP forecast, the risk to our below-consensus outlook—3.5% annualized growth in the second half of 2004 and about 3% during the four quarters of 2005—lie to the low side. Energy price pressures are not the only factor behind this slowing. US households have also lost the stimulus of tax cuts and mortgage equity withdrawal. | The US inventory cycle is about to turn. After adding nearly ¾ percentage point to real GDP growth over the past year, inventory investment is apt to become at least a modest growth drag over the next year or so. Factory output will bear the brunt of this adjustment, slowing to about 2% growth over the next year from 6½% over the past year. Pressures for correction are most visible in the vehicle and computer industries. |
| JAPAN | Alongside market indicators, the inventory/shipment ratio suggests the economic slowdown in the fiscal second half will be limited in duration and magnitude. We expect the combination of external demand, along with capex and consumer spending, to return GDP to a growth track of +2.5% in Q3 onwards. For FY04-05, we project sustained growth over +3% in real terms. | The pace of decline in bank lending is easing significantly, as the process of corporate debt reduction through balance sheet adjustment is coming to an end. The credit multiplier is no longer declining, but a pick-up is yet to be seen. As corporate balance sheet adjustment is reaching its final stage, recovery in credit creation is the 'final trap' left over in the Japanese economy. |
| EUROPE | We have become more cautious about the outlook in Euroland for 2005. We have lowered our 2005 forecast from 2.4% to 1.9%, reflecting greater uncertainty about global economic prospects and the difficulty that some parts of Euroland are still experiencing in boosting domestic demand. We have also scaled back the extent of ECB tightening. | We see no reason for the ECB to worry about rising house prices for now. We expect house prices to support consumption by around 0.4% a year on average in 2004 and 2005. However, there is no evidence of a housing bubble in Euroland. Our fair value model suggests that house prices in Euroland as a whole are currently undervalued by about 7%. |
| NON-JAPAN ASIA | We have lowered our 2005 GDP growth forecast for the region to 6.8% from 7.5% previously. The two factors behind this downgrade are: 1) exports are increasingly becoming a headwind and will likely remain longer than a mid-cycle 'bump'; and 2) domestic demand will be less resilient in the face of slowing global growth. | China's growth will remain strong next year, driven by solid domestic demand. China remains at a crucial stage of cycle management, despite slowing activity and money/credit growth. To keep policy tightening on the curve while avoiding any overkill of economic momentum, policy needs to be switched from an administrative approach to a market-based approach. |
| LATIN AMERICA | We estimate that the Venezuelan Bolivar is 20%-30% overvalued. We judge that a depreciation of the VEB would increase the debt-to-GDP ratio by about 9% from our baseline. This reflects a debt stock that is still moderate and the significant share of domestic currency obligations in the total debt. | In Mexico and Brazil the macroeconomic outlook is good, with strong balances of payments. The main external downside risks to our Mexico forecasts are softer industrial production and higher interest rates in the US. In Brazil, supply shocks and stronger demand have raised inflation. |
| CENTRAL & EASTERN EUROPE, MIDDLE EAST AND AFRICA | We see the decline in South Africa's consumer prices as the main reason behind the Reserve Bank's unexpected rate cut of 50bp in August. Further appreciation in the Rand coupled with lower oil prices in the fourth quarter will likely push the Reserve Bank to cut interest rates again, despite the imbalances in the economy. | In Russia, Putin's sweeping political system changes will not affect the economy in the short- to medium-term. However, they could cause tension with economic modernization longer-term. We are not worried about Russia's creditworthiness. Domestic liquidity should support the equities recovery, but worries about property rights may cap the upside. |

CENTRAL BANK POLICIES

| | CURRENT SITUATION | NEXT MEETING | EXPECTATION |
|---|---|---|---|
| United States: FOMC | Fed funds rate raised by 25bp to 1.75% on 21 September 2004. | 10 November | We expect the Fed to raise rates to 2.25% by year-end. |
| Japan: BoJ Monetary Policy Board | Target for bank reserves (most recently adjusted on 19 March 2004) consistent with zero overnight call rates. | 12-13 October | The BoJ is unlikely to terminate its quantitative easing policy before 2006. |
| Euroland: ECB Governing Council | The ECB cut rates by 50bp to 2.0% on 5 June 2003. | 7 October | The ECB will remain on hold at 2% during 2004. |
| UK: BoE Monetary Policies Committee | Repo rate increased by 0.25% to 4.75% on 5 August 2004. | 7 October | We see base rates reaching 5.25% in early 2005. |

Appendix 6A

Consumer (GSWFCOLA and GSWFCOSA)

Long: Homebuilding, Household Durables, Transportation, Leisure Equipment & Product, Hardline Retail, Soft/Hard Retail, Consumer Finance, Automobiles & Components, Communications Equipment Short: Pharmaceuticals, Regional Banks, Oil & Gas Refining & Market, Thrifts & Mortgage Finance, Integrated Oil & Gas, Industrial Conglomerates, Diversified Banks, Oil & Gas Exploration & Pro, Computer & Peripherals, Building Products, Electronic Equipment & Inst

Economic Scenario

| | Source of Surprise[1] | Surprise in Standard Deviations | Cumulative Impact[2] |
|---|---|---|---|
| GDP | -1.2 | -1.6 | 0.0% |
| Consumer | 1.4 | 1.4 | 0.6% |
| Investment | | | -1.9% |
| Fed Funds | | | 0.0% |
| 10 Year Note | | | 0.0% |
| Oil Price | | | -0.1% |
| USD | | | 0.6% |
| Foreign GDP | | | 0.0% |

[1] Units of Economic Wavefront used to generate the view.
[2] The total impact of the combination on each of the main economic variables.

Wavefront Summary

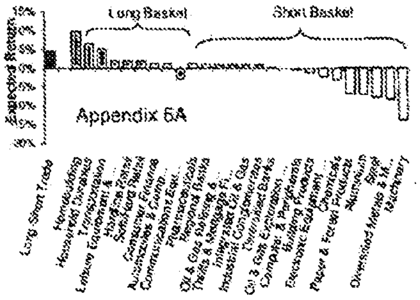

Trade Highlights: Risk and Reward

| Trade Exposure (equal long/short) | Expected Return | Beta to S&P 500 | Daily Volatility* | Monthly Volatility** | Number of Industries | Number of Positions | Effective N | Weight in S&P 500 |
|---|---|---|---|---|---|---|---|---|
| Long basket | 2.7% | 1.0 | 14% | 22% | 9 | 71 | 54 | 13.0% |
| Short basket | -1.8% | 1.0 | 13% | 19% | 17 | 123 | 76 | 33.7% |
| Long - Short | 4.5% | 0.1 | 4.9% | 8% | 26 | 194 | 65 | |

*Volatility of daily returns over previous 3 months. **Volatility of monthly returns over previous 36 months.

Macroeconomic Risk Analysis

| Change in expected return due to ... | GDP (+1%) | Fed Funds (+100bp) | 10 Yr Yield (+100bp) | Oil Price (+50%) | USD (+10%) | Consumer (+1%) | Investment (+1%) | Foreign GDP (+1%) |
|---|---|---|---|---|---|---|---|---|
| Long basket | 1.6% | -1.4% | -1.8% | -2.4% | -0.1% | 3.1% | -0.3% | 0.4% |
| Short basket | 1.6% | -1.6% | -1.5% | -2.6% | -1.1% | -0.1% | 1.6% | 0.2% |
| Long - Short | 0.0% | 0.2% | -0.4% | 0.2% | 1.0% | 3.2% | -1.9% | 0.2% |

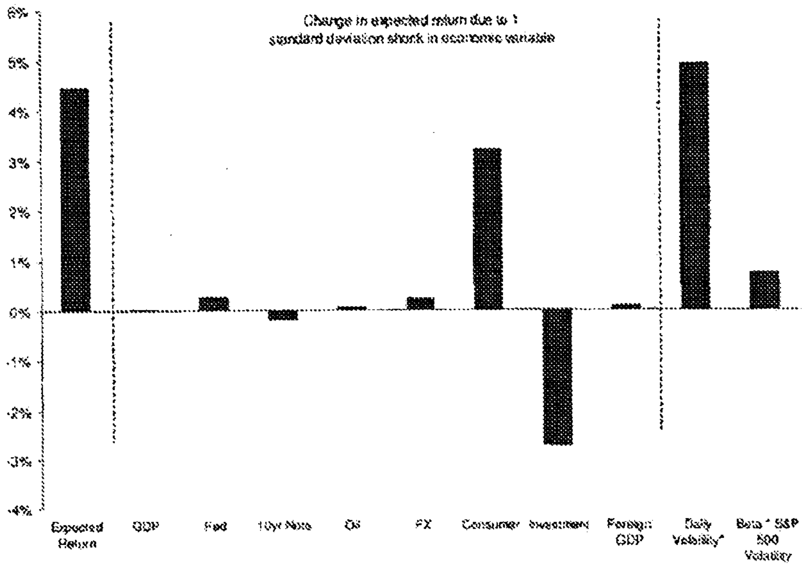

* Volatility of daily returns over previous 3 months.

Appendix 6B

Consumer (GSWFCOLA and GSWFCOSA)

Trade History and Valuation

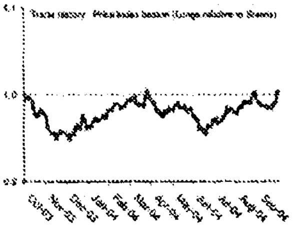

Recent performance*

| | 1-Day | 1-Month | 3-Months | 6-Months | 12-Months |
|---|---|---|---|---|---|
| Long | 4.?% | 2.1% | 7.2% | [illegible] | 15.2% |
| Short | 3.0% | 1.0% | 3.9% | [illegible] | 13.5% |
| Long-Short | 1.0% | 0.4% | 3.2% | 1.9% | 1.4% |
| S&P 500 | 3.3% | -0.1% | 2.8% | 1.7% | 8.0% |

* Priced as of [illegible]

Valuation assessment

| Valuation Quintile | S&P 500 | Long Basket | Short Basket |
|---|---|---|---|
| Most over-valued | 20% | 9% | 25% |
| 2nd quintile | 20% | 25% | 29% |
| Middle quintile | 20% | 25% | 18% |
| 4th quintile | 20% | 15% | 12% |
| Most under-valued | 20% | 25% | 16% |

Portfolio Weighting

| Portfolio | Dollar of Short Per Dollar of Long | Expected Return of Portfolio | Beta to S&P 500 | Volatility of Portfolio |
|---|---|---|---|---|
| Balanced dollars | 1.0 | 4% | 0.1 | 8% |
| Increased short | 1.5 | 4% | -0.4 | 10% |
| Increased long | 0.5 | 3% | 0.6 | 17% |
| Maximum Sharpe ratio | 1.0 | 4% | 0.0 | 6% |
| Minimum volatility ratio | 1.1 | 4% | 0.0 | 6% |
| Beta neutral | 1.1 | 4% | 0.0 | 8% |

Industry and Stock Exposures

| Ticker | Long | Weight in Portfolio | Ticker | Short | Weight in Portfolio |
|---|---|---|---|---|---|
| [illegible] | [illegible] | [illegible] | [illegible] | [illegible] | [illegible] |

[illegible]

Appendix 7
Wavefronts
Equity Trading Strategies

Trading non-US growth through US equities—Introducing China and Foreign Growth Baskets

We have designed two baskets that allow US investors to gain exposure to Foreign and Chinese Growth themes in the US equity market

Economic activity is a primary driver of equity markets, and there are multiple "flavors" of growth. Several prior Wavefront trades have been designed around themes of US GDP growth or consumer/investment tradeoffs. Here we present the details of baskets designed to trade foreign (non-US) growth or China growth via the US equity markets.

We use outside information to identify leverage and the Wavefront[SM] system to manage risk

The construction of the China Growth and Foreign Growth Baskets differs from previously published Wavefront baskets in the incorporation of information external to the Wavefront system. Information on net imports in China drives the selection of the industries in the China Growth Basket, and the Foreign Growth Basket uses information regarding the fraction of non-US sales in select industries. The Wavefront system is then used to tailor the baskets to be neutral to other macro factors such as US growth, interest rates, and oil prices. Management of macro risks as well as position size reduces volatility of the baskets.

Our China Growth Basket is designed to be exposed to Chinese demand

We identify global industries pressured by growth in China. Increases in demand in these segments put pressure on capacity and drive up prices benefiting firms across the globe. Our basket allows investors to trade both positive and negative developments in China using highly liquid US equities.

Our Foreign Growth Basket is levered to demand outside the United States

Using our Wavefront models we examine firm and industry dependence on foreign demand relative to US demand. We combine this information with data on firms' international sales to identify a US equity basket that trades incremental demand in outside the United States. The basket is designed to perform well in conditions where foreign growth surprises to the upside.

This research is focused on industries and sectors. It does not attempt to distinguish between the prospects or performance, or provide analysis of, individual companies within any industry or sector we describe. Any trading recommendation in this research relating to an industry or sector refers to the entire industry or sector and not to any individual company in that industry or sector. In addition, any trading recommendation relating to multiple positions in more than one industry or sector refers to the entire recommended trading strategy and not to any of the constituent positions in isolation. In particular, we are not recommending any individual security or an investment in any individual company, and you should not rely on this research in making an investment decision with respect to any individual company or security. You should consider this research as only a single factor in making investment decisions.

For important disclosures, see page 15, go to http://www.gs.com/research/hedge.html, or contact your investment representative. Wavefront[SM] is a service mark of Goldman, Sachs & Co. and the Wavefront ideas, concepts, and methodologies described herein are proprietary and patent pending.

Table of contents

1 Introducing two Wavefront baskets: China Growth and Foreign (non-US) Growth 2 Trading China's growth through US equities

2 Designing a US equities basket with exposure to China
6 Recent performance of the China Growth Basket has been positive 7 Trading foreign growth through US equities

7 Designing a US equities basket with exposure to foreign growth
11 Performance of our Foreign Growth Basket 12 Comparing different flavors of growth: US, Foreign, and China 12 US Growth view: Trade cyclicals against defensives
13 China Growth view: Trade exposed cyclicals against unexposed cyclicals
13 Foreign Growth View: Trade a mix of industries levered to non-US growth against a mix of industries not levered to US growth 15 Disclosures

Introducing two Wavefront baskets: China Growth and Foreign (non-US) Growth

Increased expectations for economic growth are clearly linked to performance in the equity market. However, growth comes in multiple forms and each form may be associated with a distinct trade. This publication presents the details of Wavefront trades designed to gain leverage to growth in China and to foreign (non-US) growth. The resulting trades are very different from one another and from a trade levered to domestic US growth in the view they represent, the macro risks they take on, and hence in their performance as portrayed in Exhibit 1.

Exhibit 1: Recent performance of three Wavefront growth baskets

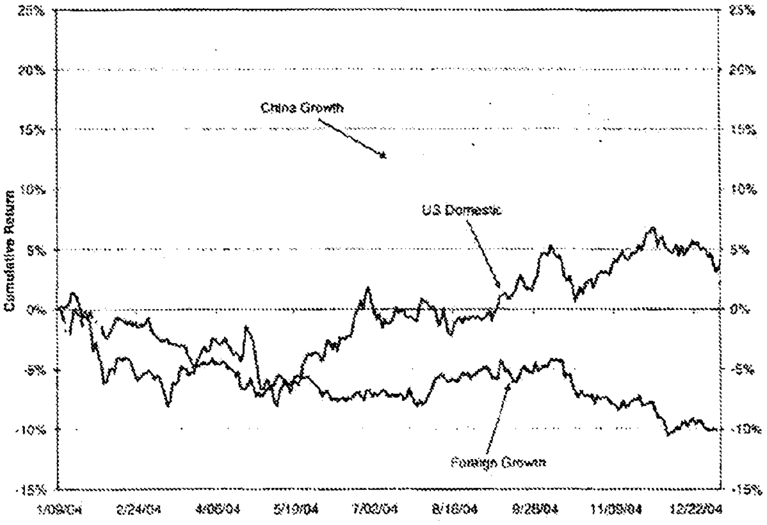

*Source: Goldman Sachs Research.*

The construction of the China Growth and Foreign Growth Baskets differs from previously published Wavefront baskets in the incorporation of information external to the Wavefront system. Information on net imports in China drives the selection of the industries with exposure to China growth in that basket and the Foreign Growth Basket uses information regarding the fraction of non-US sales in select industries. In both cases the Wavefront system is used to tailor the baskets to be neutral to other macroeconomic factors such as US growth, interest rates, and oil prices.

We describe the construction process for the two trades in the following sections and conclude by comparing them to a US growth trade.

Trading China's growth through US equities

China has become a significant source of global growth, with the country now accounting for 20% of global copper and aluminum consumption, 10% of nickel, 25% of zinc, and 7% of oil. China's demand for steel and other metals has recently driven prices of many of these commodities to near-record levels. Similarly, even rumors of a slowdown in China's growth have triggered short-term sell-offs in many of these commodities and related sectors.

Our goal is to design a basket of US equities that can trade this theme. While our long-term thesis is that sustained Chinese growth will continue to be rewarded by the domestic (US) equity market, the Wavefront China Basket can, of course, be used to trade China in both directions. News about currency revaluations, efforts to curb growth, emerging imbalances, or poor lending practices has typically led the US equity market to quickly re-price those sectors that are most leveraged to China.

Designing a US equities basket with exposure to China

The key to designing this trade is to identify those domestic industries that are sufficiently levered to Chinese economic activity. Our trade is long ten industries where Chinese growth is fueling global demand and short nine industries that balance the unwanted macroeconomic risks of the long side. The long basket is a subset of the basic materials, industrials, and energy sectors that are directly or indirectly levered to growth in China. The short basket consists of materials and technology industries that have little or no exposure to China and balance the GDP, rate, and oil price risks of the longs.

Exposure to growth in China's imports

Long: Energy Equipment & Services, Oil & Gas Exploration & Production, Oil & Gas Refining & Marketing, Chemicals, Aluminium, Diversified Metals & Mining, Steel, Electrical Equipment, Industrial Conglomerates, Machinery

Short: Paper & Forest Products, Transportation, Automobiles & Components, Software & Services, Communications Equipment, Computer & Peripherals, Electronic Equipment & Instrumentation, Semiconductor & Semiconductor Services, Diversified Telecommunications The trade is designed in a two step process. The first step is to identify segments where China's net imports are rapidly growing. Exhibit 2 displays Chinese net-imports in 2004 compared with 1999 for the import-export categories supplied by the Chinese Ministry of Commerce.

Exhibit 2: Summary of China's import – export segments

| China's import - exports segments | Net imports ($ millions) | | Change in net imports ($ millions) | Easily mapped to Wavefront Industry |
|---|---|---|---|---|
| | 2004 | 1998 | | |
| Electrical Machinery | 48,003 | 4,869 | 43,134 | Y |
| Crude Materials, Inedible, Except Fuels | 44,990 | 8,060 | 36,930 | N |
| Chemicals and Related Products | 37,049 | 12,815 | 24,234 | Y |
| Crude Petroleum Oil | 27,330 | 2,680 | 24,650 | Y |
| Misc: Professional Instruments | 21,509 | 1,056 | 20,453 | N |
| Specialized Machinery | 20,408 | 7,020 | 13,388 | Y |
| Iron and Steel | 14,570 | 4,707 | 9,864 | Y |
| Metal Working Machinery | 6,952 | 2,157 | 4,804 | Y |
| Non Ferrous Metals | 5,176 | 1,675 | 3,501 | Y |
| Power Generating Machinery & Equipment | 4,538 | 2,358 | 2,180 | Y |
| Refined Petroleum Products | 4,172 | 1,623 | 2,549 | Y |
| Animal and Vegetable Oils, Fats and Wax | 4,013 | 1,502 | 2,511 | N |
| General Industry Machinery and Equipment | 3,032 | 2,709 | 323 | N |
| Other Transport Equipment | 2,584 | 2,067 | 517 | N |
| Commodities | 408 | 1,096 | (688) | N |
| Misc: Photographic Equipment, Optical Goods & Watches | 37 | (1,688) | 1,726 | N |
| Beverages and Tobacco | (679) | (654) | (24) | Y |
| Road Vehicles | (1,653) | (1,751) | 99 | Y |
| Machinery and Transport Equipment | (6,944) | 11,585 | (18,529) | Y |
| Food and Live Animals | (10,192) | (6,731) | (3,461) | Y |
| Manufactures of Metals | (13,655) | (4,918) | (8,737) | N |
| Manufactured Goods | (16,881) | 1,073 | (17,954) | N |
| Misc: Misc Manufactured Articles | (28,768) | (16,178) | (12,590) | N |
| Telecom & Sound Recording Equipment | (38,195) | (2,694) | (35,501) | N |
| Office and ADP Machines | (52,623) | (5,151) | (47,472) | N |
| Misc Mfg Articles | (100,488) | (59,357) | (41,131) | N |
| Total | (73,299) | (34,940) | (38,360) | |

*Source: Chinese Ministry of Commerce, CEIC, Goldman Sachs Research.*

We focus on industries where China is a net importer and consumer of the product, where there has been significant import growth, and where the import-export categories can be mapped to Wavefront industries. We avoid categories where we believe that China is an assembly point in a supply chain, and where final demand depends on factors other than growth in China. For these reasons we avoid segments such as telecom, office equipment, manufacturing, and electronic equipment. Exhibit 3 summarizes the selected categories and the corresponding Wavefront industries.

Exhibit 3: Mapping import-export segments to Wavefront industries

| Import export segment | Wavefront industry | 5-year growth in net imports | Annual net imports ($ billion) |
|---|---|---|---|
| Crude Petroleum | Oil & Gas Exploration & Production | 930% | 27.3 |
| Electrical Machinery | Electrical Equipment | 898% | 48.0 |
| Crude & Refined Petroleum | Energy Equipment & Services | 632% | 31.5 |
| Metal working machinery | Machinery | 223% | 7.0 |
| Iron & Steel | Steel | 219% | 14.6 |
| Non-ferrous Metals | Aluminum | 209% | 5.2 |
| Non-ferrous Metals | Diversified Metals & Mining | 209% | 5.2 |
| Specialized Machinery | Machinery | 191% | 20.4 |
| Chemicals & related products | Chemicals | 189% | 37.0 |
| Refined Petroleum | Oil & Gas Refining & Marketing | 187% | 4.2 |
| Power generating Machinery & Equipment | Industrial Conglomerates | 92% | 4.5 |

*Source: Goldman Sachs Research, Chinese Ministry of Commerce, CEIC.*

While it is critical that we clearly map import-export categories to Wavefront industries, it is less important that the mapped US companies supply China directly. As long as demand and pricing are being positively affected by Chinese growth, the individual companies stand to benefit.

With the Wavefront industries identified, the second step in the process is to consider the macro risks of the basket. The trade sheet in Exhibit 4 shows the significant US GDP growth, rate, and oil price exposure of the long side of the basket. We construct an appropriate short or funding basket to reduce the macro risks of the trade. The selected industries for the short side are also highly levered to US GDP growth, investment growth, and oil, but not to China. The shorts reduce the overall basket's exposure to US growth without sacrificing much exposure to China.

Exhibit 4: Wavefront China Growth Basket trade sheet

Exposure to growth in China's imports

Long: Energy Equipment & Services, Oil & Gas Exploration & Production, Oil & Gas Refining & Marketing, Chemicals, Aluminium, Diversified Metals & Mining, Steel, Electrical Equipment, Industrial Conglomerates, Machinery

Short: Paper & Forest Products, Transportation, Automobiles & Components, Software & Services, Communications Equipment, Computer & Peripherals, Electronic Equipment & Instrumentation, Semiconductor & Semiconductor Services, Diversified Telecommunications

Trade Highlights: Risk and Reward

| Trade Exposure (equal long/short) | Expected Return | Beta to S&P 500 | Daily Volatility* | Monthly Volatility** | Number of Industries | Number of Positions | Effective N | Weight in S&P 500 |
|---|---|---|---|---|---|---|---|---|
| Long basket | 0.0% | 1.1 | 17% | 24% | 10 | 65 | 40 | 11.1% |
| Short basket | 0.0% | 1.5 | 17% | 30% | 9 | 111 | 43 | 22.2% |
| Long - Short | 0.0% | -0.5 | 14% | 18% | 19 | 176 | 83 | |

*Volatility of daily returns over previous 3 months. **Volatility of monthly returns over previous 36 months.

Macroeconomic Risk Analysis

| Change in expected return due to ... | GDP (+1%) | Fed Funds (+100bp) | 10 Yr Yield (+100bp) | Oil Price (+50%) | USD (+10%) | Consumer (+1%) | Investment (+1%) | Foreign GDP (+1%) |
|---|---|---|---|---|---|---|---|---|
| Long basket | 5.0% | -1.0% | 1.3% | -1.3% | 0.5% | 0.7% | 4.3% | 2.1% |
| Short basket | 5.0% | -1.8% | -0.7% | -8.9% | -3.2% | 2.3% | 2.7% | 1.7% |
| Long - Short | 0.0% | 0.7% | 2.1% | 7.5% | 3.7% | -1.6% | 1.6% | 0.4% |

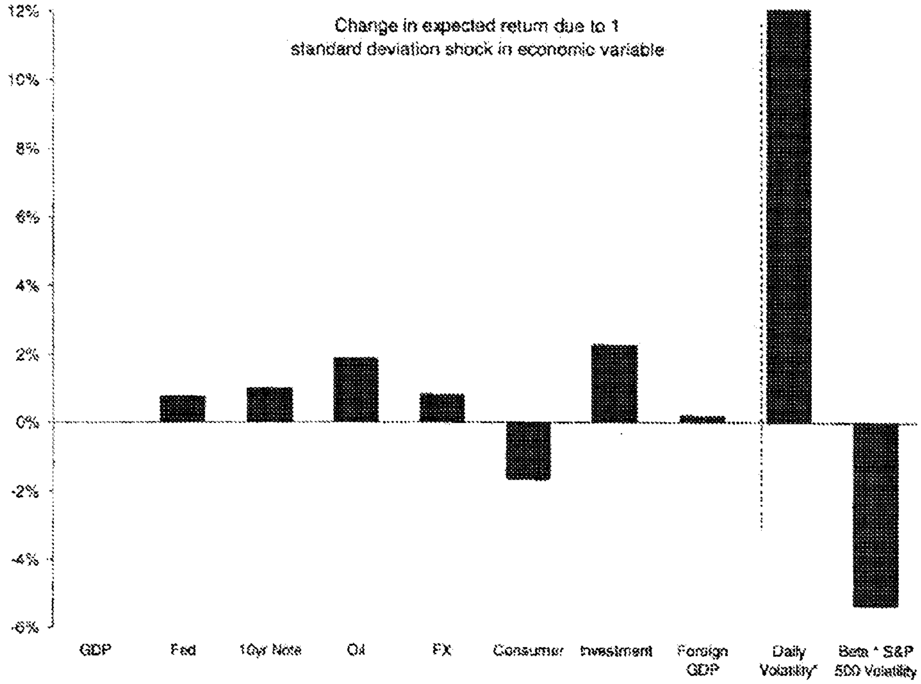

* Volatility of daily returns over previous 3 months.

*Source: Goldman Sachs Research*

Recent performance of the China Growth Basket has been positive

The China Growth Basket has generally trended upward over the last year, consistent with ongoing strength in demand (and import) growth that we have seen in China. The rise was sharpest in June and July, when the markets began to realize that administrative controls instituted in late April had not slowed Chinese growth too sharply.

The Basket has also moved significantly on days that China-related news has hit the market. One of the most obvious recent examples is that the Basket traded down 1.85% (a 2.5 standard deviation move) on October 28, 2004, on news of China's surprise rate hike. These episodes have provided us with additional comfort that the Basket captures leverage to expectations about the Chinese economy.

Exhibit 5: Wavefront China Growth Basket performance
baselined to 0% on January 9, 2004

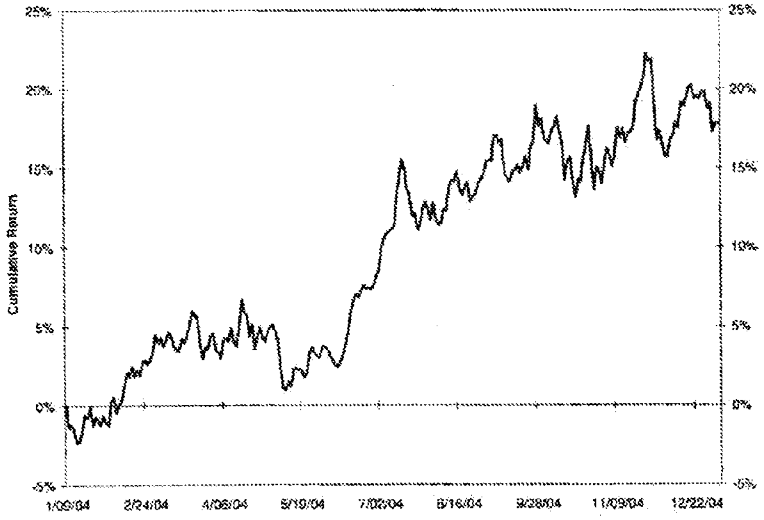

*Source: Goldman Sachs Research.*

Trading foreign growth through US equities

As industries become increasingly global, firm performance is increasingly a function of industry performance rather than country performance. In this environment, trading foreign growth against US growth is no longer as easy as buying a European index and shorting a US index. Even if US growth disappoints and European growth surprises, European auto, telecom, and software firms with heavy US dependence should underperform, reducing leverage to the core view.

The Wavefront Foreign Growth Basket is designed around an economic scenario where foreign economic activity accelerates, while domestic growth is unchanged. Thus, we wish to assemble a long-short portfolio to gain exposure to economic activity outside the United States, while remaining relatively neutral to US activity (as well as to oil prices and interest rates).

Foreign Growth

Long: Diversified Metals & Mining, Leisure Equipment & Product, Electrical Equipment, Communications Equipment, Chemicals, Industrial Conglomerates, Integrated Oil & Gas, Food Products & Soft Drinks Short: Machinery, Transportation, Construction Materials, Commercial Services & Supplies, Trading Companies & Distributors, Construction & Engineering, Softline Retail, Hotels, Restaurants & Leisure An alternative economic theme that an investor may want to trade is a US growth slowdown accompanied by a foreign growth acceleration. A basket tailored to this view would result in going short cyclicals and long defensives—in essence no different than shorting a basket leveraged to US growth. In contrast, the Foreign Growth Basket we have constructed is designed to be neutral to domestic growth.

Designing a US equities basket with exposure to foreign growth

We have selected industries in the long-short baskets based on three criteria. The first is relative leverage to an economic scenario of a 1% increase in foreign growth expectations that leaves US GDP growth unchanged (see Exhibit 6).

Exhibit 6: Predicted impact of our foreign growth view using the Wavefront models

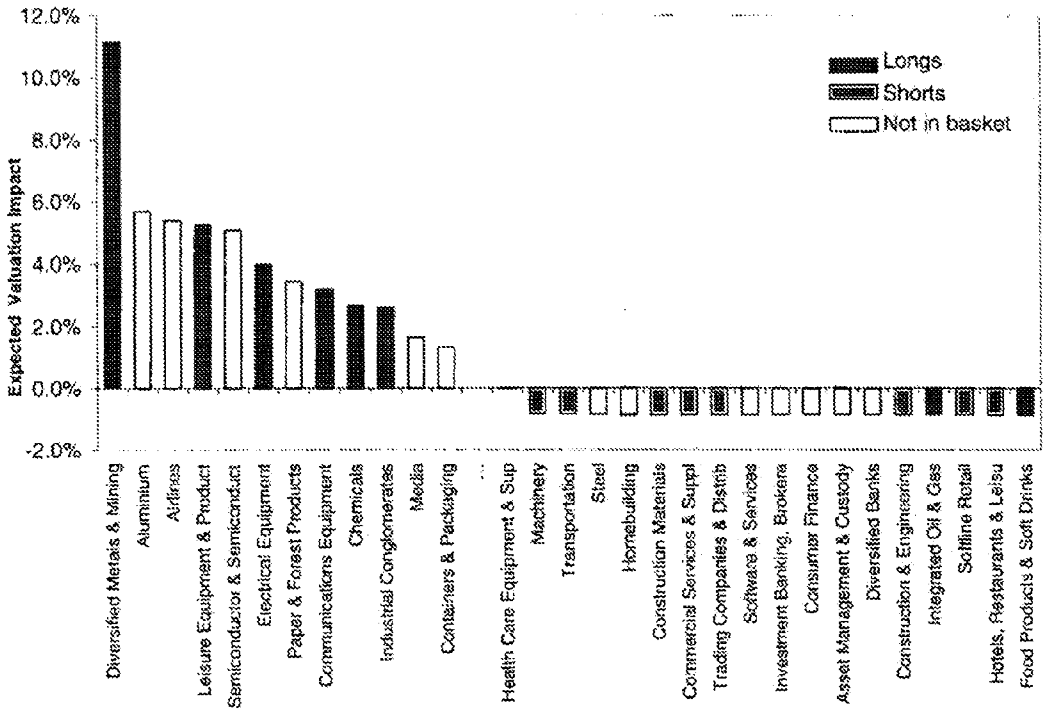

*Source: Goldman Sachs Research.*

The second criterion uses information external to the Wavefront system to corroborate industry leverage to foreign activity. Exhibit 7 ranks industries by their percentage of international sales relative to total sales. Industries with a higher percentage of international sales should be more levered to foreign growth.

Although the two criteria often agree as to the relative performance of industries in a strong foreign growth environment, there are some differences. For example, although the Wavefront models recommend going long the Media industry, we have excluded this industry because its sales are derived largely from the US. Similarly, we have included Machinery in the shorts although its international sales are high. Machinery further serves to reduce GDP and energy price risks.

Exhibit 7: International sales as a percent of total sales

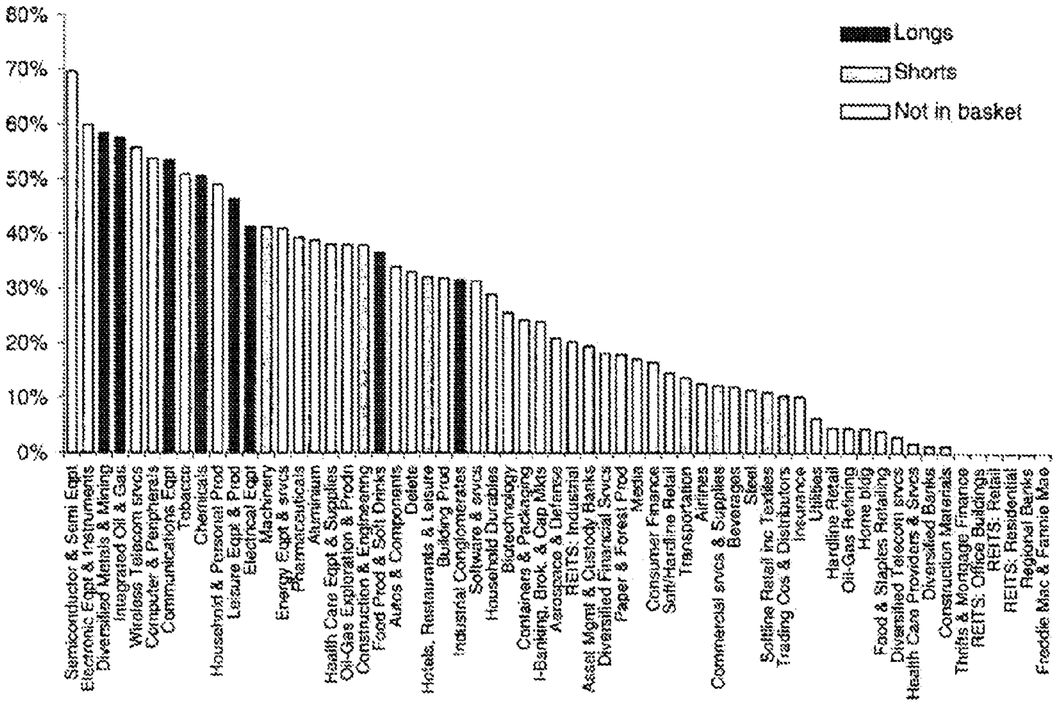

*Source: Goldman Sachs Research and Worldscope data.*

The third criterion used in the trade design is risk neutralization. In addition to being exposed to foreign growth, we prefer a basket that is relatively neutral to US growth. The risk section of the trade sheet, Exhibit 8, shows the balancing of the risks between the long and short sides of the basket.

Exhibit 8: Wavefront Foreign Growth Basket trade sheet

Foreign Growth

Long: Diversified Metals & Mining, Leisure Equipment & Products, Electrical Equipment, Communications Equipment, Chemicals, Industrial Conglomerates, Integrated Oil & Gas, Food Products & Soft Drinks

Short: Machinery, Transportation, Construction Materials, Commercial Services & Supplies, Trading Companies & Distributors, Construction & Engineering, Offline Retail, Hotels, Restaurants & Leisure

Economic Scenario

| | Source of Surprise* | Surprise in Standard Deviations | Cumulative Impact† |
|---|---|---|---|
| GDP | -3.3 | -3.3 | 0.0% |
| Consumer | | | 0.0% |
| Investment | | | 0.0% |
| Fed Funds | | | 0.0% |
| 10 Year Note | | | 0.0% |
| Oil Price | | | 0.0% |
| USD | | | 0.0% |
| Foreign GDP | 1.0 | 2.0 | 1.0% |

*Units of Economic Wavefront used to generate the view
†The total impact of the combination on each of the main economic variables

Wavefront Summary

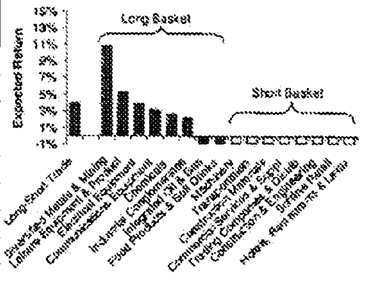

Trade Highlights: Risk and Reward

| Trade Exposure (equal weighted) | Expected Return | Beta to S&P 500 | Daily Volatility* | Monthly Volatility** | Number of Industries | Number of Positions | Effective # | Weight in S&P 500 |
|---|---|---|---|---|---|---|---|---|
| Long basket | 3.2% | 1.0 | 14% | 21% | 8 | 82 | 29 | 18.2% |
| Short basket | -0.8% | 0.8 | 13% | 18% | 8 | 53 | 38 | 7.1% |
| Long - Short | 4.0% | 0.2 | 7.8% | 10% | 16 | 135 | 66 | |

*Volatility of daily returns over previous 3 months. **Volatility of monthly returns over previous 36 months.

Macroeconomic Risk Analysis

| Change in expected return due to ... | GDP (+1%) | Fed Funds (+100bp) | 10 Yr Yield (+100bp) | Oil Price (+50%) | USD (+10%) | Consumer (+1%) | Investment (+1%) | Foreign GDP (+1%) |
|---|---|---|---|---|---|---|---|---|
| Long basket | 2.4% | 0.1% | 1.7% | -2.6% | 1.5% | 0.9% | 1.4% | 3.5% |
| Short basket | 3.9% | -0.7% | 1.1% | -5.4% | 0.1% | 1.7% | 2.6% | -0.3% |
| Long - Short | -1.5% | 0.8% | 0.6% | 2.8% | 1.4% | -0.9% | -1.2% | 3.8% |

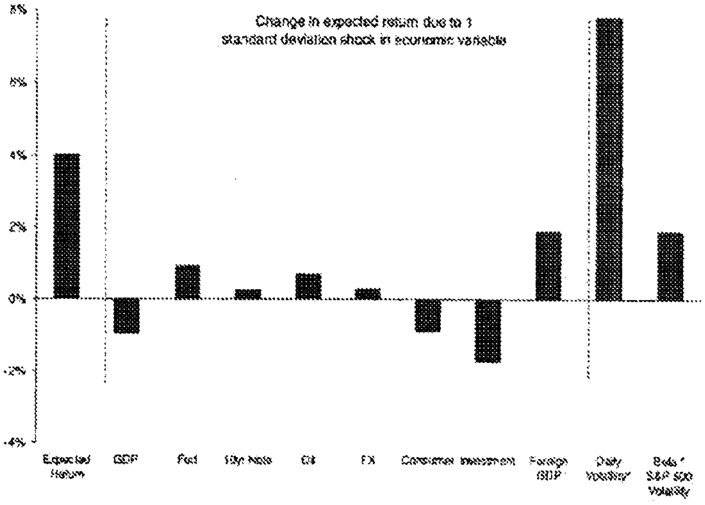

* Volatility of daily returns over previous 3 months.

*Source: Goldman Sachs Research.*

Performance of our Foreign Growth Basket

While our China Basket has trended upward as growth in China has proven resilient and even surprised on the upside, our Foreign Growth Basket has given up 9% as investors have taken a negative view of foreign growth. Exhibit 9 shows the performance of the Foreign Growth Basket over the past year.

Exhibit 9: Wavefront Foreign Growth Basket Performance
baselined to 0% on January 9, 2004

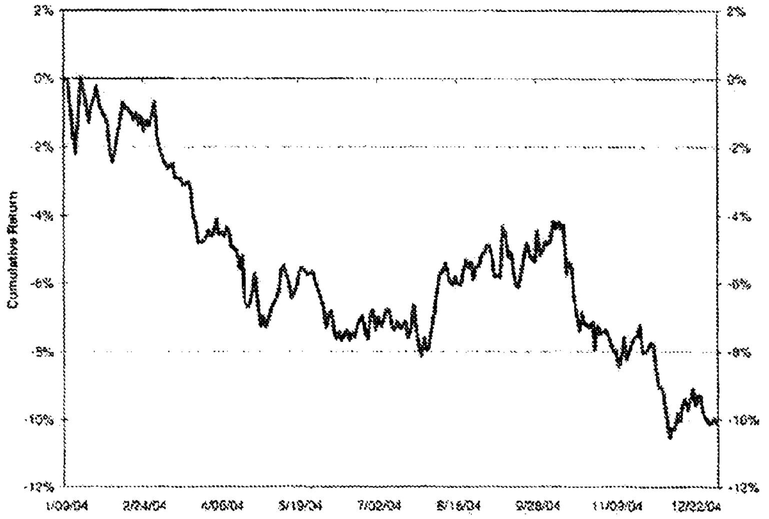

*Source: Goldman Sachs Research*

Comparing different flavors of growth: US, Foreign, and China

US Growth view: Trade cyclicals against defensives

We have previously published several trades related to US GDP growth expectations. It is helpful to think about how the trades levered to different "flavors" of growth (US growth, Foreign Growth, China Growth) compare. Exhibit 10 sets out the industries on the long and short sides of our US Growth Basket, our Foreign Growth Basket, and our China Growth Basket.

The basic structure of a Wavefront US Growth Basket consists of being long cyclical industries against defensive industries; a specific trade may be further tailored to a particular rate and oil price view. Consider the US Growth Basket detailed in the first column of Exhibit 10. The long side is a large set of cyclical industries; likewise, the short side includes a diverse set of defensive industries. It is intended to outperform as US growth expectations climb.

Exhibit 10: Industrial comparison of Wavefront growth baskets

| Wavefront Industry | Growth | China Growth | Foreign Growth |
|---|---|---|---|
| Steel | Long | Long | |
| Paper & Forest Products | Long | Short | |
| Building Products | Long | | |
| Electrical Equipment | Long | Long | Long |
| Machinery | Long | Long | Short |
| Transportation | Long | Short | Short |
| Automobiles & Components | Long | Short | |
| Software & Services | Long | Short | |
| Communications Equipment | Long | Short | Long |
| Softline Retail inc Textiles | Short | | Short |
| Hotels, Restaurants & Leisure | Short | | Short |
| Media | Short | | |
| Soft/Hardline Retail | Short | | |
| Food & Staples Retailing | Short | | |
| Beverages | Short | | |
| Food Products & Soft Drinks | Short | | Long |
| Tobacco | Short | | |
| Household & Personal Products | Short | | |
| Pharmaceuticals | Short | | |
| Diversified Telecommunication Se | Short | Short | |
| Energy Equipment & Services | | Long | |
| Integrated Oil & Gas | | | Long |
| Oil & Gas Exploration & Production | | Long | |
| Oil & Gas Refining & Marketing | | Long | |
| Chemicals | | Long | Long |
| Construction Materials | | | Short |
| Aluminum | | Long | |
| Diversified Metals & Mining | | Long | Long |
| Construction & Engineering | | | Short |
| Industrial Conglomerates | | Long | Long |
| Trading Companies & Distributors | | | Short |
| Commercial Services & Supplies | | | Short |
| Leisure Equipment & Products | | | Long |
| Computer & Peripherals | | Short | |
| Electronic Equipment & Instrument | | Short | |
| Semiconductor & Semiconductor Equipment | | Short | |

*Source: Goldman Sachs Research.*

China Growth view: Trade exposed cyclicals against unexposed cyclicals

A basket levered to growth in China does not have the same cyclicals versus defensives flavor as the US Growth Basket and hence is constructed quite differently. Although the long sides of the China Growth Basket and the US Growth Basket have some overlap, as Exhibit 10 illustrates, the long side of the China basket is focused on the subset of cyclical industries most leveraged to growth in China—energy, metals, chemicals, and machinery.

The long side of the trade is expected to outperform as China growth expectations increase. However, owing to the cyclical flavor of the industries selected, it is significantly exposed to US economic conditions as well. We offset the exposure to US growth in the long basket by shorting a collection of cyclical industries that are not levered to China, such as paper, transportation, communications equipment, etc. The resulting basket is a cyclicals-against-cyclicals basket that is levered to China and neutral to US growth as indicated in Exhibit 11.

Exhibit 11: Trading different growth views

| Trading View | Recommended Wavefront Basket | Style of Basket | Desired Macro Exposure | | |
|---|---|---|---|---|---|
| | | | GDP | Rates | Oil |
| Economic growth in the US strengthens | Growth | Cyclicals against defensives | Positive | Negative | Negative |
| Economic growth in China strengthens and no view on domestic growth | China Growth | Cyclicals against cyclicals | None | None | None |
| Economic growth outside the US strengthens and no view on domestic growth | Foreign Growth | Diverse basket | None | None | None |

*Source: Goldman Sachs Research.*

Foreign Growth View: Trade a mix of industries levered to non-US growth against a mix of industries not levered to US growth Foreign growth is another variant of trading growth. It differs from the domestic and foreign growth baskets in its alignment, or more precisely its lack of alignment along cyclical/defensive lines. Neither the long side nor the short side can be identified as clearly cyclical. Essentially, the long side of the basket is a selection of industries the Wavefront models find relatively levered to non-US activity or that have a large non-US share of sales. The short side of the basket was selected to balance the macro risks of the trade making the basket relatively resilient to both US growth and rates.

What is claimed is:

1. A computer-implemented method comprising:

generating on a computer system an economic model, including:

tracking a plurality of economic triggering events, tracking on the computer system a plurality of economic events, and identifying, by the computer system, a pattern of effects of a first economic triggering event of the plurality of economic triggering events on a plurality of macroeconomic variables, wherein identifying the pattern of effects comprises, for each of the plurality of macroeconomic variables, querying a database to determine an impact magnitude and an impact duration of the first economic triggering event on the macroeconomic variable;

generating on the computer system a valuation model, including:

tracking economic sector performance, tracking company performance, generating a measure of impact of the first economic triggering event on the economic sector performance throughout the first economic triggering event, and generating on the computer system a measure of impact of the first economic triggering event on the company performance throughout the first economic triggering event;

linking on the computer system the economic and valuation models, wherein valuation performance is aggregated back into the economic model; and transmitting from the computer system an execution order to execute at least one securities trade based on linked economic and valuation model forecasts.

2. The method of claim 1, wherein the valuation performance is a performance measure.

3. The method of claim 2, wherein the performance measure is the company performance.

4. The method of claim 1, wherein the valuation performance is aggregated back into the economic events.

5. The method of claim 4, wherein the economic events are economic triggering events.

6. The method of claim 1, wherein the aggregation is made into the economic sector performance.

7. The method of claim 6, wherein the economic sector performance is industry performance.

8. The method of claim 1, wherein the economic model and the valuation model are reversed to generate themes.

9. The method of claim 1, wherein combinations of the economic events approximate new economic triggering events.

10. The method of claim 9, wherein the pattern of effects correlates a change in at least one of the plurality of macroeconomic variables to the first economic triggering event.

11. The method of claim 10, wherein the pattern of effects is an economic wavefront.

12. The method of claim 1, wherein the measure of the first economic triggering event captures the impact as an average deviation from what had been anticipated across the plurality of economic events simultaneously.

13. The method of claim 1, further, comprising:

modifying S&P GIC codes to provide mapping of economic events to the valuation performance.

14. A non-transitory medium comprising computer-executable instructions which, when executed by one or more processors, cause the one or more processors to:

generate an economic model on a computer system by:

tracking a plurality of economic triggering events, tracking a plurality of economic events, and identifying a pattern of effects of a first economic triggering event of the plurality of economic triggering events on a plurality of macroeconomic variables, wherein identifying the pattern of effects comprises, for each of the plurality of macroeconomic variable, querying a database to determine an impact magnitude and an impact duration of the first economic triggering event on the macroeconomic variable;

generate a valuation model by:

tracking economic sector performance, tracking company performance, generating a measure of impact of the first economic triggering event on the economic sector performance throughout the first economic triggering event, and generating a measure of impact of the first economic triggering event on the company performance throughout the first economic triggering event;

link the economic and valuation models, wherein valuation performance is aggregated back into the economic model; and transmit an execution order to execute at least one securities trade based on linked economic and valuation model forecasts.

15. An apparatus comprising:

one or more processors; and computer-readable code that causes the one or more processors to:

generate an economic model on a computer system, including:

track a plurality of economic triggering events;

track a plurality of economic events; and identify a pattern of effects of a first economic triggering event of the plurality of economic triggering events on a plurality of macroeconomic variables, wherein identifying the pattern of effects comprises, for each of the plurality of macroeconomic variables, querying a database to determine an impact magnitude and an impact duration of the first economic triggering event on the macroeconomic variable;

generate a valuation model, including:

track economic sector performance, track company performance, generate a measure of impact of the first economic triggering event on the economic sector performance throughout the first economic triggering event, and generate a measure of impact of the first economic triggering event on the company performance throughout the first economic triggering event;

link the economic and valuation models, wherein valuation performance is aggregated back into the economic model; and transmit an execution order to execute at least one securities trade based on linked economic and valuation model forecasts.

16. The non-transitory medium of claim 14, wherein the valuation performance is a performance measure.

17. The non-transitory medium of claim 16, wherein the performance measure is the company performance.

18. The non-transitory medium of claim 14, wherein the valuation performance is aggregated back into the economic events.

19. The non-transitory medium of claim 18, wherein the economic events are economic triggering events.

20. The non-transitory medium of claim 14, wherein the aggregation is made into the economic sector performance.

* * * * *

UNITED STATES PATENT AND TRADEMARK OFFICE

CERTIFICATE OF CORRECTION

PATENT NO. : 10,453,139 B2
APPLICATION NO. : 13/079914
DATED : October 22, 2019
INVENTOR(S) : Steven Harris Strongin, II et al.

It is certified that error appears in the above-identified patent and that said Letters Patent is hereby corrected as shown below:

On the Title Page

Item (63), The Related U.S. Application Data should read as follows:
--(63) Continuation of application No. 11/107,005, filed on Apr. 15, 2005, now Pat. No. 7,949,590.--

Signed and Sealed this
Eleventh Day of February, 2020

Andrei Iancu
*Director of the United States Patent and Trademark Office*